(12) United States Patent
Busch et al.

(10) Patent No.: US 7,791,626 B2
(45) Date of Patent: Sep. 7, 2010

(54) PRINT HEAD PULSING TECHNIQUES FOR MULTICOLOR PRINTERS

(75) Inventors: Brian Busch, Sudbury, MA (US); Chien Liu, Wayland, MA (US); Stephen J. Telfer, Arlington, MA (US); William T. Vetterling, Lexington, MA (US); Peter Zelten, Melrose, MA (US)

(73) Assignee: Zink Imaging, Inc., Bedford, MA (US)

( * ) Notice: Subject to any disclaimer, the term of this patent is extended or adjusted under 35 U.S.C. 154(b) by 0 days.

(21) Appl. No.: 12/022,955

(22) Filed: Jan. 30, 2008

(65) Prior Publication Data

US 2008/0238967 A1    Oct. 2, 2008

Related U.S. Application Data

(60) Continuation-in-part of application No. 11/397,251, filed on Apr. 3, 2006, and a continuation-in-part of application No. 11/159,880, filed on Jun. 23, 2005, which is a continuation-in-part of application No. 10/806,749, filed on Mar. 23, 2004, now Pat. No. 7,166,558, which is a continuation-in-part of application No. 10/374,847, filed on Feb. 25, 2003, now Pat. No. 7,388,686, which is a division of application No. 10/151,432, filed on May 20, 2002, now Pat. No. 6,801,233.

(60) Provisional application No. 60/294,486, filed on May 30, 2001, provisional application No. 60/364,198, filed on Mar. 13, 2002.

(51) Int. Cl.
    *B41J 2/35* (2006.01)
(52) U.S. Cl. .................................... 347/211
(58) Field of Classification Search ............. 347/175, 347/211; 400/120.01, 120.02, 120.03
    See application file for complete search history.

(56) References Cited

U.S. PATENT DOCUMENTS

| 29,168 A | 7/1860 | Hemingway |
| 2,417,897 A | 3/1947 | Adams et al. |
| 2,967,784 A | 1/1961 | Newman et al. |

(Continued)

FOREIGN PATENT DOCUMENTS

EP        0 774 857 A1    5/1997

(Continued)

OTHER PUBLICATIONS

English translation of Unexamined Patent Application Publication (Kokai) (A) S59-194886; Publication Date: Nov. 5, 2984; JPO File No. 6906-2H; Patent Application No. S58-69700; Filing Date: Apr. 20, 1983; Applicant: Ricoh Corporation.

(Continued)

*Primary Examiner*—Huan H Tran
(74) *Attorney, Agent, or Firm*—Foley & Lardner, LLP; James F. Ewing; Michel Morency

(57) ABSTRACT

In one aspect of the invention there is disclosed a multicolor thermal imaging system wherein different heating elements on a thermal print head can print on different color-forming layers of a multicolor thermal imaging member in a single pass. The line-printing time is divided into segments, each of which is divided into a plurality of subintervals. All of the pulses within the segments have the same energy. In one embodiment, every pulse has the same amplitude and duration. Different colors are selected for printing during the different segments by varying the fraction of subintervals that contain pulses. This technique allows multiple colors to be printed using a thermal print head with a single strobe signal line. Pulsing patterns may be chosen to reduce the coincidence of pulses provided to multiple print head elements, thereby reducing the peak power requirements of the print head.

19 Claims, 31 Drawing Sheets

U.S. PATENT DOCUMENTS

| | | |
|---|---|---|
| 2,995,465 A | 8/1961 | Riche, Jr. |
| 2,995,466 A | 8/1961 | Sorensen |
| 3,076,721 A | 2/1963 | Coles |
| 3,107,174 A | 10/1963 | Wartman |
| 3,129,101 A | 4/1964 | Workman |
| 3,293,055 A | 12/1966 | Baum |
| 3,390,994 A | 7/1968 | Cescon |
| 3,488,705 A | 1/1970 | Fox et al. |
| 3,539,375 A | 11/1970 | Baum |
| 3,647,467 A | 3/1972 | Grubb |
| 3,745,009 A | 7/1973 | Jenkins et al. |
| 3,832,212 A | 8/1974 | Jenkins et al. |
| 3,895,173 A | 7/1975 | Adachi |
| 4,020,232 A | 4/1977 | Kohmura et al. |
| 4,042,392 A | 8/1977 | Gysling et al. |
| 4,242,440 A | 12/1980 | Yee et al. |
| 4,243,052 A | 1/1981 | Bailey |
| 4,250,511 A | 2/1981 | Stein et al. |
| 4,290,951 A | 9/1981 | Foley et al. |
| 4,290,955 A | 9/1981 | Cincotta et al. |
| 4,328,977 A | 5/1982 | Ozawa et al. |
| 4,380,629 A | 4/1983 | Yamashita et al. |
| 4,401,717 A | 8/1983 | Ikeda et al. |
| 4,415,633 A | 11/1983 | Nakamura et al. |
| 4,534,288 A | 8/1985 | Brovman |
| 4,598,299 A | 7/1986 | Koike et al. |
| 4,602,263 A | 7/1986 | Borror et al. |
| 4,620,204 A | 10/1986 | Inaba et al. |
| 4,627,641 A | 12/1986 | Kawaguchi |
| 4,636,819 A | 1/1987 | Nagamoto et al. |
| 4,641,147 A | 2/1987 | Sakura et al. |
| 4,660,052 A | 4/1987 | Kaiya et al. |
| 4,665,410 A | 5/1987 | Iiyama et al. |
| 4,734,704 A | 3/1988 | Mizutani et al. |
| 4,745,046 A | 5/1988 | Borror et al. |
| 4,833,488 A | 5/1989 | Mizutani et al. |
| 4,840,933 A | 6/1989 | Usami et al. |
| 4,956,251 A | 9/1990 | Washizu et al. |
| 4,965,166 A | 10/1990 | Hosoi et al. |
| 4,997,410 A | 3/1991 | Polster et al. |
| 5,055,373 A | 10/1991 | Saeki et al. |
| 5,119,108 A | 6/1992 | Hatakeyama |
| 5,153,169 A | 10/1992 | Freedman et al. |
| 5,196,297 A | 3/1993 | Dombrowski, Jr. et al. |
| 5,210,064 A | 5/1993 | Shon Baker et al. |
| 5,258,274 A | 11/1993 | Helland et al. |
| 5,284,816 A | 2/1994 | Stephenson |
| 5,350,870 A | 9/1994 | Boggs et al. |
| 5,401,619 A | 3/1995 | Boggs et al. |
| 5,450,099 A | 9/1995 | Stephenson et al. |
| 5,618,063 A | 4/1997 | Chang et al. |
| 5,644,352 A | 7/1997 | Chang et al. |
| 5,663,115 A | 9/1997 | Naito et al. |
| 5,686,159 A | 11/1997 | Langan |
| 5,699,100 A | 12/1997 | Fukuda et al. |
| 5,710,094 A | 1/1998 | Minami et al. |
| 5,712,890 A | 1/1998 | Spivey et al. |
| 5,729,274 A | 3/1998 | Sato |
| 5,796,420 A | 8/1998 | Kaerts et al. |
| 5,852,683 A | 12/1998 | Jewel |
| 5,876,898 A | 3/1999 | Ikeda et al. |
| 5,885,926 A | 3/1999 | Matsumoto |
| 5,916,680 A | 6/1999 | Wakata et al. |
| 6,164,847 A | 12/2000 | Allen |
| 6,188,419 B1 | 2/2001 | Katamoto et al. |
| 6,197,725 B1 | 3/2001 | Ohkawa et al. |
| 6,269,177 B1 | 7/2001 | Dewaele et al. |
| 6,385,349 B1 | 5/2002 | Teo |
| 6,459,094 B1 | 10/2002 | Wang et al. |
| 6,631,012 B2 | 10/2003 | Athens et al. |
| 6,661,443 B2 | 12/2003 | Bybell et al. |
| 6,801,233 B2 | 10/2004 | Bhatt et al. |
| 6,906,735 B2 | 6/2005 | Bhatt et al. |
| 6,951,952 B2 | 10/2005 | Cheon et al. |
| 7,008,759 B2 | 3/2006 | Cheon et al. |
| 7,132,203 B2 | 11/2006 | Pierrat |
| 7,176,161 B2 | 2/2007 | Chu et al. |
| 7,279,264 B2 | 10/2007 | Cheon et al. |
| 7,282,317 B2 | 10/2007 | Allen et al. |
| 7,298,387 B2 | 11/2007 | Busch et al. |
| 7,369,145 B2 | 5/2008 | Busch et al. |
| 7,379,082 B2 | 5/2008 | Jo et al. |
| 7,388,596 B2 | 6/2008 | Chung |
| 2001/0014229 A1 | 8/2001 | Nakata et al. |
| 2004/0165054 A1 | 8/2004 | Saquib et al. |
| 2005/0007438 A1 | 1/2005 | Busch et al. |
| 2005/0270317 A1 | 12/2005 | Gao et al. |
| 2006/0098038 A1 | 5/2006 | Im |
| 2006/0152573 A1 | 7/2006 | Busch et al. |
| 2006/0232642 A1 | 10/2006 | Busch et al. |
| 2006/0290769 A1 | 12/2006 | Liu et al. |
| 2006/0292502 A1 | 12/2006 | Busch et al. |

FOREIGN PATENT DOCUMENTS

| | | |
|---|---|---|
| EP | 0 810 776 A2 | 12/1997 |
| EP | 1 091 560 A1 | 4/2001 |
| JP | 56-126192 | 10/1981 |
| JP | 56002920 | 7/1982 |
| JP | 63-102951 | 5/1988 |
| JP | 05-008424 | 1/1993 |
| JP | 2002-301055 | 10/2002 |

OTHER PUBLICATIONS

English translation of Japanese Laid-Open Publication No. 60-234881; Publication Date: Nov. 21, 1985; Application No. 59-91119; Filing Date: May 9, 1984; Applicant: Tomoegawa Paper Co., Ltd.

English translation of Japanese Laid-Open Publication No. 10-315635; Publication Date: Dec. 2, 1998; Application No. 9-128190; Filing Date: May 19, 1997; Applicant: Mitsubishi Paper Mills Ltd.

English translation of Japanese Laid-open Publication No. 56-126192; Publication date: Oct. 2, 1981; Application No. 55-29740; Filing date: Mar. 11, 1980; Applicant: Fujitsu Limited.

Abstract of Japanese Laid-Open Publication No. 2000-052653; Publication date: Feb. 22, 2000; Application No. 10-223434; Filing date: Aug. 6, 1998; Applicant: Nippon Kayaku Co Ltd.

PCT International Search Report—(PCT/US09/32470) Date of Mailing Mar. 23, 2009.

PCT International Search Report—(PCT/US2006/024033) Date of Mailing Nov. 22, 2006.

Notice of Allowance in U.S. Appl. No. 11/397,251, Date of Mailing Aug. 4, 2009.

English Abstract of JP 57-116691, Publication Date: Jul. 20, 1982.

English Abstract of JP 59-001294, Publication Date: Jan. 6, 1984.

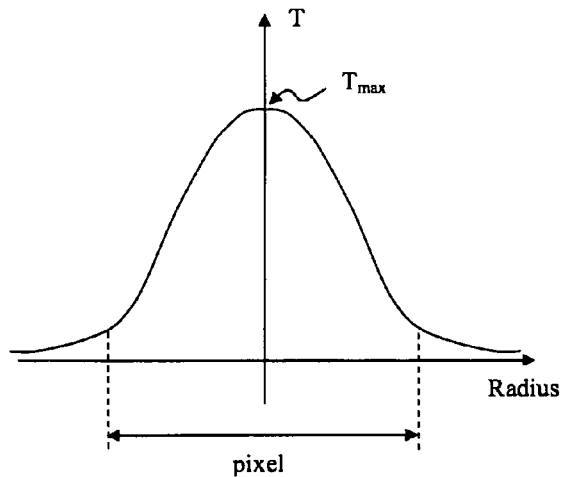
Fig. 3a
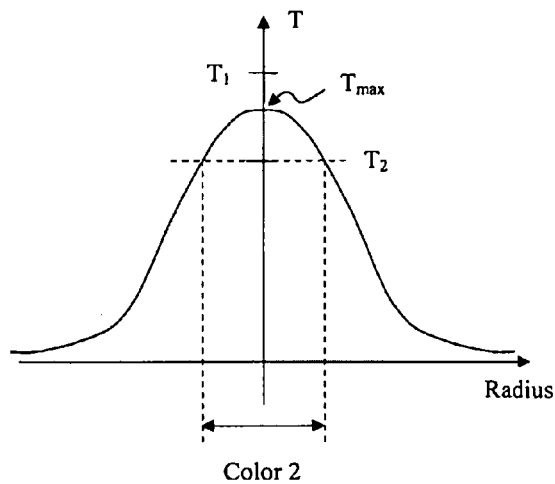
Fig. 3b
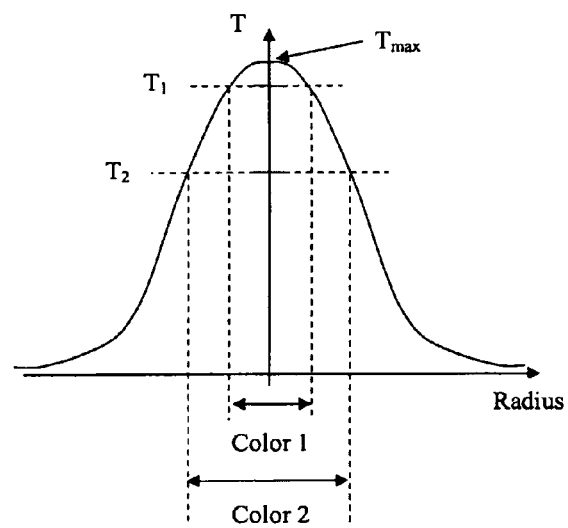
Fig. 3c
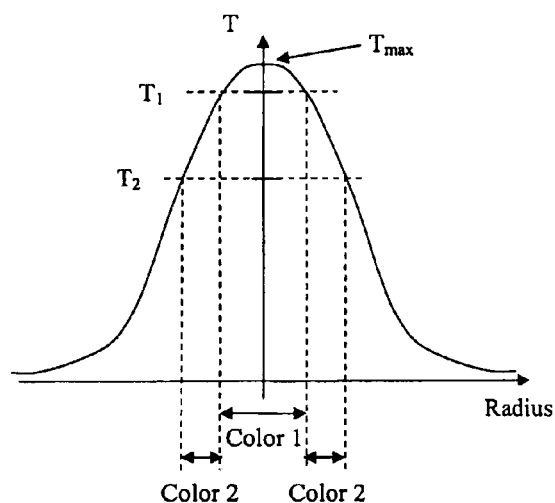
Fig. 3d
Fig. 3

PRINT HEAD PULSING TECHNIQUES FOR MULTICOLOR PRINTERS

REFERENCE TO RELATED APPLICATIONS

This application is a continuation-in-part of, and claims the benefit of priority of, U.S. patent application Ser. No. 11/397,251, filed on Apr. 3, 2006, which is a Continuation of U.S. patent application Ser. No. 10/806,749, filed on Mar. 23, 2004, now U.S. Pat. No. 7,166,558, which is a Division of U.S. patent application Ser. No. 10/151,432, filed on May 20, 2002, now U.S. Pat. No. 6,801,233, which claims priority from Provisional Application Ser. Nos. 60/364,198, filed on Mar. 13, 2002, and 60/294,486, filed on May 30, 2001. This application is also a continuation-in-part of, and claims the benefit of priority of, U.S. patent application Ser. No. 11/159,880, filed on Jun. 23, 2005, and Ser. No. 10/374,847, filed on Feb. 25, 2003. The contents of those patent applications are incorporated herein by reference.

This application is related to the following commonly assigned, United States patent applications and patents, the entire disclosures of which are hereby incorporated by reference herein in their entirety:

U.S. Pat. No. 6,951,952 B2 which describes and claims color-forming compositions for use in the present invention;

U.S. Pat. No. 7,008,759 B2 which describes and claims color-forming compositions for use in the present invention;

U.S. Pat. No. 7,176,161 B2 which describes and claims color-forming compositions for use in the present invention;

U.S. Pat. No. 7,279,264 B2 which describes and claims color-forming compositions for use in the present invention;

U.S. patent application Ser. No. 10/374,847, filed Feb. 25, 2003 which describes and claims methods for image stitching for use in the present invention;

U.S. Pat. No. 7,282,317 B2 which describes and claims color-forming compositions for use in the present invention;

U.S. patent application Ser. No. 11/159,880, filed Jun. 23, 2005, entitled "Print Head Pulsing Techniques for Multicolor Printers";

U.S. patent application Ser. No. 11/400,734, filed Apr. 6, 2006, which describes and claims an imaging method for use in the present invention; and U.S. patent application Ser. No. 11/400,735, filed Apr. 6, 2006, which describes and claims an imaging method for use in the present invention; and U.S. patent application Ser. No. 10/910,880, filed Aug. 4, 2004, which describes and claims a thermal response correction system for use in the present invention; and U.S. patent application Ser. No. 10/990,672, filed Jan. 10, 2005, which describes and claims a method for controlling the uniformity of print density of a thermal print head array.

FIELD OF THE INVENTION

The present invention relates generally to a thermal imaging system and, more particularly, to a multicolor thermal imaging system wherein at least two image-forming layers of a thermal imaging member are addressed at least partially independently by a single thermal printhead or by multiple printheads from the same surface of the thermal imaging member.

BACKGROUND OF THE INVENTION

Conventional methods for color thermal imaging such as thermal wax transfer printing and dye-diffusion thermal transfer typically involve the use of separate donor and receiver materials. The donor material typically has a colored image-forming material, or a color-forming imaging material, coated on a surface of a substrate and the image-forming material or the color-forming imaging material is transferred thermally to the receiver material. In order to make multicolor images, a donor material with successive patches of differently-colored, or different color-forming, material may be used. In the case of printers having either interchangeable cassettes or more than one thermal head, different monochrome donor ribbons are utilized and multiple color separations are made and deposited successively above one another. The use of donor members with multiple different color patches or the use of multiple donor members increases the complexity and the cost of such printing systems. It would be simpler to have a single-sheet imaging member that has the entire multicolor imaging reagent system embodied therein.

There have been described in the prior art numerous attempts to achieve multicolor, direct thermal printing. For example, there are known two-color direct thermal systems in which formation of the first color is affected by formation of the second color. U.S. Pat. No. 3,895,173 describes a dichromatic thermal recording paper which includes two leuco dye systems, one of which requires a higher activation temperature than the other. The higher temperature leuco dye system cannot be activated without activating the lower temperature leuco dye system. There are known direct thermal imaging systems that utilize an imaging member having two color-forming layers coated on opposite surfaces of a transparent substrate. The imaging member is addressed by multiple printheads independently from each side of the imaging member. A thermal imaging system of this type is described in U.S. Pat. No. 4,956,251.

Thermal systems that exploit a combination of dye transfer imaging and direct thermal imaging are also known. In systems of this type, a donor element and a receiver element are in contact with one another. The receiver element is capable of accepting dye, which is transferred from the donor element, and also includes a direct thermal color-forming layer. Following a first pass by a thermal printhead during which dye is transferred from the donor element to the receiver element, the donor element is separated from the receiver and the receiver element is imaged a second time by a printhead to activate the direct thermal imaging material. This type of thermal system is described in U.S. Pat. Nos. 4,328,977. 5,284,816 describes a thermal imaging member that comprises a substrate having a direct thermal color-forming layer on one side and a receiver element for dye transfer on the other side.

There are also known thermal imaging systems that utilize imaging members having spatially separated regions comprising direct thermal color-forming compositions that form different colors. U.S. Pat. Nos. 5,618,063 and 5,644,352 describe thermal imaging systems in which different areas of a substrate are coated with formulations for forming two different colors. A similar bicolored material is described in U.S. Pat. No. 4,627,641.

Another known thermal imaging system is a leuco-dye-containing, direct thermal system in which information is created by activating the imaging material at one temperature and erased by heating the material to a different temperature. U.S. Pat. No. 5,663,115 describes a system in which a transition from a crystalline to an amorphous, or glass, phase is exploited to give a reversible color formation. Heating the imaging member to the melting point of a steroidal developer results in the formation of a colored amorphous phase while heating of this colored amorphous phase to a temperature lower than the crystalline melting point of the material causes recrystallization of the developer and erasure of the image.

There is also known a thermal system containing one decolorizable, leuco dye containing, color-forming layer and a second leuco dye containing layer capable of forming a different color. The first color-forming layer colorizes at a low temperature while the second layer colorizes at a higher temperature, at which temperature the decolorization of the first layer also takes place. In such systems, either one or the other color can be addressed at a particular point. U.S. Pat. No. 4,020,232 discloses formation of one color by a leuco dye/base mechanism and the other by a leuco dye/acid mechanism wherein the color formed by one mechanism is neutralized by the reagent used to form the other. Variations of this type of system are described in U.S. Pat. Nos. 4,620,204; 5,710,094; 5,876,898 and 5,885,926.

Direct thermal imaging systems are known in which more than one layer may be addressed independently, and in which the most sensitive color-forming layer overlies the other color-forming layers. Following formation of an image in the layer outermost from the film base, the layer is deactivated by exposure to light prior to forming images in the other, less sensitive, color-forming layers. Systems of this type are described in U.S. Pat. Nos. 4,250,511; 4,734,704; 4,833,488; 4,840,933; 4,965,166; 5,055,373; 5,729,274; and 5,916,680.

As the state of the thermal imaging art advances and efforts are made to provide new thermal imaging systems that can meet new performance requirements, and to reduce or eliminate some of the undesirable requirements of the known systems, it would be advantageous to have a multicolor thermal imaging system in which at least two different image-forming layers of a single imaging member can be addressed at least partially independently from the same surface by a single thermal printhead or by multiple thermal printheads so that each color can be printed alone or in selectable proportion with the other color(s).

SUMMARY OF THE INVENTION

It is therefore an object of this invention to provide a multicolor thermal imaging system which allows for addressing, at least partially independently, with a single thermal printhead or multiple thermal printheads, at least two different image-forming layers of an imaging member from the same surface of the imaging member.

Another object of the invention is to provide such a multicolor thermal imaging system wherein each color can be printed alone or in selectable proportion with the other color(s).

Yet another object of the invention is to provide a multicolor thermal imaging system wherein at least two different image-forming layers of an imaging member are addressed at least partially independently by controlling the temperature applied to each of the layers and the time each of the layers is subjected to such temperature.

Still another object of the invention is to provide a multicolor thermal imaging system wherein at least two different image-forming layers of an imaging member are addressed at least partially independently with a thermal printhead or multiple thermal printheads from the same surface of the imaging member and one or more image-forming layers are addressed with a thermal printhead or multiple thermal printheads from the opposing surface of the imaging member.

A further object of the invention is to provide a multicolor thermal imaging system wherein at least two different image-forming layers of an imaging member are addressed at least partially independently with a single pass of a thermal printhead.

Another object of the invention is to provide a multicolor thermal imaging system which is capable of providing images which have adequate color separation for a particular application in which the system is used.

Still another object of the invention is to provide novel thermal imaging members.

These and other objects and advantages are accomplished in accordance with the invention by providing a multicolor thermal imaging system wherein at least two, and preferably three, image-forming layers of a thermal imaging member can be addressed at least partially independently, from the same surface of the imaging member, by a single thermal printhead or by multiple thermal printheads. The advantageous thermal imaging system of the invention is based upon at least partially independently addressing a plurality of image-forming layers of a thermal imaging member utilizing two adjustable parameters, namely temperature and time. These parameters are adjusted in accordance with the invention to obtain the desired results in any particular instance by selecting the temperature of the thermal printhead and the period of time for which thermal energy is applied to each of the image-forming layers. According to the invention, each color of the multicolor imaging member can be printed alone or in selectable proportion with the other color(s). Thus, as will be described in detail, according to the invention the temperature-time domain is divided into regions corresponding to the different colors it is desired to combine in a final print.

The image-forming layers of the thermal imaging member undergo a change in color to provide the desired image in the imaging member. The change in color may be from colorless to a color or from colored to colorless or from one color to another color. The term "image-forming layer" as used throughout the application including in the claims, includes all such embodiments. In the case where the change in color is from colorless to a color, an image having different levels of optical density (i.e., different "gray levels") of that color may be obtained by varying the amount of color in each pixel of the image from a minimum density, Dmin, which is substantially colorless, to a maximum density, Dmax, in which the maximum amount of color is formed. In the case where the change in color is from colored to colorless, different gray levels are obtained by reducing the amount of color in a given pixel from Dmax to Dmin, where ideally Dmin is substantially colorless. In this case, formation of the image involves converting a given pixel from a colored to a less colored, but not necessarily, colorless state.

A number of techniques can be used to achieve the advantageous results provided by exploiting the time and temperature variables in accordance with the invention. These include thermal diffusion with buried layers, chemical diffusion or dissolution in conjunction with timing layers, melting transitions and chemical thresholds. Each of these techniques may be utilized alone, or in combination with others, to adjust the regions of the imaging member in which each desired color will be formed.

In a preferred embodiment, a thermal imaging member includes two, and preferably three, different image-forming layers carried by the same surface of a substrate. In another preferred embodiment, a thermal imaging member includes a layer or layers of image-forming material carried by one surface of a substrate and a layer or layers of image-forming material carried by the opposing surface of the substrate. According to the imaging system of the invention, the image-forming layers of the imaging member can be addressed at least partially independently by a single thermal printhead or multiple printheads in contact with the same surface of the imaging member. In a preferred embodiment, one or two thermal printheads can be utilized to address at least partially independently from one surface of the imaging member two different image-forming layers carried by one surface of the substrate and another thermal printhead utilized to address at least partially independently from the opposing surface of the imaging member one or more image-forming layers carried by the opposing surface of the substrate. The thermal printheads which contact the opposing surfaces of the imaging member can be arranged directly opposite one another or offset from one another such that there is a delay between the times that any discrete area of the imaging member comes into contact with the respective thermal printheads.

In another preferred embodiment one thermal printhead may be used to address at least partially independently two or more different image-forming layers of the imaging member in a single pass and, optionally, a second thermal printhead used to address one or more image-forming layers, either in conjunction with the first thermal printhead, or subsequent thereto.

In one aspect of the invention there is disclosed a multi-color thermal imaging system wherein different heating elements on a thermal print head can print on at least three different color-forming layers of a multicolor thermal imaging member in a single pass. The line-printing time is divided into segments, each of which is divided into a plurality of subintervals. All of the pulses within the segments have the same energy. In one embodiment, every pulse has the same amplitude and duration. Different colors are selected for printing during the different segments by varying the fraction of subintervals that contain pulses. This technique allows multiple colors to be printed using a thermal print head with a single strobe signal line. Pulsing patterns may be chosen to reduce the coincidence of pulses provided to multiple print head elements, thereby reducing the peak power requirements of the print head.

Other features and advantages of various aspects and embodiments of the present invention will become apparent from the following description and from the claims.

BRIEF DESCRIPTION OF THE DRAWINGS

For a better understanding of the invention as well as other objects and advantages and further features thereof, reference is made to the following detailed description of various preferred embodiments thereof taken in conjunction with the accompanying drawings wherein:

FIG. 3 is a graphical illustration of non-independent colored-dot formation encountered in prior art direct thermal printing;

DESCRIPTION OF THE PREFERRED EMBODIMENTS

As previously mentioned, according to the multicolor thermal imaging system of the invention, two or more image-forming layers of a multicolor thermal imaging member are addressed at least partially independently from the same surface of the imaging member, so that each color may be printed alone or in selectable proportion with the others, and these results are accomplished by selecting the colors on the basis of two adjustable parameters, namely temperature and time. The temperature-time domain is divided into regions corresponding to the different colors it is desired to combine.

Figure 1:
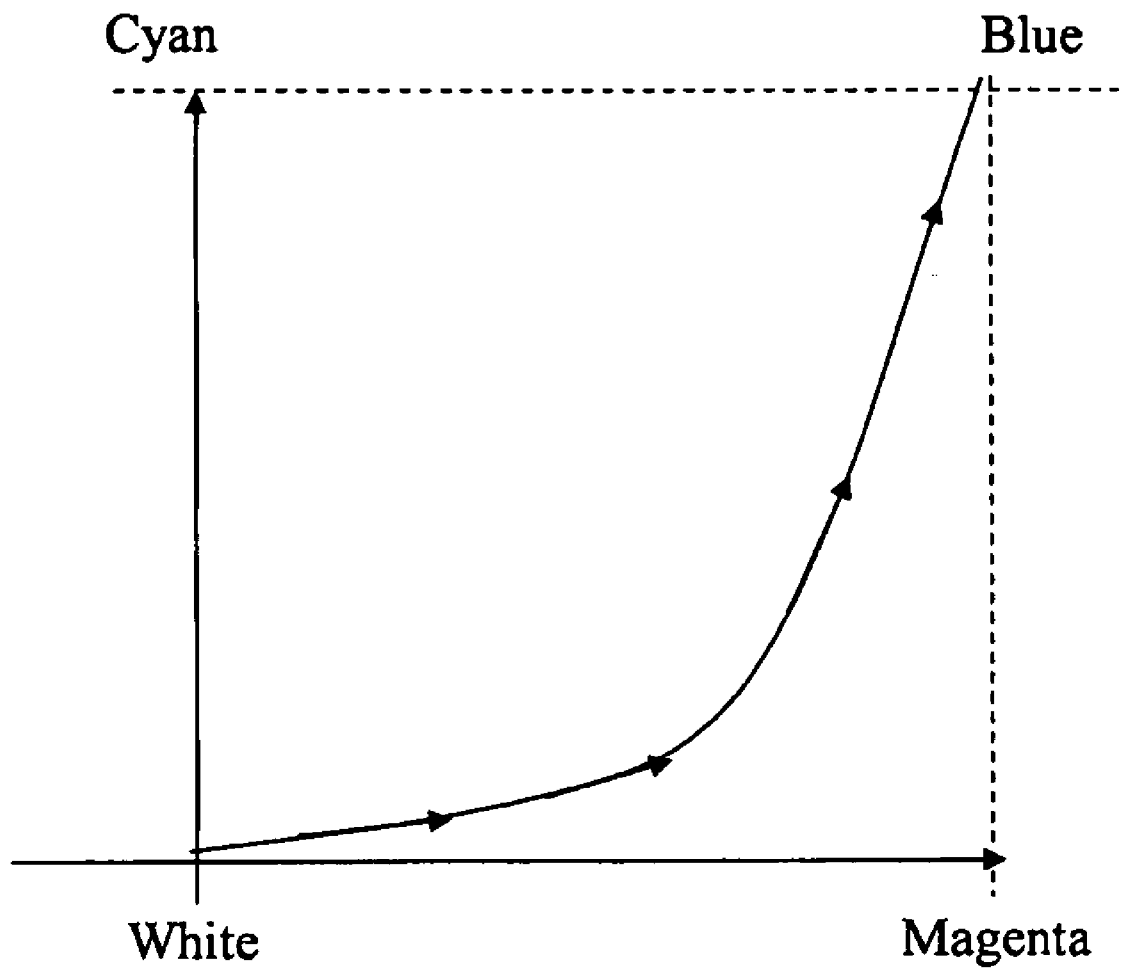
FIG. 1 is a graphical representation of the colors which may be printed by a prior art two-color, direct thermal printing system.

To assist those skilled in the art to better understand the concept of independent control of color, as applied to multicolor direct thermal printing according to the present invention, it is helpful to consider first a prior art thermal imaging system involving a thermal imaging member containing two color-forming layers on a white reflective substrate. For the purpose of discussion it will be considered that one layer is a cyan color-forming layer and the other a magenta color-forming layer and, further, that the cyan layer has a temperature threshold above that of the magenta layer. If a fixed-length thermal pulse is applied to a discrete point, or area, on this imaging member, a color will form depending upon the magnitude of the pulse. Pulses of increasing magnitude lead to increasing peak temperature in the image-forming layers at the location of the thermal pulse. The originally white medium will become progressively more magenta as the magenta threshold temperature for coloration is exceeded and then progressively more blue, i.e., magenta plus cyan, as the cyan threshold temperature for coloration is exceeded. This progression of color may be represented by the two-dimensional color diagram illustrated in FIG. 1.

As shown by the curvilinear path, the color first moves in the magenta direction as the threshold temperature is exceeded in the magenta layer and then in the cyan direction, i.e., towards blue, as the threshold temperature is surpassed in the cyan layer. Each point on the color path is associated with the magnitude of the thermal pulse that created it and there is a fixed ratio of magenta and cyan color associated with each pulse magnitude. A similar progression of colors is produced if the applied pulse has a fixed magnitude and variable duration provided that the power is sufficient ultimately to raise both dye layers above their threshold coloration temperatures. In this case, when the pulse begins, the two dye layers will advance in temperature. For longer and longer pulse durations the dye temperatures will first exceed the magenta threshold and then the cyan threshold. Each pulse duration will correspond to a well-defined color, again passing from white to magenta to blue along a curvilinear path. Prior art thermal imaging systems, using either a modulation of pulse amplitude or pulse duration, are therefore essentially limited to the reproduction of colors falling on curvilinear paths in the color space.

Figure 2:
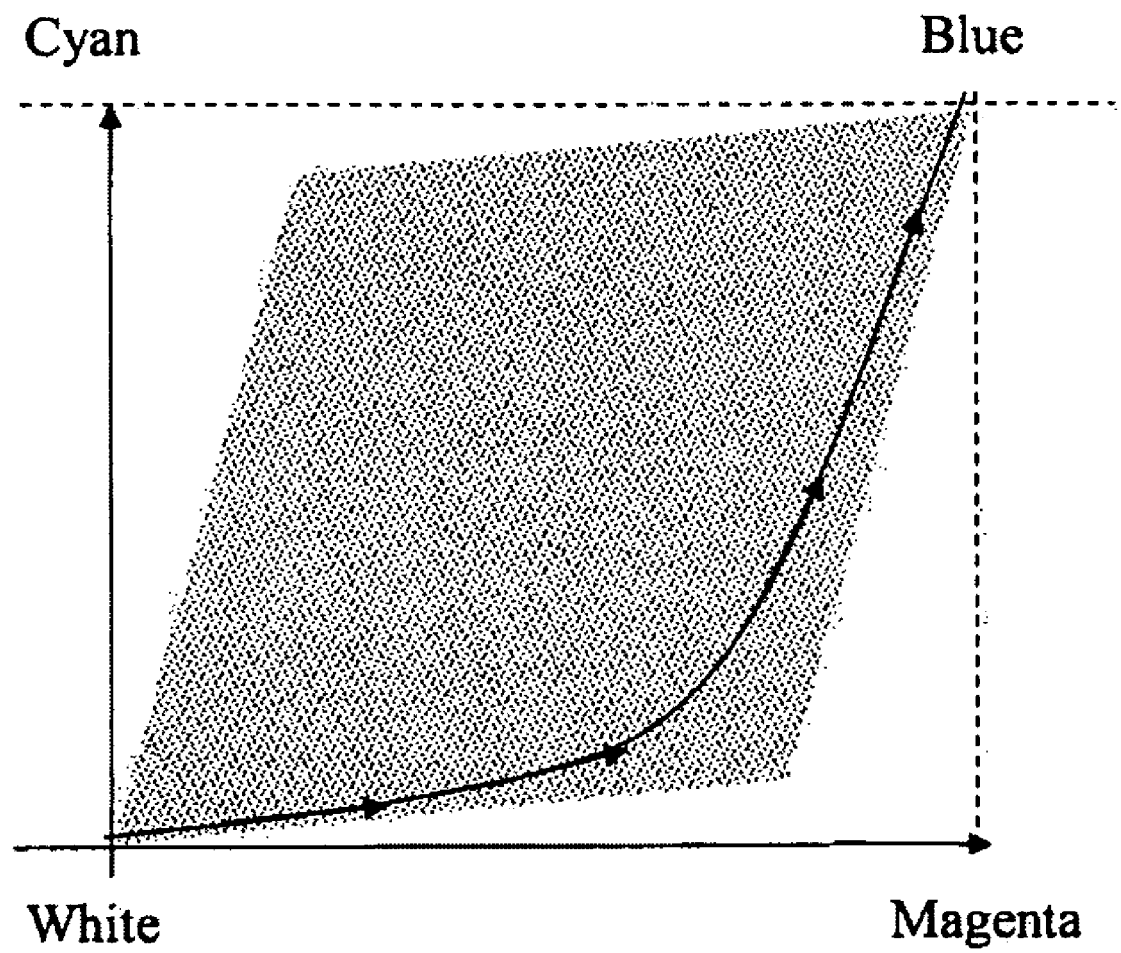
FIG. 2 is a graphical representation of the colors which may be printed by a two-color direct thermal printing embodiment of the invention.

The present invention, by addressing at least partially independently the different image-forming layers of a multicolor thermal imaging member, provides a thermal imaging method in which the colors formed are not constrained by a one dimensional path but can instead be selected throughout regions on both sides of the path as is illustrated in the shaded region of FIG. 2.

In the foregoing description the term "partially independently" is used to describe the addressing of the image-forming layers. The degree to which the image-forming layers can be addressed independently is related to the image property commonly referred to as "color separation". As stated previously, an object of the invention is to provide images with adequate color separation for the various applications for which the present thermal imaging method is suitable. For example, photographic imaging requires that the color separation be comparable to that which can be obtained with conventional photographic exposure and development. Depending upon the printing time, available printing power, and other factors, various degrees of independence in the addressing of the image-forming layers can be achieved. The term "independently" shall be used to refer to instances in which the printing of one color-forming layer typically results in a very small, but not generally visible optical density (density<0.05) in the other color-forming layer(s). In the same manner, the term "substantially independent" color printing will be used to refer to instances in which inadvertent or unintentional coloration of another image-forming layer or layers results in a visible density which is at a level typical of interimage coloration in multicolor photography (density<0.2). In some instances color crosstalk at this level is considered photographically desirable. The term "partially independent" addressing of the image-forming layers is used to refer to instances in which the printing of maximum density in the layer being addressed results in the coloration of another image-forming layer or layers at a density higher than 0.2 but not higher than about 1.0. The phrase "at least partially independently" is inclusive of all of the degrees of independence described above.

A distinction between the thermal imaging system of the invention and the prior art thermal imaging methods can be seen from the nature of the images which are obtainable from each. When two image-forming layers are not addressable independently one or both of them will not be able to be printed without substantial color contamination from the other. For example, consider a single-sheet thermal imaging member which is designed to provide two colors, Color 1 and Color 2, with temperature thresholds for coloration of, respectively, $T_1$ and $T_2$ where $T_1 > T_2$. Consider the attempt to form a dot of a single color using a heating element to heat the thermal member from the top surface. There will be a point, typically in the center of the heated area, where the temperature T takes its highest value, Tmax. Away from this point T is lower, falling off quickly outside of the heated area to a temperature well below $T_1$ or $T_2$, as indicated schematically in FIG. 3a. A "clean" dot of Color 2 may be printed in regions where the local temperature T is greater than $T_2$ but less than $T_1$ (see FIG. 3b). If Tmax exceeds $T_1$, then the dot will be contaminated with Color 1 in the center and independent color formation will no longer be possible.

It is notable that an attempt to print a dot of Color 1 will require that Tmax>$T_1$, and since $T_1$>$T_2$ this will inevitably mean that Color 2 will be printed as well (see FIG. 3c). Consequently, independent printing of Color 1 is not possible. An attempt can be made to correct this problem by incorporating a bleaching of Color 2 which occurs whenever Color 1 is formed. If bleaching is carried out, only Color 1 will be visible in the heated region where T is greater than $T_1$. However, this does not constitute independent addressing for two reasons. First, it is not possible to obtain arbitrary mixtures of Color 1 and Color 2 in this manner. Second, there remains an annular region around each dot of Color 1 within which Color 2 is not bleached (see FIG. 3d).

According to the present invention, independent addressing of both colors in the above example is achieved by introducing a timing mechanism by which the coloration of the second dye layer is delayed with respect to the coloration of the first dye layer. During this delay period, it is possible to write on the first dye layer without colorizing the second; and, if the second layer has a lower threshold temperature for coloration than the first, it will later be possible to write on the second without exceeding the threshold of the first.

In one embodiment, the method of the invention will allow completely independent formation of cyan or magenta. Thus, in this embodiment, one combination of temperature and time will permit the selection of any density of magenta on the white-magenta axis while not producing any noticeable cyan color. Another combination of temperature and time will permit the selection of any density of cyan on the white-cyan axis while not producing any noticeable magenta coloration. A juxtaposition of two temperature-time combinations will allow the selection of any cyan/magenta mixture within the enclosed area indicated on FIG. 2, thus providing independent control of cyan and magenta.

In other embodiments of the invention, thermal addressing of the image-forming layers, rather than being completely independent, can be substantially independent or only partially independent. Various considerations, including material properties, printing speed, energy consumption, material costs and other system requirements may dictate a system with increased color cross-talk. While independent or substantially independent color selection according to the invention is desirable for photographic-quality printing, this requirement is of less importance in the printing of certain images such as, for example, product labels or multicolor coupons, and in these instances may be sacrificed for economic considerations such as improved printing speed or lower costs.

In these embodiments of the invention where addressing of the separate image-forming layers of a multicolor thermal imaging member is not completely, but rather substantially, or partially, independent, and by design the printing of cyan may produce a controlled amount of magenta color formation and vice-versa, it will not be possible to print completely pure magenta or completely pure cyan. Indeed, there will be a region of the color box near each coordinate axis that represents unprintable colors and the available colors will fall into a more restricted region such as the shaded area illustrated schematically in FIG. 2. In these instances, although the palette of colors available is less than the selection encompassed by the embodiments of the invention where color selection is controlled completely independently, it is nevertheless greatly superior to the very restricted selection of colors allowed by the prior art systems.

Figure 4:
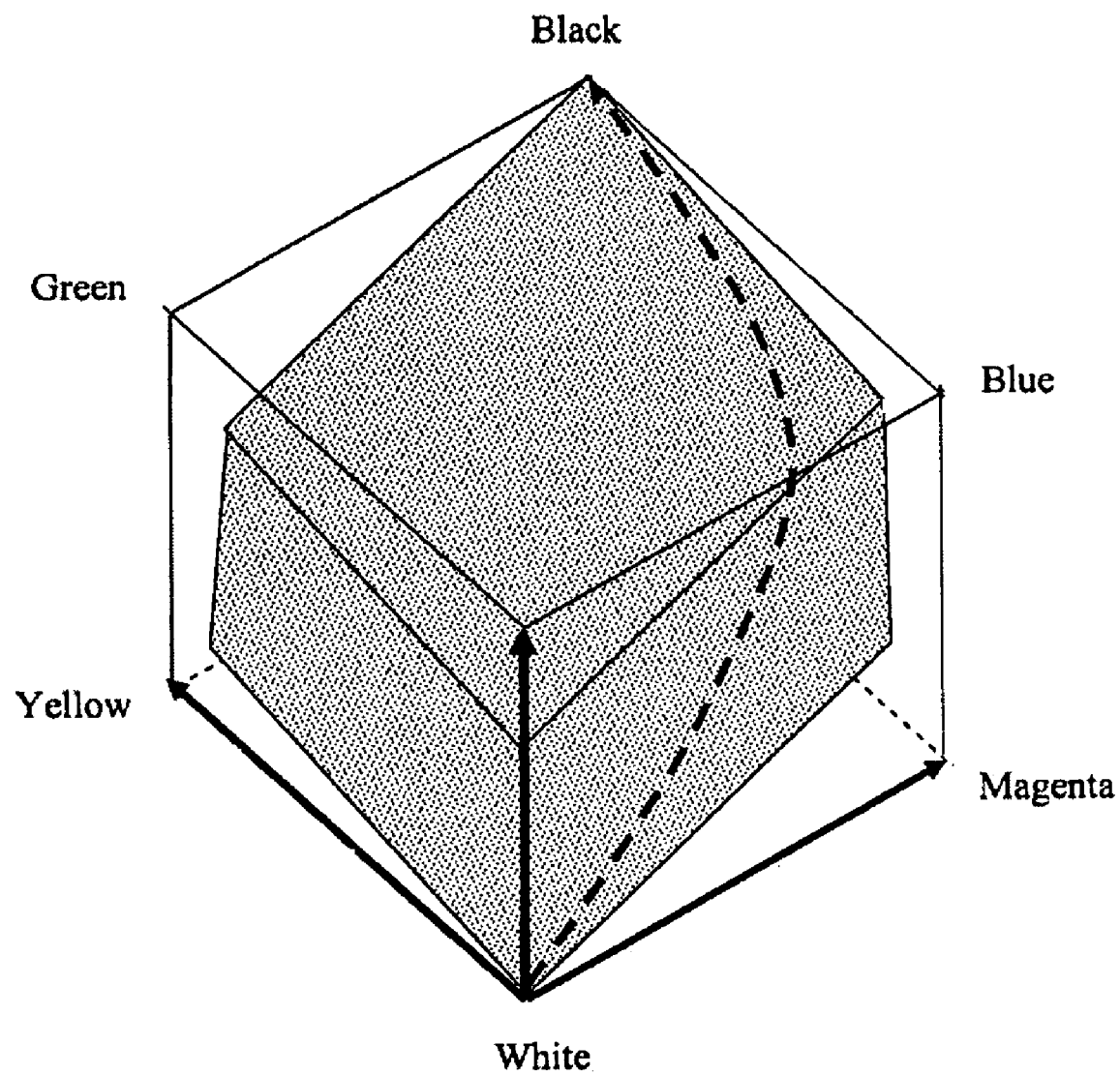
FIG. 4 is a graphical representation of the colors which may be printed by a prior art three-color direct thermal printing system and by a three-color direct thermal printing embodiment of the invention.

Similar considerations apply to three-color embodiments of the present invention. For these embodiments, the color space is three-dimensional and is commonly referred to as a "color cube" as is illustrated in FIG. 4. If fixed-length thermal pulses of increasing temperature are applied to a prior art multicolor direct thermal printing medium, it is possible to produce colors which fall on a curvilinear path through the cube as illustrated by the dotted arrow. As seen, the path extends from one color, usually white, to another color, usually black, while passing through a fixed variety of colors. In comparison, one embodiment of the present invention advantageously provides the capability to print any color within the three-dimensional color cube. In other embodiments of the invention, where addressing of the color-forming layers is substantially or partially independent, formation of colors within the shaded area of FIG. 4 is possible, again providing considerably more flexibility in the choice of colors than that offered by prior art direct thermal printing systems.

Figure 5:
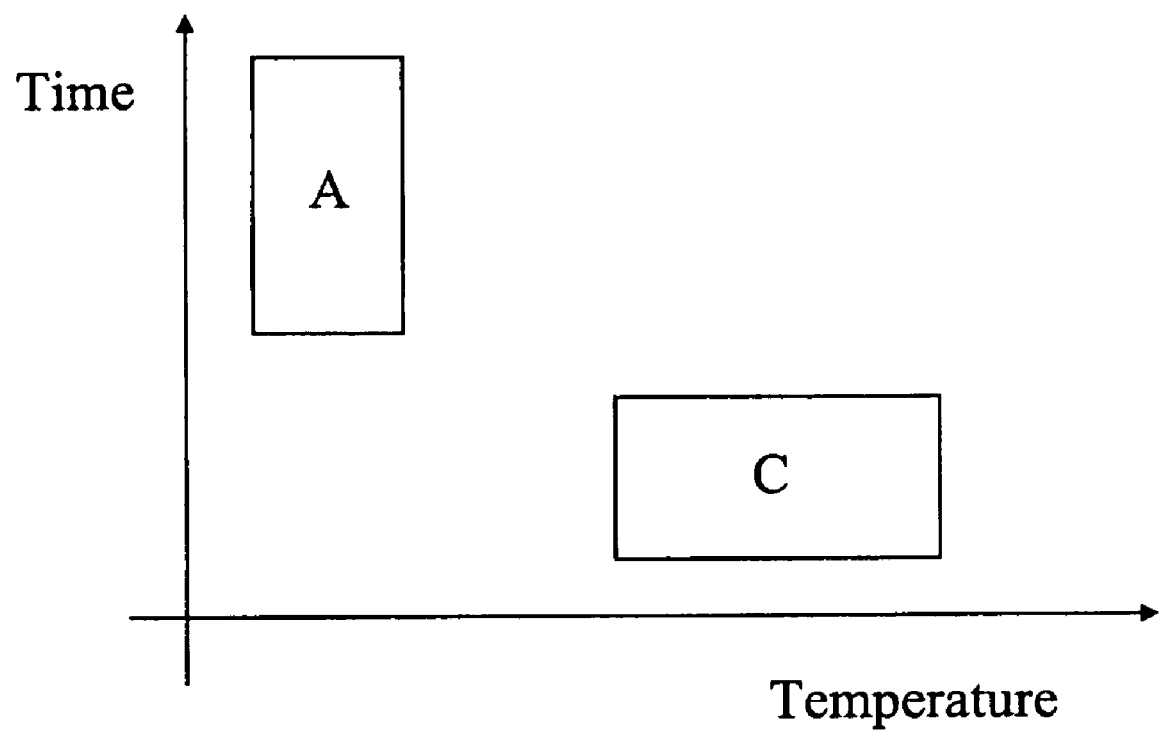
FIG. 5 is a graphical representation illustrating one embodiment of the invention.

For the purpose of describing the temperature and time parameter feature of the invention, reference is made to FIG. 5 which is a graphical representation of one embodiment of the invention. For example, the thermal imaging member may contain a cyan image-forming material which provides a visible cyan color region, C, when subjected to a relatively high temperature for a short period of time and a magenta image-forming material which provides a visible magenta region, A, when subjected to a lower temperature for a longer period of time. A combination of short and long pulses of heat at different temperatures can be utilized to select the proportions of each color. It can be seen that according to the invention, since there are two adjustable variables involved and two or more image-forming materials, at least substantially complete independent control of any particular color according to the invention requires that each color be assigned a substantially unique range of time and temperature.

Figure 6:
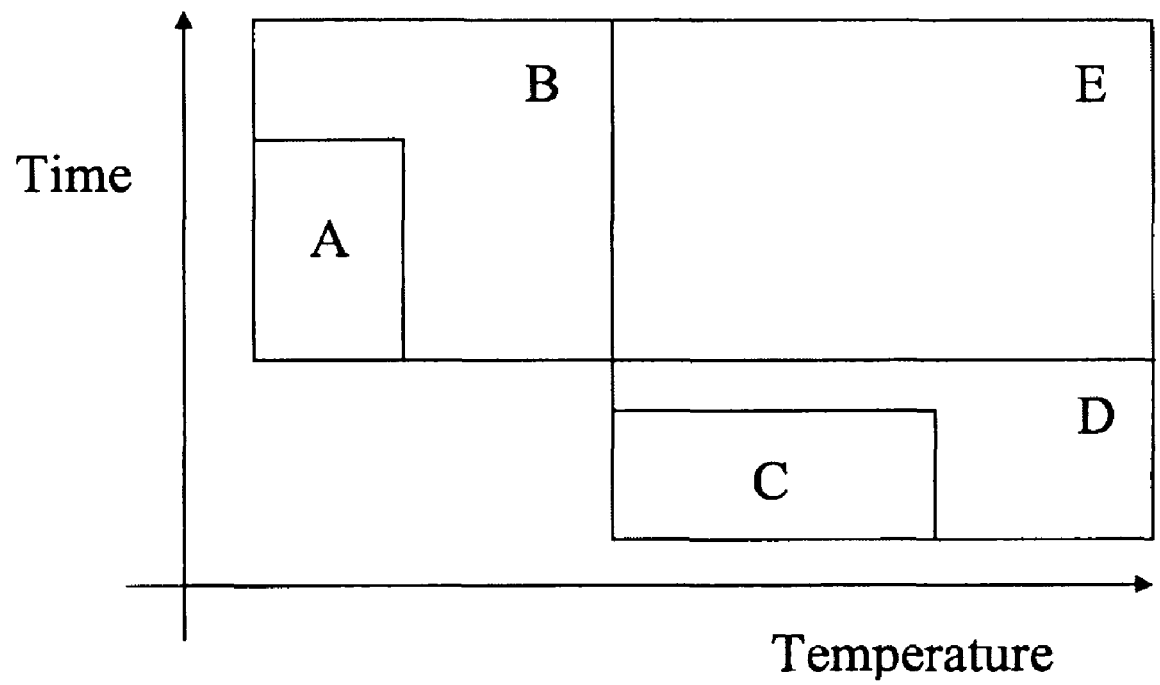
FIG. 6 is a graphical representation further illustrating the embodiment of the invention illustrated in FIG. 5.

Other considerations relevant to the multicolor thermal imaging system of the invention can be understood from the following discussion of a two-color leuco dye system in conjunction with FIG. 6. Consider, for example, a system wherein color is generated by a leuco dye that is being thermally diffused to combine with an acid developer material. In this instance, it may not be possible to constrain the colorant response to a completely enclosed region such as is shown in FIG. 5. Although it may be intended to utilize temperatures and time periods within the regions shown in FIG. 5 the imaging member may also be responsive at a wider range of temperatures and time periods. Referring now to FIG. 6 it can be seen that in this illustrative example, regions A and C would be the regions selected for printing magenta and cyan, respectively. However, the temperature and time combinations in regions B and E, for example, will also be adequate to permit diffusion of the magenta leuco dye to the developer. Also, cyan will be printed for temperature-time combinations in regions D and E. Thus, in order to obtain substantially complete independent control of cyan and magenta image-forming materials according to the invention a magenta printing region, A, should preferably be selected such that it does not overlap regions C, D or E, or any other region in which cyan is responsive. Conversely, cyan printing region, C, should preferably be selected such that it does not overlap regions A, B and E, or any other region in which magenta is responsive. Generally, this means that for the illustrative diffusive leuco dye system, the separately selected color printing regions should be arranged along a slope decreasing from higher to lower time periods and from lower to higher temperatures. It will be appreciated that in actual implementations, the chosen printing regions may not be rectangular in shape as shown in the schematic representation, but will have a shape governed by the behavior of the physical process that leads to coloration, and may contain limited regional overlap consistent with the desired color separation for a particular application.

Figure 7:
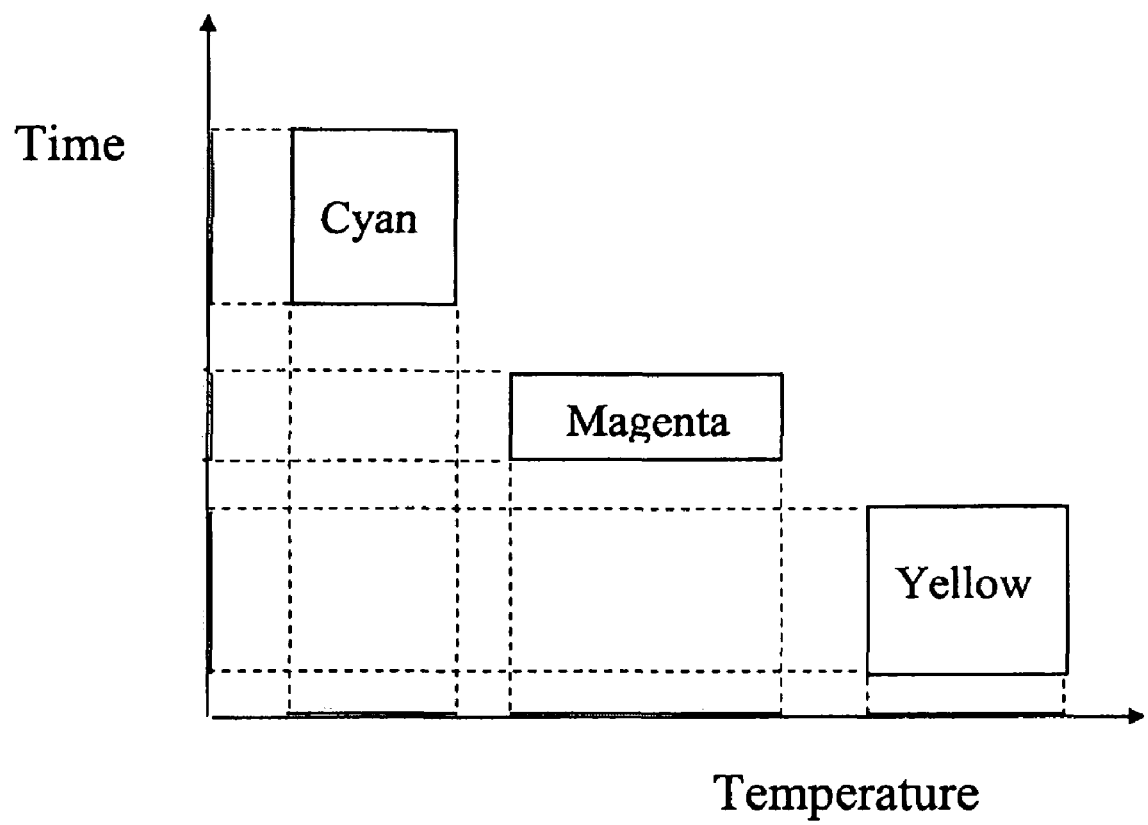
FIG. 7 is a graphical representation illustrating the practice of a three-color embodiment of the invention.

A suitable schematic arrangement for a three-color diffusion-controlled leuco dye system according to the invention is illustrated in FIG. 7 where the time-temperature combinations for printing magenta, cyan and yellow, respectively, are shown.

In preferred embodiments of the invention, the temperatures selected for the color-forming regions generally are in the range of from about 50° C. to about 450° C. The time period for which the thermal energy is applied to the color-forming layers of the imaging member is preferably in the range of from about 0.01 to about 100 milliseconds.

As mentioned previously, a number of image-forming techniques may be exploited in accordance with the invention including thermal diffusion with buried layers, chemical diffusion or dissolution in conjunction with timing layers, melting transitions and chemical thresholds.

Figure 8:
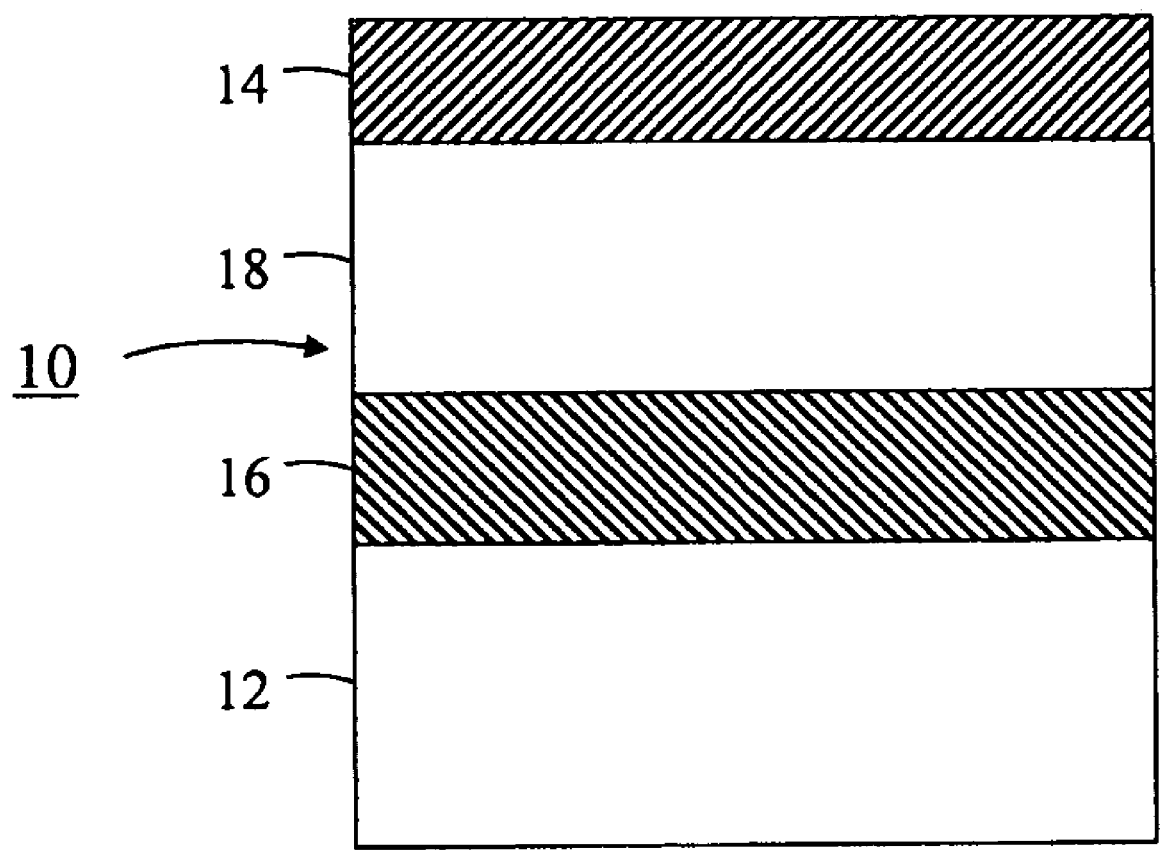
FIG. 8 is a partially schematic, side sectional view of a two color imaging member according to the invention which utilizes thermal delays.

Referring now to FIG. 8 there is seen a multicolor thermal imaging member that utilizes thermal time delays to define the printing regions for the respective colors to be formed. The imaging member 10 relies upon the diffusion of heat through the imaging member in order to obtain the timing differences that are exploited according to the invention. Imaging member 10 includes a substrate 12 carrying cyan and magenta image-forming layers, 14 and 16, respectively, and spacer interlayer 18. It should be noted here that in various embodiments of the invention the image-forming layers may themselves comprise two or more separate layers. For example, where the image-forming material is a leuco dye which is used in conjunction with a developer material, the leuco dye and developer material may be disposed in separate layers.

Where the imaging member 10 is heated by a thermal printhead from above cyan image-forming layer 14 the heat will penetrate into the imaging member to reach magenta image-forming layer 16. Cyan image-forming layer 14 will be heated above its coloration threshold temperature almost immediately by the thermal printhead after the heat is applied, but there will be a more significant delay before the magenta image-forming layer 16 approaches its threshold temperature. If both image-forming layers were such as to begin forming color at the same temperature, e.g., 120° C., and the printhead were to heat the surface of imaging member 10 to a temperature of substantially more than 120° C., then the cyan image-forming layer 14 would begin to provide cyan color almost at once whereas magenta image-forming layer 16 would begin to provide magenta color after a time delay dependent upon the thickness of spacer layer 18. The chemical nature of the activation of the color in each layer would not be critical.

To provide multicolor printing in accordance with the invention each image-forming layer is arranged to be activated at a different temperature, e.g., $T_5$ for cyan image-forming layer 14 and $T_6$ for the "buried" magenta image-forming layer 16. This result can be achieved, for example, by arranging these image-forming layers to have different melting temperatures or by incorporating in them different thermal solvents, which will melt at different temperatures and liquefy the image-forming materials. Temperature $T_5$ is selected to be higher than $T_6$.

Where a temperature less than $T_6$ is applied to the imaging member for any length of time no color will be formed. Thus, the imaging material may be shipped and stored safely at a temperature less than $T_6$. Where a printing element in contact with layer 14 applies such heating as to cause a temperature between $T_5$ and $T_6$ to be attained by image-forming layer 16, then the cyan image-forming layer 14 will remain substantially colorless and magenta image-forming layer 16 will develop magenta color density after a time delay which is a function of the thickness of spacer layer 18. Where a temperature just above $T_5$ is applied to the imaging member by a printing element in contact with image-forming layer 14, then the cyan image-forming layer 14 will begin developing color density immediately and magenta image-forming layer 16 will also develop magenta color density but only after a time delay. Said another way, at intermediate temperatures and relatively long time periods it is possible to produce magenta color without cyan color and for high temperatures and relatively short time periods, it is possible to produce cyan color without any magenta color. A relatively short, high temperature heat pulse juxtaposed with a longer, intermediate temperature heat pulse will result in the combination of magenta and cyan colors in selected proportions.

It will be appreciated by those skilled in the art that the mechanisms described above in reference to FIG. 8 will provide optimum differentiation between the two colors where the thermal printhead is chosen so as to conduct heat away efficiently from the surface of imaging member 10 after the application of heat. This is particularly important immediately following printing a pixel in image-forming layer 14.

The image-forming layers 14 and 16 of imaging member 10 may optionally undergo more than one color change. For example, image-forming layer 14 may go from colorless to yellow to red as a function of the heat applied. Image-forming layer 16 could initially be colored, then become colorless and then go to a different color. Those skilled in the art will recognize that such color changes can be obtained by exploiting the imaging mechanism described in U.S. Pat. No. 3,895,173.

Any known printing modality may be used to provide a third image-forming layer or additional image-forming layers beyond the two illustrated in FIG. 8. For example, the third image-forming layer may be imaged by ink jet printing, thermal transfer, electrophotography, etc. In particular, imaging member 10 may include a third image-forming layer which, after color is formed in the layer, can then be fixed by exposure to light as is known in the art. In this embodiment, the third image-forming layer should be positioned close to the surface of imaging member 10 and printed at a lower temperature than image-forming layer 14, prior to the printing of image-forming layer 14. Fixation of this third layer should also occur prior to printing of image-forming layer 14.

Substrate 12 may be of any suitable material for use in thermal imaging members, such as polymeric materials, and may be transparent or reflective.

Any combination of materials that may be thermally induced to change color may be used. The materials may react chemically under the influence of heat, either as a result of being brought together by a physical mechanism, such as melting or diffusion, or through thermal acceleration of a reaction rate. The reaction may be chemically reversible or irreversible.

For example, a colorless dye precursor may form color upon heat-induced contact with a reagent. This reagent may be a Bronsted acid, as described in "Imaging Processes and Materials", Neblette's Eighth Edition, J. Sturge, V. Walworth, A. Shepp, Eds., Van Nostrand Reinhold, 1989, pp. 274-275, or a Lewis acid, as described for example in U.S. Pat. No. 4,636,819. Suitable dye precursors for use with acidic reagents are described, for example, in U.S. Pat. No. 2,417, 897, South African Patent 68-00170, South African Patent 68-00323 and Ger. Offen. 2,259,409. Further examples of such dyes may be found in "Synthesis and Properties of Phthalide-type Color Formers", by Ina Fletcher and Rudolf Zink, in "Chemistry and Applications of Leuco Dyes", Muthyala Ed., Plenum Press, New York, 1997. Such dyes may comprise a triarylmethane, diphenylmethane, xanthene, thiazine or spiro compound, for example, Crystal Violet Lactone, N-halophenyl leuco Auramine, rhodamine B anilinolactam, 3-piperidino-6-methyl-7-anilinofluoran, benzoyl leuco Methylene blue, 3-methyl-spirodinaphthofuran, etc. The acidic material may be a phenol derivative or an aromatic carboxylic acid derivative, for example, p-tert-butylphenol, 2,2-bis (p-hydroxyphenyl)propane, 1,1-bis(p-hydroxyphenyl) pentane, p-hydroxybenzoic acid, 3,5-di-tert-butylsalicylic acid, etc. Such thermal imaging materials and various combinations thereof are now well known, and various methods of preparing heat-sensitive recording elements employing these materials also are well known and have been described, for example, in U.S. Pat. Nos. 3,539,375, 4,401, 717 and 4,415,633.

The reagent used to form a colored dye from a colorless precursor may also be an electrophile, as described, for example, in U.S. Pat. No. 4,745,046, a base, as described, for example, in U.S. Pat. No. 4,020,232, an oxidizing agent, as described, for example, in U.S. Pat. Nos. 3,390,994 and 3,647,467, a reducing agent, as described, for example, in U.S. Pat. No. 4,042,392, a chelatable agent, as described, for example, in U.S. Pat. No. 3,293,055 for spiropyran dyes, or a metal ion, as described, for example, in U.S. Pat. No. 5,196, 297 in which thiolactone dyes form a complex with a silver salt to produce a colored species.

The reverse reaction, in which a colored material is rendered colorless by the action of a reagent, may also be used. Thus, for example, a protonated indicator dye may be rendered colorless by the action of a base, or a preformed dye may be irreversibly decolorized by the action of a base, as described, for example, in U.S. Pat. Nos. 4,290,951 and 4,290,955, or an electrophilic dye may be bleached by the action of a nucleophile, as described in U.S. Pat. No. 5,258, 274.

Reactions such as those described above may also be used to convert a molecule from one colored form to another form having a different color.

The reagents used in schemes such as those described above may be sequestered from the dye precursor and brought into contact with the dye precursor by the action of heat, or alternatively a chemical precursor to the reagents themselves may be used. The precursor to the reagent may be in intimate contact with the dye precursor. The action of heat may be used to release the reagent from the reagent precursor. Thus, for example, U.S. Pat. No. 5,401,619 describes the thermal release of a Bronsted acid from a precursor molecule. Other examples of thermally-releasable reagents may be found in "Chemical Triggering", G. J. Sabongi, Plenum Press, New York (1987).

Two materials that couple together to form a new colored molecule may be employed. Such materials include diazonium salts with appropriate couplers, as described, for example, in "Imaging Processes and Materials" pp. 268-270 and U.S. Pat. No. 6,197,725, or oxidized phenylenediamine compounds with appropriate couplers, as described, for example, in U.S. Pat. Nos. 2,967,784, 2,995,465, 2,995,466, 3,076,721, and 3,129,101.

Yet another chemical color change method involves a unimolecular reaction, which may form color from a colorless precursor, cause a change in the color of a colored material, or bleach a colored material. The rate of such a reaction may be accelerated by heat. For example, U.S. Pat. No. 3,488,705 discloses thermally unstable organic acid salts of triarylmethane dyes that are decomposed and bleached upon heating. U.S. Pat. No. 3,745,009 reissued as U.S. Pat. No. Re. 29,168 and U.S. Pat. No. 3,832,212 disclose heat-sensitive compounds for thermography containing a heterocyclic nitrogen atom substituted with an —OR group, for example, a carbonate group, that decolorizes by undergoing homolytic or heterolytic cleavage of the nitrogen-oxygen bond upon heating to produce an RO+ ion or RO' radical and a dye base or dye radical which may in part fragment further. U.S. Pat. No. 4,380,629 discloses styryl-like compounds which undergo coloration or bleaching, reversibly or irreversibly via ring-opening and ring-closing in response to activating energies. U.S. Pat. No. 4,720,449 describes an intramolecular acylation reaction which converts a colorless molecule to a colored form. U.S. Pat. No. 4,243,052 describes a pyrolysis of a mixed carbonate of a quinophthalone precursor which may be used to form a dye. U.S. Pat. No. 4,602,263 describes a thermally-removable protecting group which may be used to reveal a dye or to change the color of a dye. U.S. Pat. No. 5,350,870 describes an intramolecular acylation reaction which may be used to induce a color change. A further example of a unimolecular color-forming reaction is described in "New Thermo-Response Dyes: Coloration by the Claisen Rearrangement and Intramolecular Acid-Base Reaction Masahiko Inouye, Kikuo Tsuchiya, and Teijiro Kitao, Angew. Chem. Int. Ed. Engl. 31, pp. 204-5 (1992).

It is not necessary that the colored material formed be a dye. The colored species may also be, for example, a species such as a metal or a polymer U.S. Pat. No. 3,107,174 describes the thermal formation of metallic silver (which appears black) through reduction of a colorless silver behenate salt by a suitable reducing agent. U.S. Pat. No. 4,242,440 describes a thermally-activated system in which a polyacetylene is used as the chromophore.

Physical mechanisms may also be used. Phase changes leading to changes in physical appearance are well known. The phase change may for example lead to a change in scattering of light. Thermally-activated diffusion of dye from a restricted area, thereby changing its covering power and apparent density, has also been described in "A New Thermographic Process", by Shoichiro Hoshino, Akira Kato, and Yuzo Ando, Symposium on Unconventional Photographic System, Washington D.C. Oct. 29, 1964.

Image-forming layers 14 and 16 may comprise any of the image-forming materials described above, or any other thermally-activated colorants, and are typically from about 0.5 to about 4.0 μm in thickness, preferably about 2 μm. In the case where image-forming layers 14 and 16 comprise more than one layer, each of the constituent layers are typically from about 0.1 to about 3.0 μm in thickness. Image-forming layers 14 and 16 may comprise dispersions of solid materials, encapsulated liquid, amorphous or solid materials or solutions of active materials in polymeric binders, or any combinations of the above.

Interlayer 18 is typically from about 5 to about 30 μm in thickness, preferably about 14-25 μm. Interlayer 18 may comprise any suitable material including inert materials or materials which undergo a phase change upon heating such as where the layer includes a thermal solvent. Typical suitable materials include polymeric materials such as poly (vinyl alcohol). Interlayer 18 may comprise one or more suitable materials and can be made up of one or more layers. Interlayer 18 can be coated from aqueous or solvent solution or applied as a film laminated to the image-forming layers. Interlayer 18 can be opaque or transparent. Where the interlayer is opaque, substrate 12 is preferably transparent so either outer surface of imaging member 10 can be printed with a thermal printhead from one side. In a particularly preferred embodiment, substrate 12 is transparent and interlayer 18 is white. The effect of two-sided printing of a single sheet using only a single thermal printhead, printing on only one side of said sheet, is thereby obtained.

The thermal imaging members of the invention may also include thermal backcoat layers and protective topcoat layers arranged over the outer surface of the image-forming layers. In a preferred embodiment of the imaging member shown in FIG. 8, there are included a barrier coating and a protective topcoat layer over layer 14. The barrier layer may comprise water and gas inhibiting materials. Taken together, the barrier and topcoat layers may provide protection from UV radiation.

In an alternative embodiment of the imaging member shown in FIG. 8, image-forming layer 16 is coated on a thin substrate 12 such as, for example, poly(ethylene terephthalate) having a thickness of about 4.5 μm. Interlayer 18 and image-forming layer 14 are then deposited. Substrate 12 may be opaque or transparent and can be coated, laminated or extruded onto layer 16. In this embodiment of the invention, image-forming layers 14 and 16 can be addressed by a thermal printhead or printheads through the thin substrate 12.

Figure 9:
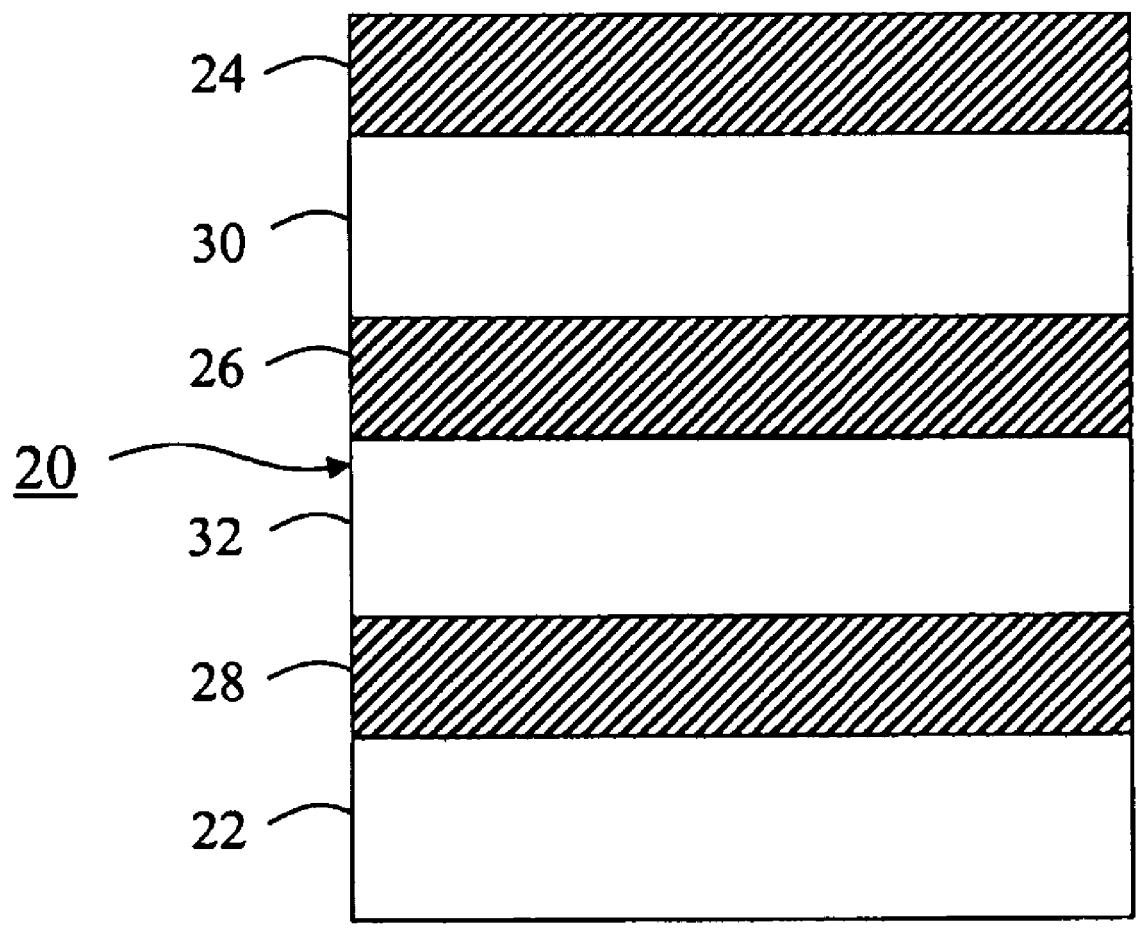
FIG. 9 is a partially schematic, side sectional view of a three color imaging member according to the invention which utilizes thermal delays.

Referring now to FIG. 9 there is seen a three color thermal imaging member according to the invention that utilizes thermal delays to define the printing regions for the colors to be formed. The three color imaging member 20 includes substrate 22, cyan, magenta and yellow image-forming layers, 24, 26 and 28, respectively, and spacer interlayers 30 and 32. Preferably, interlayer 30 is thinner than interlayer 32 so long as the materials comprising both layers have the same heat capacity and thermal conductivity. The activation temperature of layer 24 is higher than that of layer 26 which in turn is higher than that of layer 28.

According to a preferred embodiment of the invention a thermal imaging member in which a plurality of image-forming layers are carried by the same surface of a substrate, as is illustrated in FIG. 9 where three image-forming layers are carried by the same surface of substrate 22, two of the image-forming layers can be imaged by one or more thermal printheads from one surface of the member and at least a third image-forming layer imaged by a separate thermal printhead from the opposite side of the substrate. In the embodiment illustrated in FIG. 9, image-forming layers 24 and 26 are imaged by one or two thermal printheads in contact with the outer surface of color-forming layer 24 and color-forming layer 28 is imaged by a thermal printhead in contact with the outer surface of substrate 22. In this embodiment of the invention, substrate 22 is relatively thin and is typically less than about 20 μm and preferably about 5 μm thick.

In this instance, since the substrate 22 is relatively thin, it is preferred to laminate the imaged member to another base such as label card stock material. Such laminate structures can also provide additional features such as where the image-forming layers are designed to separate when the laminated structure is taken apart, thus providing security features. Also, ultraviolet and infrared security features can be incorporated into the image-forming layers.

By laminating the imaged thermal imaging member to another base, a number of product applications are provided. The base stock can be anything that will support an adhesive bonding agent. Thus, imaging can be carried out on various materials such as transparent or reflective sticker materials which can be laminated onto transparent or reflective carrier materials to provide transparencies or reflective products.

Figure 10:
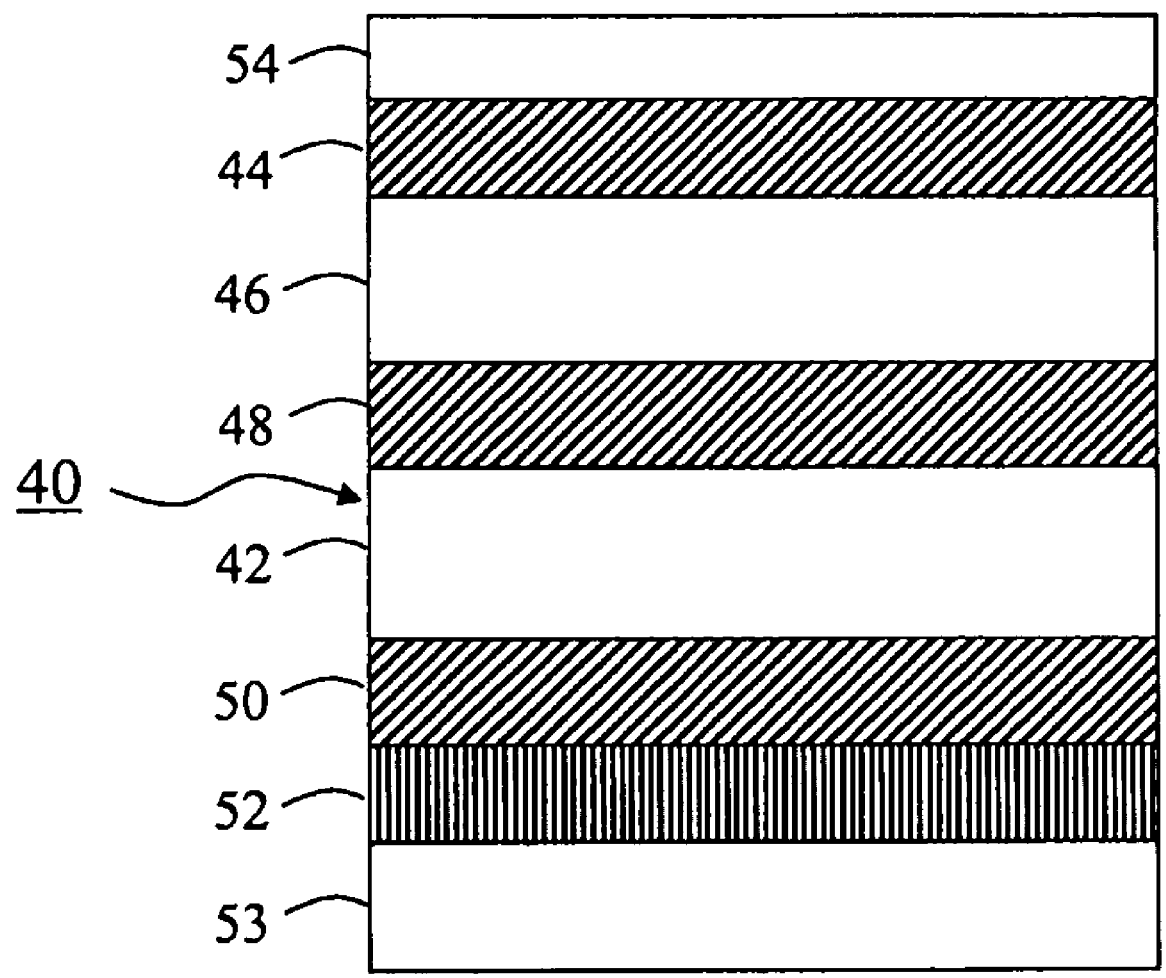
FIG. 10 is a partially schematic, side sectional view of another three color imaging member according to the invention which utilizes thermal delays.

FIG. 10 illustrates a multicolor thermal imaging member according to the invention wherein two image-forming layers are arranged on one side of a substrate and one image-forming layer is arranged on the other side of the substrate. Referring now to FIG. 10 there is seen imaging member 40 which includes a substrate 42, a first image-forming layer 44, interlayer 46, a second image-forming layer 48, a third image-forming layer 50, an optional white or reflective layer 52, a backcoat layer 53 and a topcoat layer 54. In this preferred embodiment substrate 42 is transparent. The image-forming layers and the interlayer may comprise any of the materials described above for such layers. Optional layer 52 may be any suitable reflective material or may comprise particles of a white pigment such as titanium dioxide. Protective topcoat and backcoat layers 53 and 54 may comprise any suitable materials providing the functions of lubrication, heat resistance, UV, water and oxygen barrier properties, etc. Such materials may comprise polymeric binders in which appropriate small molecules are dissolved or dispersed, as will be familiar to those skilled in the art. The activation temperature of image-forming layer 48 is lower than that of image-forming layer 44 and the activation temperature of image-forming layer 50 can be the same as that of image-forming layer 48 or higher or lower and may be as low as possible consistent with the requirement of room temperature and shipping stability.

Figure 11:
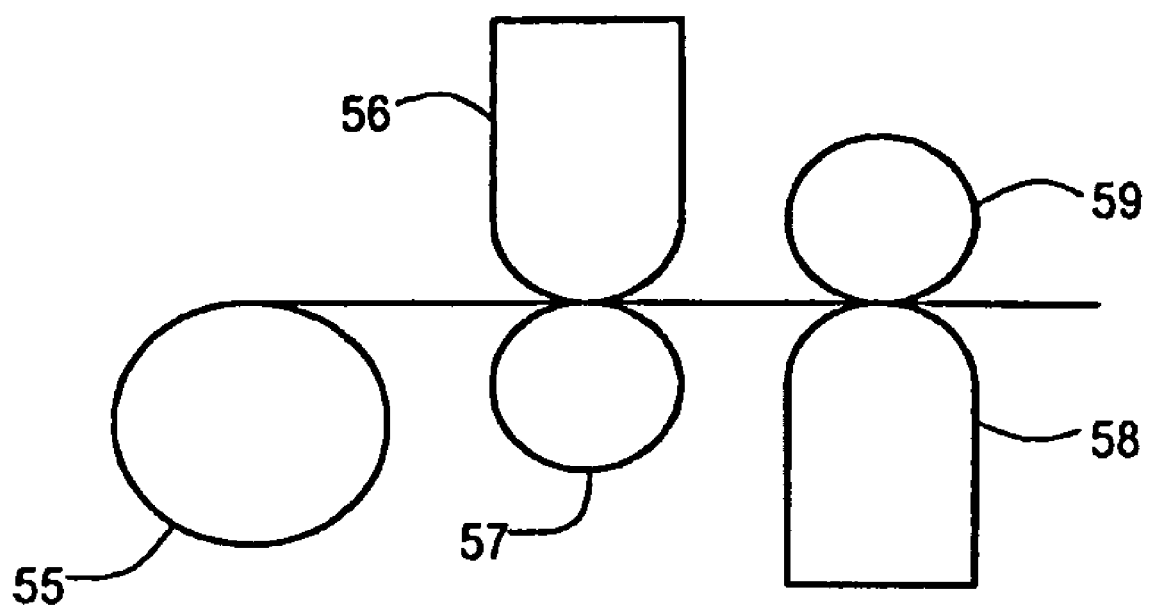
FIG. 11 is a partially schematic, side sectional view of a thermal printing apparatus for carrying out an embodiment of the invention.

In a preferred embodiment, one thermal printhead can be utilized to address independently from one surface of the imaging member two image-forming layers carried by one surface of a substrate and another thermal printhead utilized to address independently from the opposing surface of the imaging member one or more image-forming layers carried by the opposing surface of the substrate. This preferred embodiment of the invention will be described further in detail with respect to the imaging member shown in FIG. 10 although it will be understood that the embodiment may be practiced with other suitable imaging members. The thermal printheads which are brought into contact with opposing surfaces of the imaging member can be arranged directly opposite to each other. Alternatively, and preferably, the respective printheads are offset from each other as is illustrated in FIG. 11. Further, two separate thermal print engines such as an Alps MBL 25, available from Alps Electric Co. Ltd., Tokyo, Japan can be used. However, it is preferred to utilize a thermal printing apparatus where some of the components such as the drive motor and power source are shared by the two print stations.

Referring now to FIG. 11 there is seen a roll of a thermal imaging member 55, for example, the imaging member illustrated in FIG. 10. The imaging member is passed between a first thermal printhead 56 and backing roller 57 and subsequently between a second thermal printhead 58 and backing roller 59. First thermal printhead 56 addresses at least partially independently the first and second image-forming layers 44 and 48, which may be cyan and magenta image-forming layers respectively and second thermal printhead 58 addresses third image-forming layer 50 which may be a yellow image-forming layer.

As discussed previously, in the advantageous multicolor thermal imaging method of the invention, two or more different image-forming layers of a thermal imaging member are addressed at least partially independently from the same surface of the imaging member by a single thermal printhead or multiple thermal printheads. In a particularly preferred embodiment of the invention, two or more different image-forming layers of a thermal imaging member are addressed at least partially independently by a single thermal printhead in a single pass. The methods for doing so can be carried out by the manipulation of control signals applied to a conventional thermal printhead, the heating elements of which are in contact with a surface of the imaging member. A conventional thermal printhead is composed of a linear array of heating elements, each having a corresponding electronic switch capable of connecting it between a common voltage bus and ground. The voltage of the common bus and the time that the electrical switch is closed will together affect the temperature and time of the thermal exposure.

In order to describe the methods for controlling temperature in the practice of the invention, the operation of the thermal printhead will now be described in more detail. In normal use of the printhead, a fixed voltage is applied to the printhead and the modulation of density on the image formed is achieved by controlling the length of time that power is applied to the heating elements. The control system may be discrete, that is, the time interval used to print each pixel on the imaging member is divided into a number of discrete subintervals and the heating element may be either active or inactive during each of the subintervals. Moreover, the duty cycle of the heating within each subinterval may be controlled. For example, if a heating element is active during one of the subintervals and the duty cycle for that subinterval is 50%, then power will be applied to the heating element during 50% of that particular subinterval. This process is illustrated in FIG. 12.

Figure 12:
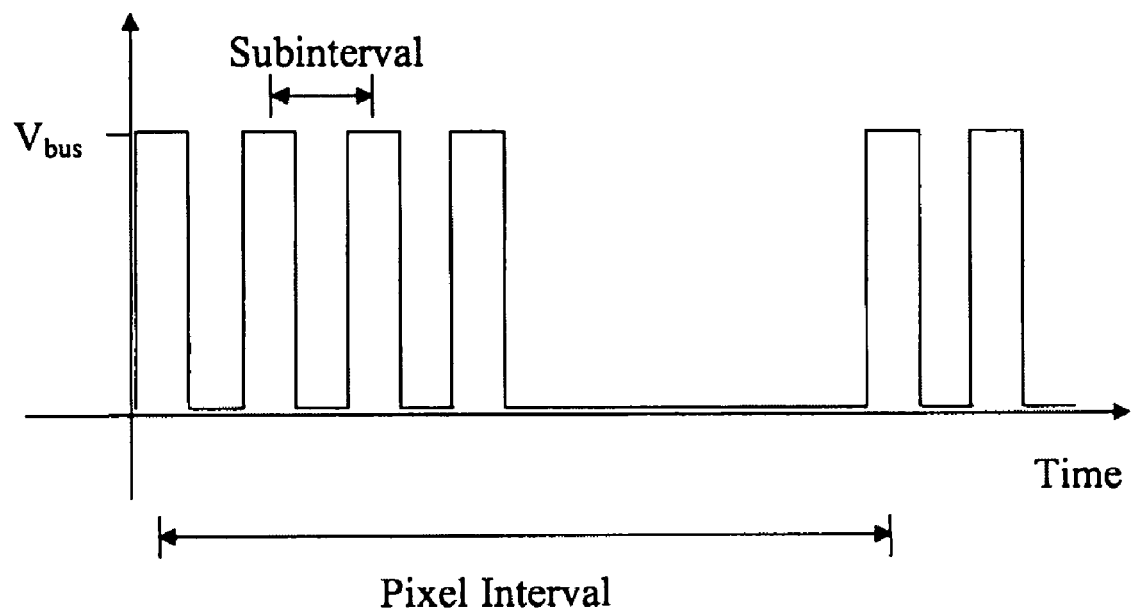
FIG. 12 is a graphical representation of a method for applying voltage to a conventional thermal printhead during a prior art thermal imaging method.

FIG. 12 illustrates a printhead application in which each pixel-printing interval is divided into seven equal subintervals. For the case illustrated, the pixel is active for the first four subintervals and then inactive for three subintervals. In addition, the voltage pulses that are applied have a 50% duty cycle, so that within each active subinterval, the voltage is on for half of the subinterval and off for the other half. Insofar as the temperature of the heating element is responsive to the power applied, it is easily appreciated by those skilled in the art that this temperature may be affected by the common bus voltage and by the duty cycle of the pulses. In fact, if the individual subintervals are much shorter than the thermal time constant for heating and cooling of the medium, then the effect of changing the voltage of the common bus may be mimicked by the effect of changing the duty cycle of the pulses.

This offers at least two possibilities for controlling the average power applied to the printhead. The first is that the temperature of a printhead heating element may be controlled by manipulating the voltage on the common bus, while the duty cycle remains fixed at some predetermined values for each subinterval. In this instance, the temperature is controlled primarily by the choice of bus voltage, and the time is controlled by the selection of the number of subintervals for which the heater is activated.

The second possibility is the control of the heater temperature by manipulation of the duty cycles of the subintervals while the bus voltage remains fixed. Best use of this method of temperature control requires that the subintervals be short compared to the thermal time-constant of the imaging member, so that the temperature in the image-forming layer responds to the average power applied during the subinterval rather than tracking the rapid voltage transitions. For a typical printhead in this application, the subinterval time may be ten or more times shorter than the thermal response time of the imaging member so this condition is well satisfied.

The choice between these two methods of control, or of a combination of the two, is a matter of practical design. For example, in a multiple-pass system in which each color layer is printed in a separate pass of the imaging member beneath the printhead, it is not difficult to change the voltage applied to the printhead common bus on each pass. The applied voltages can then be easily adjusted for best results. On the other hand, for a single-pass system in which two or more color layers are written in quick succession at each pixel, it is generally more convenient and economical to operate the head at a fixed voltage. In this case the temperature changes are preferably effected by a predetermined sequence of duty cycles of the subintervals.

Figure 13:
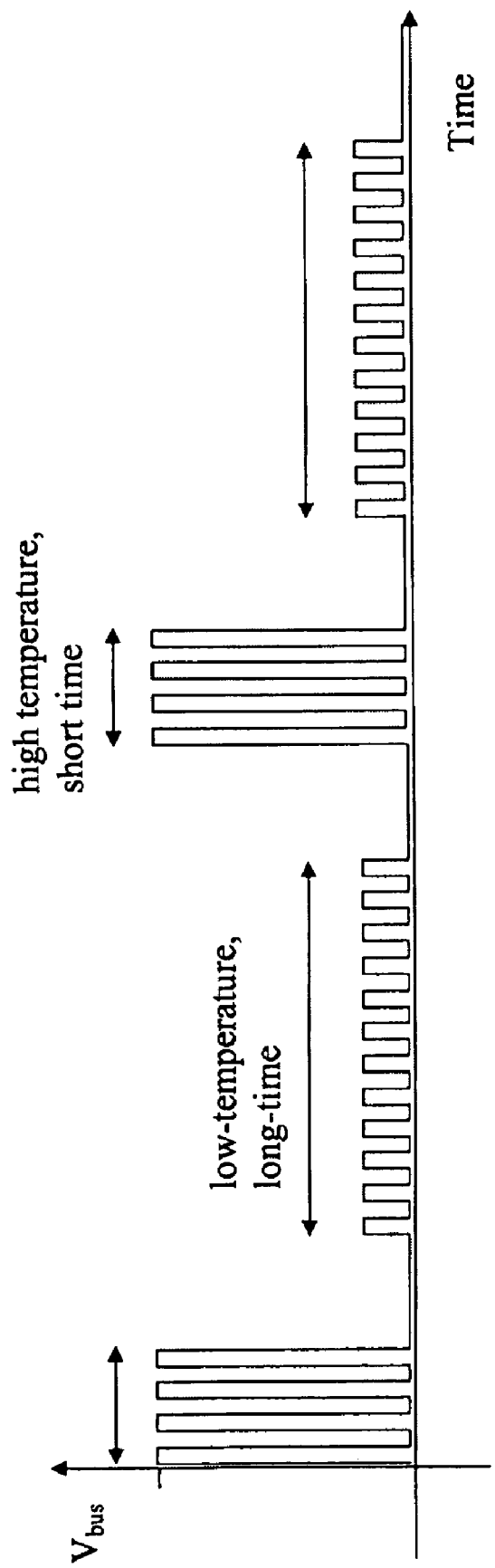
FIG. 13 is a graphical representation of a method for applying voltage to a conventional thermal printhead in the practice of an embodiment of the thermal imaging system of the invention.
Figure 14:
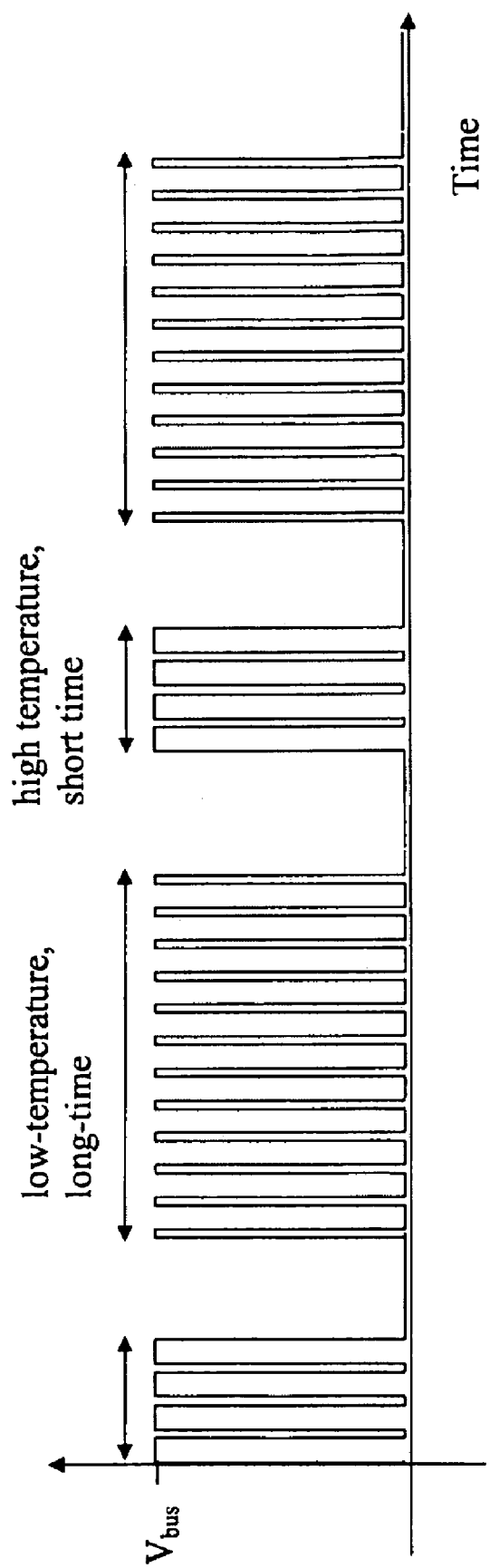
FIG. 14 is a graphical representation of another method for applying voltage to a conventional thermal printhead in the practice of an embodiment of the thermal imaging system of the invention.

The two techniques are illustrated in FIGS. 13 and 14 which are based on a two image-forming layer system in which one image-forming layer is activated by a high temperature applied for short times, and the other image-forming layer is activated by a lower temperature applied for longer times.

FIG. 13 illustrates schematically a method of alternately writing on the two image-forming layers by changing the bus voltage and the time over which the heater is activated. Initially the writing is at high-temperature for a short time, and is accomplished by a short series of high voltage pulses. Subsequently, writing is done at a low temperature for a long time by using a longer sequence of lower-voltage pulses. The sequence then repeats to alternate back and forth between color-forming layers.

FIG. 14 illustrates schematically another method of alternately writing on two image-forming layers. In this case the pulse duty cycle is varied rather than the pulse voltages. The high-temperature, short-time heating is performed with a short sequence of pulses having a large duty cycle. The low-temperature, long-time heating is performed with a longer sequence of pulses having a low duty cycle.

The method illustrated in FIG. 14 for forming an image in an imaging member of the invention with two image-forming layers will now be described in more detail. The time interval for forming a single pixel of an image in the region of the thermal imaging member that is in thermal contact with a heating element of the printhead is divided into a plurality of temporal subintervals (hereinafter referred to as mini-subintervals), as described above. The mini-subintervals may be equal or different in duration to each other. In a preferred embodiment, the mini-subintervals are of equal duration. The time interval for forming a single pixel is also divided into a first and a second time interval, the first time interval being shorter than the second time interval. The first time interval is used to form an image in a first color-forming layer of the thermal imaging member (which may be a higher-temperature color-forming layer), and the second time interval is used to form an image in a second color-forming layer of the thermal imaging member (which may be a lower-temperature color-forming layer). The first time interval and the second time interval will, between them, contain most or all of the mini-subintervals described above. In the case when the mini-subintervals are of equal duration, the first time interval will contain fewer mini-subintervals than the second time interval. It is preferred that the second time interval be at least twice as long as the first time interval. It is not necessary that the first time interval precede the second time interval. It is possible that, in combination, the first time interval and the second time interval do not occupy the entire time interval for printing a single pixel. However, it is preferred that, in combination, the first time interval and the second time interval occupy most of the time interval for printing a single pixel.

A heating element of the printhead is activated by applying a single pulse of electrical current during a mini-subinterval. The proportion of the duration of the mini-subinterval (i.e., the duty cycle) during which this pulse of electrical current is applied may take any value between about 1% and 100%. In a preferred embodiment, the duty cycle is a fixed value, $p_1$, during the first time interval, and a second fixed value, p2, during the second time interval, and p1>p2. In a preferred embodiment, p1 approaches 100%. It is preferred that p1 be greater than or equal to twice the length of p2.

Within the first time interval and the second time interval, different degrees of image formation within the image-forming layers (i.e., different gray levels of the image) may be achieved by selecting a particular group of mini-subintervals, from among the total number of mini-subintervals available, during which a pulse of electrical current will be applied. The different degrees of image formation may be achieved either by changing the size of dots printed in the image-forming layer(s), or by changing the optical density of dots printed in the image-forming layer(s), or by a combination of variations in dot size and optical density.

Although the method has been described above with reference to a single pixel, printed by a single heating element of the printhead, it will be apparent to one of skill in the art that a printhead may contain a linear array of many such heating elements, and that the thermal imaging member may be translated beneath this linear array, in a direction orthogonal to said linear array, such that an image of a line of pixels may be formed in the thermal imaging member during the time interval for forming an image of a single pixel by a single heating element. Further, it will be clear to one of skill in the art that images may be formed in either or both of the image-forming layers of the thermal imaging member during the time interval for forming an image of a single pixel by a single heating element, the image in the first image-forming layer being formed by the energy applied during the first time interval specified above, and the image formed in the second image-forming layer being formed by the energy applied during the second time interval specified above. Thus, both images may be formed when the thermal imaging member is translated once beneath the printhead, i.e., in a single pass of the printhead. In practice, the energy applied during the first time period will heat the second image-forming layer, and the energy applied during the second time period will heat the first image-forming layer. Those of skill in the art will appreciate that suitable adjustment of the energy supplied during both time periods will be required in order to compensate for these effects, as well as to compensate for other effects, such as thermal history and unintended heating by adjacent heating elements.

In actual practice, the number of pulses can be quite different than that shown in FIGS. 13 and 14. In a typical printing system, the pixel-printing interval may be in the range of 1-100 milliseconds and the mini-subinterval length may be in the range of 1-100 microseconds. There are therefore typically hundreds of mini-subintervals within the pixel-printing interval.

The duty cycle within a mini-subinterval can generally be changed from pulse to pulse and, in another preferred embodiment, this technique may be used to tailor the average power applied to the heating elements to achieve good printing results.

Of course, it will be apparent to those skilled in the art that where it is desired to address independently more than two image-forming layers of the imaging member in a single pass, the available number of mini-subintervals and the range of duty cycles must be divided into a correspondingly larger number of combinations, each capable of printing at least partially independently on one of the image-forming layers.

In a particularly preferred embodiment of the invention, three different image-forming layers carried by the same surface of the substrate of the thermal imaging member are addressed from the same surface of the imaging member by one thermal printhead in a single pass. This embodiment will be described in relation to FIG. 9. The substrate 22 may be any of the materials previously described. Image-forming layer 28 comprises a meltable leuco dye having a melting point of from about 90° C. to about 140° C. and a developer material having a melting point in the same range, and optionally includes a thermal solvent having a melting point in the same range. In this embodiment layer 28 is about 1 to 4 µm thick and is coated from an aqueous dispersion. Interlayer 32 is about 5 to about 25 µm thick and comprises a water-soluble inert material which may be any suitable water-soluble interlayer material previously mentioned. The second image-forming layer, 26, comprises a leuco dye and a developer material, each having a melting point of from about 150° C. to about 280° C., and optionally includes a thermal solvent having a melting point in the same range. The second image-forming layer has a thickness of from about 1 to about 4 µm and is coated from a water dispersion. The second interlayer, 30, comprises a water-soluble inert material, which may be any of the water-soluble interlayer materials previously mentioned, and has a thickness of from about 3 to about 10 µm. The third image-forming layer, 24, comprises either: a) a meltable leuco dye having a melting point of at least 150° C., preferably 250° C., and a developer material having a melting point of at least 250° C., preferably 300° C., optionally including a thermal solvent; or b) a molecule which forms color unimolecularly at a temperature of at least 300° C. in about from 0.1 to about 2 milliseconds (a suitable material is Leuco Dye III described in detail below herein). The third image-forming layer has a thickness of from about 1 to about 4 µm and is coated from a water dispersion. This particularly preferred thermal imaging member further includes an overcoat layer such as is described in Example I below.

Figure 15:
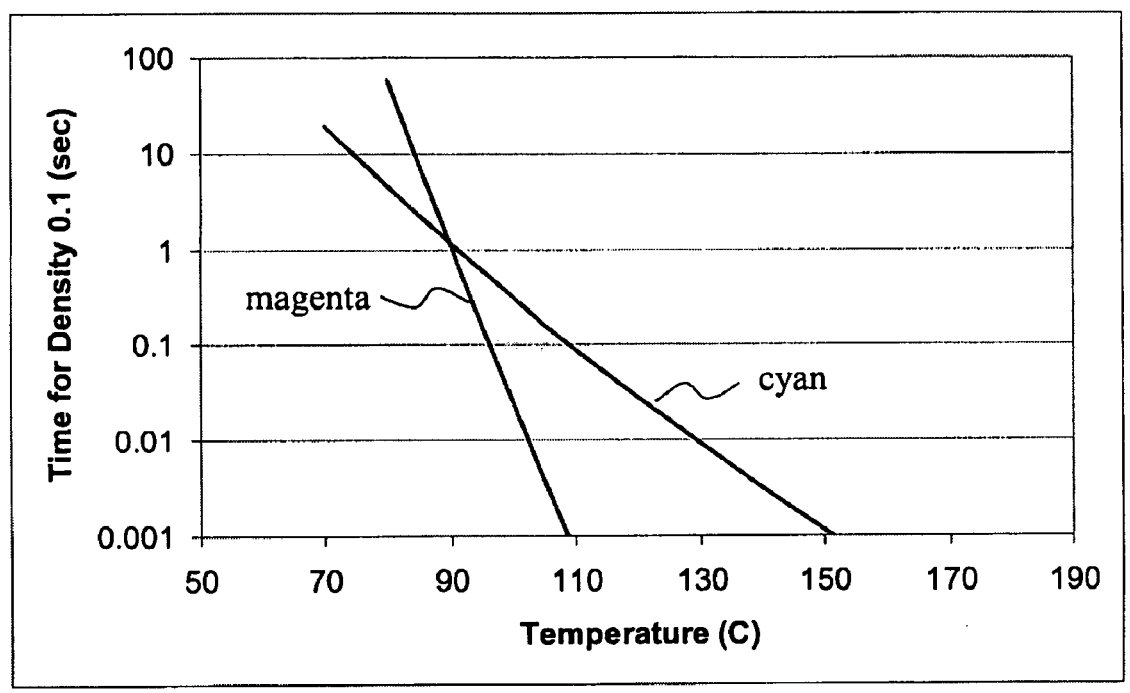
FIG. 15 is a graphical representation showing the development time of two dyes as a function of temperature.

As described above, FIGS. 8-10 relate to a thermal imaging member for which thermal diffusion is the technique used for partitioning the time-temperature domain. Another technique for partitioning the time-temperature domains of a thermal imaging member in accordance with the invention resides in the exploitation of phase transitions. The phase transitions, for example, may be the result of a natural melting or glass transitions of the dye itself, or may be achieved by incorporating thermal solvents into the dye layers. When a measurement is made of the time t required to reach a certain optical density of the dye when the dye layer is held at a fixed temperature T it is typically found that the relationship between the temperature and the time is expressed by an Arrhenius curve:

$$\log(t) \sim (-A + B/T)$$

where A and B are constants that may be determined experimentally. When measurements are taken in the temperature range of a melting transition, it is often found that the slope, B, far exceeds that normally found in regions removed from phase transitions. As a result, the Arrhenius curve for a normal dye layer (i.e., one in which no phase change is associated with imaging, as will be the case for diffusion-controlled reactions, for example) and for a melting dye layer may cross at a steep angle, as shown in FIG. 15 for a cyan dye, namely 3-(1-n-butyl-2-methylindol-3-yl)-3-(4-dimethylamine-2-methylphenyl)phthalide, available from Hilton-Davis Company, in conjunction with a Lewis Acid developer, the zinc salt of 3,5-di-t-butylsalicylic acid and a naturally melting magenta dye, namely Solvent Red 40, available from Yamamoto Chemical Company in conjunction with an acid developer, bis(3-allyl-4-hydroxyphenyl)sulfone, available from Nippon Kayaku Company, Ltd. The two curves show the time required to reach a density of 0.1 for each dye. Such a relationship may itself be used as the basis for a multicolor thermal printing system according to one embodiment of the present invention, insofar as FIG. 15 shows that below the crossing temperature the cyan dye turns on more quickly than the magenta dye and above the crossing temperature the magenta dye turns on more quickly than the cyan dye. For the two dyes shown, it is seen that it would take more than one second per line to print cyan without magenta contamination. To overcome this limitation, the dyes or their environment may be modified to move the crossing point to a shorter time region. However, the system may be made even more desirable from a time consideration by "burying" the magenta dye layer as described above in FIG. 8.

Figure 16:
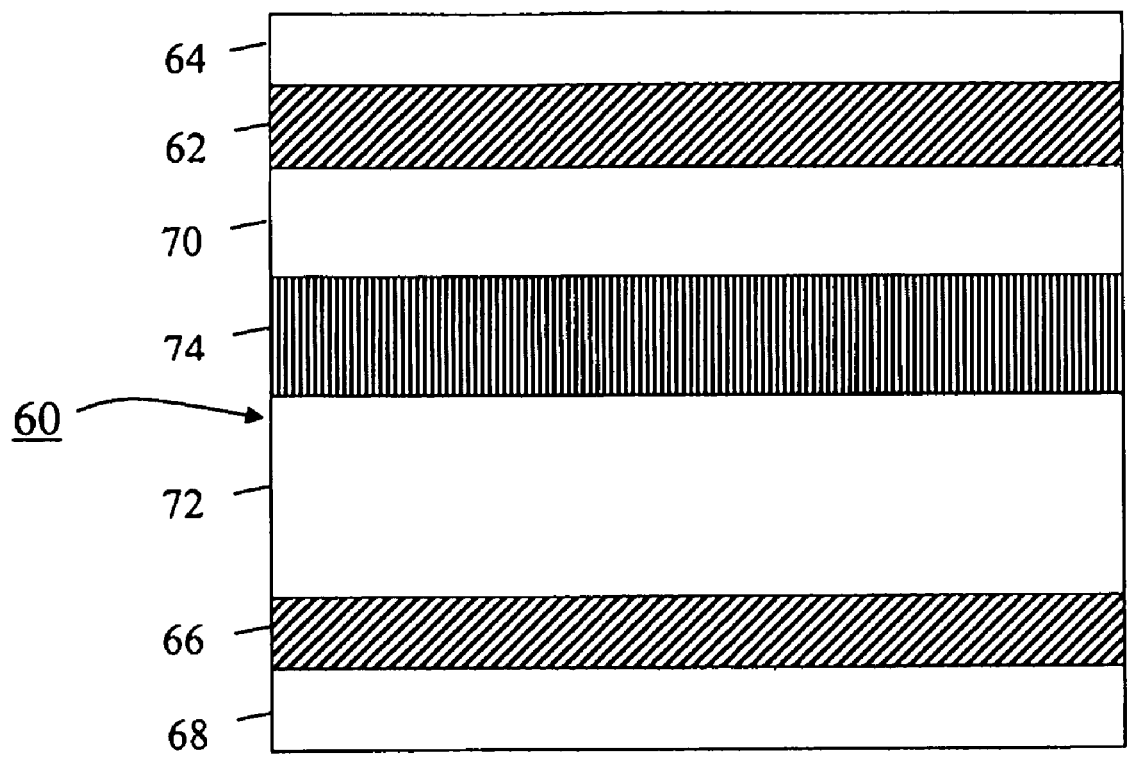
FIG. 16 is a partially schematic, side sectional view of a multicolor imaging member according to the invention which utilizes chemical diffusion and dissolution.

Yet another technique for partitioning the time-temperature domains of a thermal imaging member in accordance with the invention is illustrated in FIG. 16. This technique employs a multicolor thermal imaging member 60 according to the invention which includes a layer of a magenta image-forming material 62, in this illustrative instance a leuco dye, associated with a layer 64 of an acid developer material having a melting point, $T_7$ and a layer of a cyan image forming material 66 associated with a layer 68 of an acid developer material having a melting point, $T_8$. The imaging member 60 also includes first and second timing layers, 70 and 72, respectively, and a layer 74 of a fixing material having a melting point, $T_9$. Imaging member 60 may also include a substrate (not shown) which may be positioned adjacent layer 64 or layer 68.

There are known leuco dyes that form color irreversibly upon contact with suitable developers. With this type of dye, layer 74 of fixing material functions to terminate, but not reverse, color formation in either of the two image-forming layers, 62 and 66, respectively. The fixing material, however, must pass through the timing layers, 70 and 72, respectively, by diffusion or dissolution to terminate color formation within the image-forming layers. As shown, one of the timing layers, in this illustrative instance timing layer 70, is thinner than the other timing layer 72 and therefore the fixing material arrives at cyan image-forming layer 66 later than when it arrives at magenta image-forming layer 62. Thus, a timing difference is introduced between the formation of the two colors in accordance with the invention.

The developer layers 64 and 68 must melt before the developer materials can combine with the leuco dyes. By selecting the materials in the developer layer such that they melt at different temperatures, a temperature difference is introduced between the formation of the two colors in accordance with the invention. In this illustrative embodiment $T_7$ is lower than $T_8$, e.g., $T_7=120°$ C. and $T_8=140°$ C. In this embodiment of the invention various possibilities are provided. Where the imaging member is heated to a temperature less than 120° C., then neither of the developer layers, 64 and 68, will melt and no color will be formed. Further, provided that the thermal energy applied to the imaging member is sufficient to melt the fixing material, the melting point of the fixing layer, $T_9$, being less than the melting points, $T_7$ and $T_8$, respectively, of the developer layers, (e.g., $T_9=100°$ C.) the fixing material will diffuse through the timing layers 70 and 72 and eventually fix both image-forming layers so that subsequent temperature applications will not cause any color to form.

When the imaging member 60 is heated to a temperature between $T_7$ and $T_8$ then developer material in layer 64 will melt and begin to mix with the magenta leuco dye precursor to form color. The amount of color formation is dependent primarily upon the amount of time the temperature of the developer layer 64 remains above $T_7$. Following this thermal exposure the temperature of the imaging member is lowered below $T_7$ and held at that temperature until the fixing material arrives and prevents any further color formation. When the temperature of the imaging member is held below $T_7$ for a longer period of time the fixing material will also arrive at the cyan image-forming layer 66 and prevent any future formation of color by this layer. In this manner a selectable amount of magenta color can be formed without forming any cyan color.

In a similar manner a selectable amount of cyan can be formed in accordance with the invention without forming any magenta. Initially, the imaging member is heated to a temperature above $T_9$ but below $T_7$ in order to allow the fixing material to arrive at magenta image-forming layer 62 and inactivate it, thereby preventing it from subsequently forming any color. Subsequently, the temperature is raised above $T_8$ to cause the developer material in layer 68 to combine with the cyan leuco dye precursor and begin the formation of cyan color. The amount of cyan color formation is primarily dependent upon the amount of time the temperature of the imaging member is maintained above $T_8$. It will be appreciated that this procedure will also cause the developer material in layer 64 to melt but no formation of magenta color results since the magenta dye precursor was previously fixed. Subsequently, the temperature of the imaging member 60 is lowered below $T_7$ and held at that level until the fixing material arrives at layer 66 to prevent the formation of any further cyan.

In order to print both magenta and cyan, the sequence of heat pulses applied to the imaging member 60 is such as to carry out a combination of the steps described above to create cyan and magenta, respectively. Initially, the imaging member 60 is heated to a temperature above $T_7$ to produce a selectable density of magenta. The temperature is then lowered below $T_7$ for a period of time sufficient to fix the magenta precursor layer 62 followed by raising the temperature above $T_8$ to produce a selectable density of cyan color and then once again lowering the temperature below $T_7$ to fix the cyan precursor layer 66.

As previously described, a wide variety of different irreversible chemical reactions may be used to achieve a color change in a layer. The fixer material used in any particular instance will depend upon the choice of mechanism exploited to achieve the color change. For example, the mechanism may involve the coupling of two colorless materials to form a colored dye. In this case, the fixing reagent would react with either of the two dye precursor molecules to form a colorless product thereby interfering with any further formation of dye.

Figure 17:
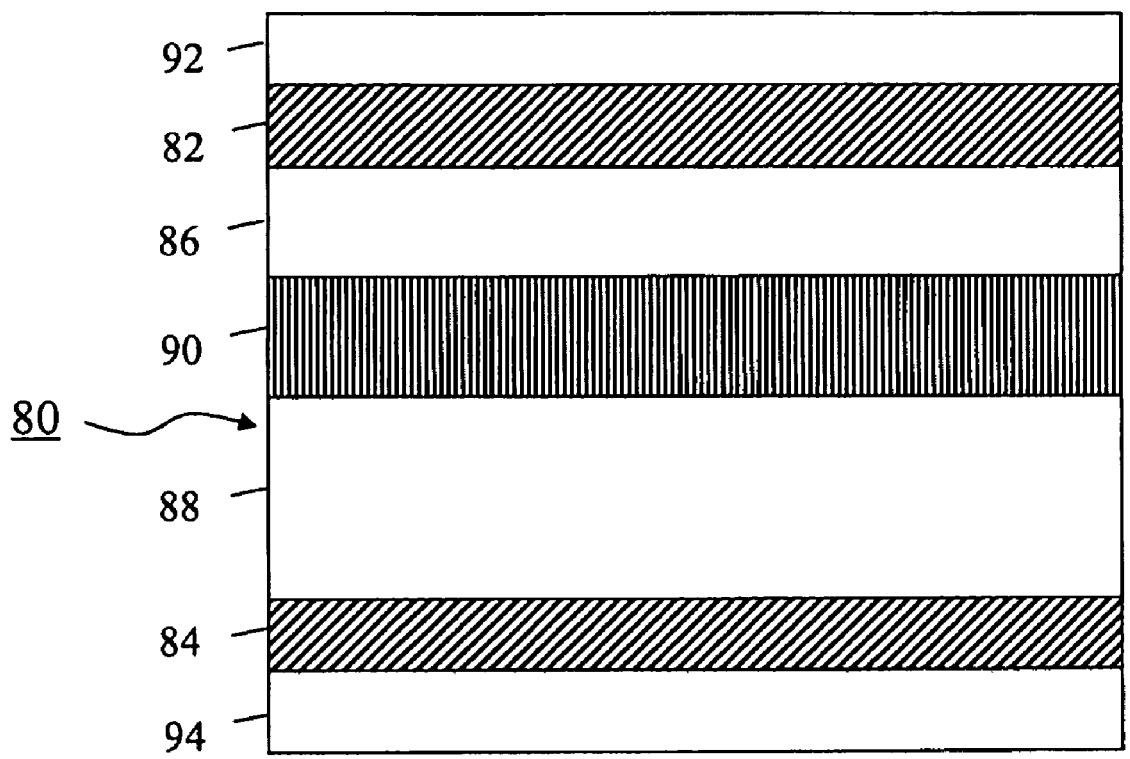
FIG. 17 is a partially schematic, side sectional view of a negative-working multicolor imaging member according to the invention.

A negative working version of a two-color imaging member according to the invention may also be devised according to the same principles, as illustrated in FIG. 17. In this implementation the dye layers are initially colored, and they remain so unless an adjacent layer of decolorizing reagent thermally activated before the arrival of the fixing reagent through a timing layer. Referring now to FIG. 17 there is seen a negative working thermal imaging member 80 according to the invention which includes a first image-forming layer 82, e.g., a magenta dye layer, a second image-forming layer 84, e.g., a cyan dye layer, first and second timing layers 86 and 88, respectively, a fixing layer 90 and first and second decolorizer layers 92 and 94, respectively. Imaging member 80 may also include a substrate (not shown) which may be positioned adjacent layer 92 or layer 94.

For example, the magenta and cyan dyes may be irreversibly decolorized by exposure to a base as described in U.S. Pat. Nos. 4,290,951 and 4,290,955. Where the reagent layer 90 contains an acidic material and the acid is chosen so as to neutralize the basic material in the decolorizing layers 92 and 94, it will be appreciated that where the acid arrives in the dye-containing layers before the base, the base will not be able to decolorize the magenta or cyan dye whereas when the base arrives before the acid, irreversible decolorization will have occurred. As discussed above in relation to the embodiment shown in FIG. 8, the third color may be obtained by any other printing modality including thermally printing the third color from the back of the imaging member as described in relation to FIGS. 9 and 10.

Figure 18:
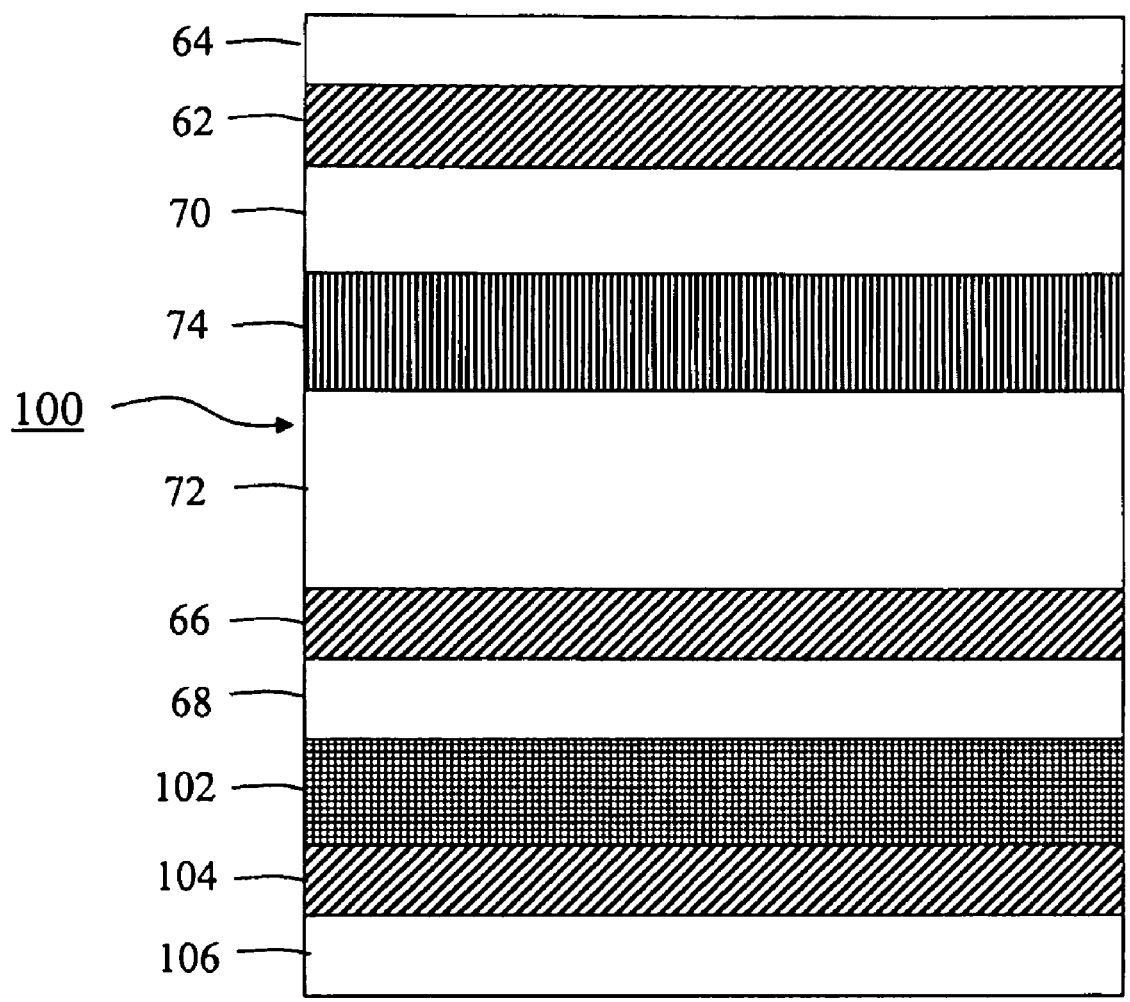
FIG. 18 is a partially schematic, side sectional view of a three color imaging member according to the invention which utilizes chemical diffusion and dissolution.

FIG. 18 illustrates a three-color thermal imaging member according to the invention. Referring now to FIG. 18 there is seen imaging member 100 which includes the layers shown for the imaging member 60 which is illustrated in FIG. 16 and these layers are designated by the same reference numerals. Imaging member 100 also includes a buffer layer 102, yellow dye precursor layer 104 and a third acid developer layer 106 in which the developer material has a melting point $T_{10}$ which is higher than $T_7$ and $T_8$. After forming the desired color densities in cyan and magenta as described above in relation to FIG. 16, the temperature of the imaging member can be raised above $T_{10}$ to form a selectable density of yellow dye. It should be noted that where $T_{10}$ is a temperature higher than the imaging member 100 is likely to encounter during its useful life, it is not necessary to inactivate the yellow dye precursor subsequent to writing the yellow image. Imaging member 100 may also include a substrate (not shown) which may be positioned adjacent layer 64 or layer 106.

In choosing the layer dimensions for the imaging members illustrated in FIGS. 16 and 18 it is advantageous to have the timing layer 70 be as thin as possible but not substantially thinner than dye layer 62. Timing layer 72 typically will be about two to three times the thickness of timing layer 70.

It will be appreciated that the practice of the invention according to the methods just described relies upon the diffusion or dissolution of chemical species, rather than the diffusion of heat. Whereas the thermal diffusion constant is normally relatively insensitive to temperature, the diffusion constants for chemical diffusion are typically exponentially dependent on the inverse of the temperature, and therefore more sensitive to changes in the ambient temperature. Moreover, when dissolution is chosen as the time-determining mechanism, numerical simulations show that the timing is typically quite critical because the colorization process occurs relatively quickly once the timing layer has been breached.

Any chemical reaction in which color is formed irreversibly is, in principle, amenable to the fixing mechanism described above. Materials that form color irreversibly include those in which two materials couple together to form a dye. The fixing mechanism is achieved by introducing a third reagent that couples preferentially with one of the two dye-forming materials to form a colorless product.

In addition to the methods recited above, chemical thresholds can also be used to partition the time-temperature domain in accordance with the multicolor thermal imaging system of the invention. As an example of this mechanism, consider a leuco dye reaction in which the dye is activated when it is exposed to an acid. If, in addition to the dye, the medium contains a material significantly more basic than the dye, which does not change color when protonated by the acid, addition of acid to the mixture will not result in any visible color change until all of the more basic material has been protonated. The basic material provides for a threshold amount of acid which must be exceeded before any coloration is evident. The addition of acid may be achieved by various techniques such as by having a dispersion of acid developer crystals which melt and diffuse at elevated temperatures or by having a separate acid developer layer which diffuses or mixes with the dye layer when heated.

A certain time delay is involved in reaching the acid level required to activate the dye. This time period may be adjusted considerably by adding base to the imaging member. In the presence of added base, as described above, there is an interval of time required for the increasing amount of acid to neutralize the base. Beyond this time period, the imaging member will be colorized. It will be seen that the same technique can be used in a reverse sequence. A dye that is activated by base can have its timing increased by the addition of a background level of acid.

In this particular embodiment, it is notable that the diffusion of the acid or base developer material into the dye-containing layer is typically accompanied by diffusion of dye in reverse into the developer layer. When this occurs, color formation may begin almost immediately since the diffusing dye may find itself in an environment where the developer material level far exceeds the threshold level necessary to activate the dye. Accordingly, it is preferred to inhibit the dye from diffusing into the developer layer. This may be accomplished, for example, by attaching long molecular chains to the dyes, by attaching the dyes to a polymer, or by attaching the dye to an ionic anchor.

EXAMPLES

The thermal imaging system of the invention will now be described further with respect to specific preferred embodiments by way of examples, it being understood that these are intended to be illustrative only and the invention is not limited to the materials, amounts, procedures and process parameters, etc. recited therein. All parts and percentages are by weight unless otherwise specified.

The following materials were used in the examples described below:

Leuco Dye I, 3,3-bis(1-n-butyl-2-methyl-indol-3-yl)phthalide (Red 40, available from Yamamoto Chemical Industry Co., Ltd., Wakayama, Japan);

Leuco Dye II, 7-(1-butyl-2-methyl-1H-indol-3-yl)-7-(4-diethylamino-2-methyl-phenyl)-7H-furo[3,4-b]pyridin-5-one (available from Hilton-Davis Co., Cincinnati, Ohio);

Leuco Dye III, 1-(2,4-dichloro-phenylcarbamoyl)-3,3-dimethyl-2-oxo-1-phenoxy-butyl]-(4-diethylamino-phenyl)-carbamic acid isobutyl ester, prepared as described in U.S. Pat. No. 5,350,870;

Leuco Dye IV, Pergascript Yellow I-3R, available from Ciba Specialty Chemicals Corporation, Tarrytown, N.Y.;

Acid Developer I, bis(3-allyl-4-hydroxyphenyl)sulfone, available from Nippon Kayaku Co., Ltd, Tokyo, Japan;

Acid Developer II, PHS-E, a grade of poly(hydroxy styrene), available from TriQuest, LP, a subsidiary of ChemFirst Inc., Jackson, Miss.;

Acid Developer III, zinc salt of 3,5-di-t-butyl salicylic acid, available from Aldrich Chemical Co., Milwaukee, Wis.;

Acid Developer IV, zinc salt of 3-octyl-5-methyl salicylic acid, prepared as described in Example 7 below;

Airvol 205, a grade of poly(vinyl alcohol) available from Air Products and Chemicals, Inc., Allentown, Pa.;

Airvol 350, a grade of poly(vinyl alcohol) available from Air Products and Chemicals, Inc., Allentown, Pa.;

Airvol 540, a grade of poly(vinyl alcohol) available from Air Products and Chemicals, Inc., Allentown, Pa.;

Genflo 305, a latex binder, available from Omnova Solutions, Fairlawn, Ohio;

Genflo 3056, a latex binder, available from Omnova Solutions, Fairlawn, Ohio;

Glascol C44, an aqueous polymer dispersion, available from Ciba Specialty Chemicals Corporation, Tarrytown, N.Y.;

Joncryl 138, a binder, available from S.C. Johnson, Racine, Wis.;

Irganox 1035, an antioxidant, available from Ciba Specialty Chemicals Corporation, Tarrytown, N.Y.;

Aerosol-OT, a surfactant available from Dow Chemical, Midland, Mich.;

Dowfax 2A1, a surfactant available from Dow Chemical Corporation, Midland, Mich.;

Ludox HS40, a colloidal silica available from DuPont Corporation, Wilmington, Del.;

Nipa Proxel, a bactericide available from Nipa Inc., Wilmington, Del.;

Pluronic 25R2, a surfactant available from BASF, Ludwigshaven, Germany;

Tamol 731, a polymeric surfactant (sodium salt of polymeric carboxylic acid) available from Rohm and Haas Company, Philadelphia, Pa.;

Triton X-100, a surfactant available from Dow Chemical Corporation, Midland, Mich.;

Zonyl FSN, a surfactant, available from DuPont Corporation, Wilmington, Del.;

Zonyl FSA, a surfactant, available from DuPont Corporation, Wilmington, Del.;

Hymicron ZK-349, a grade of zinc stearate available from Cytech Products, Inc., Elizabethtown, Ky.;

Klebosol 30V-25, a silica dispersion available from Clariant Corporation, Muttenz, Switzerland;

Titanium dioxide, a pigment available from DuPont Corporation, Wilmington, Del.;

Glyoxal, available from Aldrich Chemical Co., Milwaukee, Wis.;

Melinex 534, a white polyethylene terephthalate) film base of approximately 96 microns' thickness, available from DuPont Corporation, Wilmington, Del.);

Cronar 412, a clear poly(ethylene terephthalate) film base of approximately 102 microns' thickness, available from DuPont Corporation, Wilmington, Del.

Example I

A two color imaging member such as is illustrated in FIG. 8 and further including an overcoat layer deposited on the cyan color-forming layer was prepared as follows:

The magenta image-forming layer was prepared as follows:

A leuco magenta dye, Leuco Dye I, was dispersed in an aqueous mixture comprising Airvol 205 (4.5% of total solids) and surfactants Pluronic 25R2 (1.5% of total solids) and Aerosol-OT (5.0% of total solids) in deionized water, using an attriter equipped with glass beads, stirred for 18 hours at 2° C. The average particle size of the resulting dispersion was about 0.28 microns and the total solid content was 19.12%.

Acid Developer I was dispersed in an aqueous mixture comprising Airvol 205 (7.0% of total solids), Pluronic 25R2 (1.5% of total solids), and deionized water, using an attriter equipped with glass beads and stirred for 18 hours at 2° C. The average particle size of the resulting dispersion was about 0.42 microns, and the total solid content was 29.27%.

The above dispersions were used to make the magenta coating fluid in proportions stated below. The coating composition thus prepared was coated onto Melinex 534 using a Meyer rod, and dried. The intended coating thickness was 2.9 microns.

| Ingredient | % solids in dried film |
|---|---|
| Leuco Dye I | 10.74% |
| Acid Developer I | 42.00% |
| Genflo 3056 | 47.05% |
| Zonyl FSN | 0.21% |

A thermally insulating interlayer was deposited onto the magenta imaging layer as follows:

A coating fluid for the interlayer was prepared in proportions stated below. The image interlayer coating composition thus prepared was coated on the magenta imaging layer using a Meyer rod for an intended thickness of 13.4 microns, and was dried in air.

| Ingredient | % solids in dried film |
|---|---|
| Glascol C44 | 99.50% |
| Zonyl FSA | 0.50% |

Cyan image-forming layers C1-C3 were deposited on the thermally insulating layer as follows:

C1 Cyan Developer Layer.

Acid Developer III was dispersed in an aqueous mixture comprising of Airvol 205 (6.0% of total solids), Aerosol-OT (4.5% of total solids) and Triton X-100 (0.5% of total solids) in deionized water, using an attriter equipped with glass beads, by stirring for 18 hours at room temperature. The average particle size of the resulting dispersion was about 0.24 microns, and the total solid content was 25.22%.

The above dispersion was used to make the cyan developer coating fluid in proportions stated below. The cyan developer coating composition thus prepared was coated on top of the imaging interlayer using a Meyer rod for an intended thickness of 1.9 microns, and was dried in air.

| Ingredient | % solids in dried film |
|---|---|
| Joncryl 138 | 9.50% |
| Acid Developer III | 89.50% |
| Zonyl FSN | 1.00% |

C2 Cyan Interlayer.

A cyan interlayer coating fluid was prepared in proportions stated below. The cyan interlayer coating composition thus prepared was coated on top of the cyan developer layer using a Meyer rod for an intended thickness of 2.0 microns, and was dried in air.

| Ingredient | % solids in dried film |
|---|---|
| Airvol 205 | 99.00% |
| Zonyl FSN | 1.00% |

C3 Cyan Dye Layer.

The leuco cyan dye, Leuco Dye II, was dispersed in an aqueous mixture comprising Airvol 350 (7.0% of total solids), Airvol 205 (3.0% of total solids), Aerosol-OT (1.0% of total solids) and Triton X-100 (0.2% of total solids) in deionized water, using an attriter equipped with glass beads, stirred for 18 hours at room temperature. The average particle size of the resulting dispersion was about 0.58 microns, and the total solid content was 26.17%.

The above dispersion was used to make the cyan coating fluid in proportions stated below. The cyan coating composition thus prepared was coated on the cyan interlayer using a Meyer rod for an intended thickness of 0.6 microns, and was dried in air.

| Ingredient | % solids in dried film |
|---|---|
| Leuco Dye II | 59.5% |
| Joncryl 138 | 39.5% |
| Zonyl FSN | 1.0% |

A protective overcoat was deposited on the cyan color-forming layers as follows:

A slip overcoat was coated on the cyan dye layer. The overcoat was prepared in proportions stated below. The overcoat coating composition thus prepared was coated on the cyan dye layer using a Meyer rod for an intended thickness of 1.0 micron, and was dried in air.

| Ingredient | % solids in dried film |
|---|---|
| Glyoxal | 9.59% |
| Hymicron ZK-349 | 31.42% |
| Klebosol 30V-25 | 23.53% |
| Zonyl FSA | 3.89% |
| Airvol 540 | 31.57% |

The resulting six-layer imaging member was printed using a laboratory test-bed printer equipped with a thermal head, model KST-87-12 MPC8 (Kyocera Corporation, 6 Takedato-badono-cho, Fushimi-ku, Kyoto, Japan).

The following printing parameters were used:

| | |
|---|---|
| Printhead width: | 3.41 inch |
| Pixels per inch: | 300 |
| Resistor size: | 69.7 × 80 microns |
| Resistance: | 3536 Ohm |
| Line Speed: | 8 milliseconds per line |
| Print speed: | 0.42 inches per second |
| Pressure: | 1.5-2 lb/linear inch |
| Dot pattern: | Rectangular grid. |

The cyan layer was printed with a high power/short time condition. In order to obtain gradations of color, the pulse width was increased from zero to a maximum of 1.3 milliseconds (about 16.3% of the total line time) in twenty equal steps, while the voltage supplied to the print head was maintained at 27.0V.

A lower power/longer time condition was used to print the magenta layer. The pulse width was increased from zero to the full 8 millisecond line time in twenty equal steps, while the voltage supplied to the print head was maintained at 14.5V.

Following printing, the reflection density in each of the printed areas was measured using a spectrophotometer from GretagMacbeth AG, Regensdorf, Switzerland. The results are shown in Tables I and II. Table I shows the printing of the cyan layer as a function of energy supplied by the thermal head. The magenta densities obtained are shown as well. Also included in Table I is the ratio between the cyan and the magenta density (C/M). Similarly, Table II shows the printing of the magenta layer as a function of the energy supplied by the thermal head. The ratio between the magenta and the cyan densities is shown (M/C).

The ratio C/N in Table I and the ratio M/C in Table II are measured quantities that indicate success in differentially printing one color rather than another. However, there are two reasons why these numbers do not fully reflect the degree of layer discrimination. First, the measured densities have a contribution resulting from absorption of light by the underlying media substrate. (For example, even in the absence of printing there is a residual absorption of 0.04 density units.) Second, each of the dyes has some absorption outside of its own color band. Therefore, the ratio of measured cyan and magenta optical densities is not the same as the ratio of colorized cyan dye to colorized magenta dye.

An approximate correction for substrate absorption may be made by subtracting the optical density of the unheated media from each of the measured density values. Correcting for the out-of-band absorption of each of the dyes is more complicated. Here there is considered a three-color imaging member (comprised of three dye layers) as a general example for the correction procedure, First, the out-of-band absorption was characterized by measuring the density of each of the three dyes in each of the three color bands, and correcting the densities for the substrate density. Three monochrome samples were used, and each had a particular area-concentration $a_j^0$ of one of the dyes, where j=C, M or Y depending on whether the dye was cyan, magenta or yellow, respectively.

The results of such a measurement were:

| | Cyan Dye | Magenta Dye | Yellow Dye |
|---|---|---|---|
| Cyan Density | 0.75 | 0.02 | 0.00 |
| Magenta Density | 0.26 | 0.63 | 0.04 |
| Yellow Density | 0.14 | 0.11 | 0.38 |

The densities recorded in this matrix will be denoted $d_{i,j}$, where i and j are the color values C, M and Y, and for example the value $d_{CM}$ is the magenta density of the cyan dye sample If we have colorized dyes of area-concentration other than that at which these data were recorded, then the densities for that dye will scale in proportion to the area-concentration. In particular, if a sample has area concentrations $a_C$, $a_M$, and $a_Y$ of colorized cyan, magenta and yellow dye, then under the same printing conditions we will observe measured densities $D_C$, $D_M$ and $D_Y$ of $$D_C = (a_C/a_C^0)d_{CC} + (a_M/a_M^0)d_{MC} + (a_Y/a_Y^0)d_{YC}$$

$$D_M = (a_C/a_C^0)d_{CM} + (a_M/a_M^0)d_{MM} + (a_Y/a_Y^0)d_{YM}$$

$$D_Y = (a_C/a_C^0)d_{CY} + (a_M/a_M^0)d_{MY} + (a_Y/a_Y^0)d_{YY}$$

This can be written in standard matrix notation in the following way:

$$\begin{pmatrix} D_C \\ D_M \\ D_Y \end{pmatrix} = \begin{pmatrix} d_{CC} & d_{MC} & d_{YC} \\ d_{CM} & d_{MM} & d_{YM} \\ d_{CY} & d_{MY} & d_{YY} \end{pmatrix} \begin{pmatrix} a_C/a_C^0 \\ a_M/a_M^0 \\ a_Y/a_Y^0 \end{pmatrix}$$

If the densities $D_C$, $D_M$ and $D_Y$ of a sample are measured, then we can use the inverse of this equation to find the area concentrations of colorized dye in the sample, in comparison to those of the calibration samples.

$$\begin{pmatrix} a_C/a_C^0 \\ a_M/a_M^0 \\ a_Y/a_Y^0 \end{pmatrix} = \begin{pmatrix} d_{CC} & d_{MC} & d_{YC} \\ d_{CM} & d_{MM} & d_{YM} \\ d_{CY} & d_{MY} & d_{YY} \end{pmatrix}^{-1} \begin{pmatrix} D_C \\ D_M \\ D_Y \end{pmatrix}$$

These quantities more accurately represent the colorization of each layer by the applied heat, and are not confounded by the spectral absorption overlaps of the dyes in those layers. As such, they more accurately represent the degree to which we are able to write on one layer without affecting another.

We can define "cross-talk" to be the degree to which an attempt to produce optical density in one color layer alone results in the production of undesired optical density in another color layer. For example, if we have a medium with a cyan layer and a magenta layer, and we are attempting to write on the magenta layer, then the relative cross-talk from cyan may be represented by:

$$\text{Cross-talk} = \frac{a_C*(d_{CC}/a_C^0)}{a_M*(d_{MM}/a_M^0)} = \frac{a_C/a_C^0}{a_M/a_M^0}\left(\frac{d_{CC}}{d_{MM}}\right)$$

An analogous equation can be written for the cross-talk of magenta when attempting to write on the cyan layer.

These values of cross-talk are recorded in the final column of Tables I and II. Similar values will be reported for the following examples as well, but only for cases in which the measured densities are large enough (density>0.1) to yield meaningful results, and only for layers that are addressed from the same surface of the imaging member.

TABLE I

| Energy Supplied (J/cm²) | Cyan printed density | Magenta printed density | C/M | Cross-Talk (Magenta) |
|---|---|---|---|---|
| 0.00 | 0.04 | 0.04 | 1.00 | |
| 0.18 | 0.04 | 0.04 | 1.00 | |
| 0.35 | 0.04 | 0.04 | 1.00 | |
| 0.53 | 0.04 | 0.04 | 1.00 | |
| 0.71 | 0.04 | 0.04 | 1.00 | |
| 0.88 | 0.04 | 0.04 | 1.00 | |
| 1.06 | 0.04 | 0.04 | 1.00 | |
| 1.24 | 0.04 | 0.04 | 1.00 | |
| 1.41 | 0.04 | 0.05 | 0.80 | |
| 1.59 | 0.05 | 0.05 | 1.00 | |
| 1.77 | 0.06 | 0.05 | 1.20 | |
| 1.94 | 0.1 | 0.06 | 1.67 | |
| 2.12 | 0.15 | 0.08 | 1.88 | |
| 2.29 | 0.2 | 0.1 | 2.00 | |
| 2.47 | 0.29 | 0.12 | 2.42 | 0.01 |
| 2.65 | 0.34 | 0.15 | 2.27 | 0.04 |
| 2.82 | 0.43 | 0.22 | 1.95 | 0.14 |
| 3.00 | 0.5 | 0.29 | 1.72 | 0.22 |
| 3.18 | 0.62 | 0.35 | 1.77 | 0.22 |
| 3.35 | 0.6 | 0.42 | 1.43 | 0.37 |
| 3.53 | 0.61 | 0.47 | 1.30 | 0.45 |

TABLE II

| Energy Supplied (J/cm²) | Cyan printed density | Magenta printed density | M/C | Cross-Talk (Cyan) |
|---|---|---|---|---|
| 0 | 0.04 | 0.04 | 1.00 | |
| 0.30 | 0.04 | 0.04 | 1.00 | |
| 0.60 | 0.04 | 0.05 | 1.25 | |
| 0.90 | 0.04 | 0.05 | 1.25 | |
| 1.21 | 0.04 | 0.05 | 1.25 | |
| 1.51 | 0.04 | 0.05 | 1.25 | |
| 1.81 | 0.04 | 0.05 | 1.25 | |
| 2.11 | 0.04 | 0.05 | 1.25 | |
| 2.41 | 0.05 | 0.06 | 1.20 | |
| 2.71 | 0.05 | 0.1 | 2.00 | 0.14 |
| 3.02 | 0.05 | 0.15 | 3.00 | 0.07 |
| 3.32 | 0.06 | 0.22 | 3.67 | 0.08 |
| 3.62 | 0.07 | 0.29 | 4.15 | 0.09 |
| 3.92 | 0.09 | 0.42 | 4.67 | 0.10 |
| 4.22 | 0.1 | 0.54 | 5.40 | 0.09 |
| 4.52 | 0.13 | 0.69 | 5.31 | 0.11 |
| 4.83 | 0.16 | 0.97 | 6.06 | 0.10 |
| 5.13 | 0.22 | 1.32 | 6.00 | 0.11 |
| 5.43 | 0.26 | 1.56 | 6.00 | 0.12 |
| 5.73 | 0.31 | 1.69 | 5.45 | 0.14 |
| 6.03 | 0.34 | 1.74 | 5.12 | 0.15 |

Example II

This example illustrates a two-color imaging member such as is illustrated in FIG. 8. The top color-forming layer produces a yellow color, using a unimolecular thermal reaction mechanism as described in U.S. Pat. No. 5,350,870. The lower color-forming layer produces a magenta color, using an acid developer and a magenta leuco dye.

The magenta image-forming layer was prepared as follows:

Dispersions of Leuco Dye I and Acid Developer I were prepared as described in Example I, part A above.

Acid Developer II was dispersed in an aqueous mixture comprising Airvol 205 (2% of total solids), Dowfax 2A1 (2% of total solids) and Irganox 1035 (5% of total solids) in deionized water, using an attriter equipped with glass beads and stirred for 24 hours at 10-15° C. The average particle size of the resulting dispersion was about 0.52 microns and the total solid content was 22.51%.

The above dispersions were used to make the magenta coating fluid in proportions stated below. The coating composition thus prepared was coated onto Melinex 534 using a Meyer rod, and dried. The intended coating thickness was 3 microns.

| Ingredient | % solids in dried film |
|---|---|
| Leuco Dye I | 24.18% |
| Acid Developer I | 47.49% |
| Acid Developer II | 11.63% |
| Joncryl 138 | 16.16% |
| Zonyl FSN | 0.54% |

A thermally insulating interlayer was deposited onto the magenta imaging layer as described in Example I, part B. above, except that the coating thickness was 16.1 microns.

A yellow image-forming layer was deposited on the thermally insulating layer as follows:

Leuco Dye III was dispersed in an aqueous mixture comprising of Airvol 205 (4.54% of total solids), Aerosol-OT (2.73% of total solids) and Pluronic 25R2 (1.82% of total solids) in deionized water, using an attriter equipped with glass beads and stirred for 18 hours at room temperature. The average particle size of the resulting dispersion was about 0.49 microns and the total solid content was 25.1%.

The above dispersion was used to make the yellow coating fluid in proportions stated below. The yellow coating composition thus prepared was coated on the thermally insulating interlayer using a Meyer rod for an intended thickness of 3 microns, and was dried in air.

| Ingredient | % solids in dried film |
|---|---|
| Leuco Dye III | 70% |
| Genflo 3056 | 22.95% |
| Airvol 205 | 7% |
| Zonyl FSN | 0.05% |

A protective overcoat was deposited on the yellow color-forming layer as follows:

A slip overcoat was coated on the yellow dye layer. The overcoat was prepared in proportions stated below. The overcoat coating composition thus prepared was coated on the yellow dye layer using a Meyer rod for an intended thickness of 1.0 micron, and was dried in air.

| Ingredient | % solids in dried film |
|---|---|
| Glyoxal | 8.39% |
| Hymicron ZK-349 | 31.77% |
| Kiebosol 30R 25 | 23.77% |
| Zonyl FSA | 0.92% |
| Zonyl FSN | 3.22% |
| Airvol 540 | 31.93% |

The resulting four-layer imaging member was printed using a laboratory test-bed printer equipped with a thermal head, model KST-87-12MPC8 (Kyocera Corporation, 6 Takedatobadono-cho, Fushimi-ku, Kyoto, Japan). The following printing parameters were used:

| | |
|---|---|
| Printhead width: | 3.41 inch |
| Pixels per inch: | 300 |
| Resistor size: | 69.7 × 80 microns |
| Resistance: | 3536 Ohm |
| Line Speed: | 8 milliseconds per line |
| Print speed: | 0.42 inches per second |
| Pressure: | 1.5-2 lb/linear inch |
| Dot pattern: | Rectangular grid. |

The yellow layer was printed with a high power/short time condition. In order to obtain gradations of color, the pulse width was increased from zero to a maximum of 1.65 milliseconds (about 20.6% of the total line time) in twenty-one equal steps, while the voltage supplied to the print head was maintained at 29.0V.

A lower power/longer time condition was used to print the magenta layer. The pulse width was increased from zero to the 99.5% of the 8 millisecond line time in twenty-one equal steps, while the voltage supplied to the print head was maintained at 16V.

Following printing, the reflection density in each of the printed areas was measured using a Gretag Macbeth spectrophotometer. The results are shown in Tables III and IV. Table III shows the printing of the yellow layer as a function of energy supplied by the thermal head. The magenta densities obtained are shown as well. Also included in Table III are the ratio between the yellow and the magenta density (Y/M) and the cross-talk. Similarly, Table IV shows the printing of the magenta layer as a function of the energy supplied by the thermal head. The ratio between the magenta and the yellow densities is shown (M/Y) as well as the cross-talk.

TABLE III

| Energy Supplied (J/cm²) | Yellow printed density | Magenta printed density | Y/M | Cross-Talk (Magenta) |
|---|---|---|---|---|
| 0.00 | 0.07 | 0.09 | 0.78 | |
| 0.26 | 0.07 | 0.09 | 0.78 | |
| 0.52 | 0.06 | 0.09 | 0.67 | |
| 0.78 | 0.06 | 0.09 | 0.67 | |
| 1.04 | 0.06 | 0.09 | 0.67 | |
| 1.30 | 0.07 | 0.09 | 0.78 | |
| 1.56 | 0.06 | 0.09 | 0.67 | |
| 1.82 | 0.06 | 0.09 | 0.67 | |
| 2.08 | 0.08 | 0.09 | 0.89 | |
| 2.34 | 0.11 | 0.10 | 1.10 | |
| 2.60 | 0.17 | 0.10 | 1.70 | |
| 2.86 | 0.24 | 0.11 | 2.18 | 0.01 |
| 3.12 | 0.34 | 0.12 | 2.83 | 0.01 |
| 3.38 | 0.48 | 0.14 | 3.43 | 0.02 |
| 3.64 | 0.58 | 0.16 | 3.63 | 0.03 |
| 3.90 | 0.68 | 0.19 | 3.58 | 0.06 |
| 4.16 | 0.83 | 0.23 | 3.61 | 0.08 |
| 4.41 | 0.94 | 0.26 | 3.62 | 0.09 |
| 4.67 | 1.08 | 0.32 | 3.38 | 0.13 |
| 4.93 | 1.13 | 0.38 | 2.97 | 0.18 |
| 5.19 | 1.19 | 0.40 | 2.98 | 0.18 |

TABLE IV

| Energy Supplied (J/cm²) | Magenta printed density | Yellow printed density | M/Y | Cross-Talk (Yellow) |
|---|---|---|---|---|
| 0.00 | 0.10 | 0.08 | 1.25 | |
| 0.38 | 0.10 | 0.09 | 1.11 | |
| 0.76 | 0.10 | 0.09 | 1.11 | |
| 1.15 | 0.10 | 0.09 | 1.11 | |
| 1.53 | 0.10 | 0.08 | 1.25 | |
| 1.91 | 0.10 | 0.08 | 1.25 | |
| 2.29 | 0.10 | 0.07 | 1.43 | |
| 2.67 | 0.10 | 0.07 | 1.43 | |
| 3.05 | 0.10 | 0.07 | 1.43 | |
| 3.44 | 0.10 | 0.09 | 1.11 | |
| 3.82 | 0.10 | 0.08 | 1.25 | |
| 4.20 | 0.11 | 0.08 | 1.38 | |
| 4.58 | 0.14 | 0.1 | 1.40 | |
| 4.96 | 0.23 | 0.13 | 1.77 | |
| 5.35 | 0.40 | 0.18 | 2.22 | 0.22 |
| 5.73 | 0.61 | 0.25 | 2.44 | 0.17 |
| 6.11 | 0.88 | 0.34 | 2.59 | 0.17 |
| 6.49 | 1.17 | 0.44 | 2.66 | 0.17 |
| 6.87 | 1.42 | 0.53 | 2.68 | 0.17 |
| 7.26 | 1.65 | 0.65 | 2.54 | 0.20 |
| 7.64 | 1.68 | 0.74 | 2.27 | 0.26 |

Example III

This example illustrates a two-color imaging member such as is illustrated in FIG. 8 and further including an overcoat layer deposited on the cyan color-forming layer. In this example, the thermally-insulating layer 18 of FIG. 8 is opaque, while the substrate 12 is transparent. It is therefore possible, using the imaging member described in this example, to print both sides of an opaque imaging member independently, using a thermal head located on only one side of the imaging member.

Dispersions of Leuco Dye I and Acid Developer I were prepared as described in Example IV, part C below.

Acid Developer II was dispersed as described above in Example II, part A.

The above dispersions were used to make the magenta coating fluid in proportions stated below. The coating composition thus prepared was coated onto clear polyester film base (Cronar 412), and dried. The intended coating coverage was 3.3 g/m$^2$.

| Ingredient | % solids in dried film |
| --- | --- |
| Leuco Dye I | 21.91% |
| Acid Developer I | 52.71% |
| Airvol 205 | 14.35% |
| Acid Developer II | 10.54% |
| Zonyl FSN | 0.49% |

A thermally insulating interlayer was deposited onto the magenta imaging layer as follows:

A coating fluid for the interlayer was prepared in proportions stated below. The image interlayer coating composition thus prepared was coated on the magenta imaging layer for an intended thickness of 8.95 microns.

| Ingredient | % solids in dried film |
| --- | --- |
| Glascol C44 | 99.50% |
| Zonyl FSA | 0.50% |

An opaque layer was deposited onto the thermally-insulating layer as follows:

A dispersion of titanium dioxide was prepared as follows:

Titanium dioxide was dispersed in an aqueous mixture comprising Tamol 731 (3.86% of total solids), Ludox HS40 (3.85% of total solids) and a trace amount (750 ppm) of Nipa Proxel in deionized water, using an attriter equipped with glass beads and stirred for 18 hours at room temperature. The total solid content of the dispersion was 50.2%.

The dispersion so prepared was used to make a coating fluid in the proportions shown below. The coating fluid was coated onto the thermally-insulating layer for an intended thickness of 12.4 microns.

| Ingredient | % solids in dried film |
| --- | --- |
| Titanium Dioxide | 81.37% |
| Joncryl 138 | 18.08% |
| Zonyl FSN | 0.54% |

Cyan image-forming layers D1-D3 were deposited on the thermally insulating layer as follows:

D1 Cyan Developer Layer.

Acid Developer III was dispersed as described in Example IV, part E1 below.

The above dispersion was used to make the cyan developer coating fluid in proportions stated below. The cyan developer coating composition thus prepared was coated on top of the imaging interlayer for an intended thickness of 1.74 microns.

| Ingredient | % solids in dried film |
| --- | --- |
| Acid Developer III | 80.84% |
| Joncryl 138 | 18.54% |
| Zonyl FSN | 0.62% |

D2 Cyan Interlayer.

A cyan interlayer coating fluid was prepared in proportions stated below. The cyan interlayer coating composition thus prepared was coated on top of the cyan developer layer for an intended thickness of 1.0 microns.

| Ingredient | % solids in dried film |
| --- | --- |
| Airvol 205 | 99.00% |
| Zonyl FSN | 1.00% |

D3 Cyan Dye Layer.

The leuco cyan dye, Dye II, was dispersed as described in Example 4, part E3 below.

The dispersion was used to make the cyan coating fluid in proportions stated below. The cyan coating composition thus prepared was coated on the cyan interlayer for an intended thickness of 0.65 microns.

| Ingredient | % solids in dried film |
| --- | --- |
| Dye II | 59.30% |
| Joncryl 138 | 39.37% |
| Zonyl FSN | 1.33% |

A protective overcoat was deposited on the cyan color-forming layers as follows:

A slip overcoat was coated on the cyan dye layer. The overcoat was prepared in proportions stated in Table VI. The overcoat coating composition thus prepared was coated on the cyan dye layer for an intended thickness of 1.1 micron.

| Ingredient | % solids in dried film |
| --- | --- |
| Hymicron ZK-349 | 31.77% |
| Klebosol 30V-25 | 23.77% |
| Airvol 540 | 31.93% |
| Glyoxal | 8.39% |
| Zonyl FSA | 0.92% |
| Zonyl FSN | 3.22% |

The resulting imaging member was printed as described in Example II above. The cyan image was visible from the front of the substrate, while the magenta image was visible from the rear. Therefore, optical densities for the cyan image were obtained from the top surface of the imaging member, and optical densities for the magenta image from the rear of the imaging member.

The cyan layer was printed with a high power/short time condition. In order to obtain gradations of color, the pulse width was increased from zero to a maximum of 1.41 milliseconds (about 18.5% of the total line time) in twenty equal steps, while the voltage supplied to the print head was maintained at 29.0V.

A lower power/longer time condition was used to print the magenta layer. The pulse width was increased from zero to the full 8 millisecond line time in twenty equal steps, while the voltage supplied to the print head was maintained at 14.5V.

Following printing, the reflection density in each of the printed areas was measured using a Gretag Macbeth spectrophotometer. The results are shown in Tables V and VI. Table V shows the printing of the cyan layer as a function of energy supplied by the thermal head. The magenta densities obtained are shown as well. Also included in Table V are the ratio between the cyan and the magenta density (C/M) and the cross-talk. Similarly, Table VI shows the printing of the magenta layer as a function of the energy supplied by the thermal head. The ratio between the magenta and the cyan densities is shown (M/C), as well as the cross-talk.

TABLE V

| Energy Supplied (J/cm$^2$) | Cyan printed density | Magenta printed density | C/M | Cross-Talk (Magenta) |
|---|---|---|---|---|
| 0.00 | 0.08 | 0.08 | 1.00 | |
| 0.23 | 0.08 | 0.08 | 1.00 | |
| 0.47 | 0.08 | 0.08 | 1.00 | |
| 0.70 | 0.08 | 0.08 | 1.00 | |
| 0.93 | 0.08 | 0.08 | 1.00 | |
| 1.17 | 0.08 | 0.08 | 1.00 | |
| 1.40 | 0.08 | 0.08 | 1.00 | |
| 1.64 | 0.08 | 0.08 | 1.00 | |
| 1.87 | 0.08 | 0.09 | 0.89 | |
| 2.10 | 0.08 | 0.08 | 1.00 | |
| 2.34 | 0.09 | 0.09 | 1.00 | |
| 2.57 | 0.09 | 0.09 | 1.00 | |
| 2.80 | 0.1 | 0.09 | 1.11 | |
| 3.04 | 0.11 | 0.10 | 1.10 | |
| 3.27 | 0.13 | 0.10 | 1.30 | |
| 3.51 | 0.22 | 0.13 | 1.69 | 0.03 |
| 3.74 | 0.27 | 0.15 | 1.80 | 0.04 |
| 3.97 | 0.35 | 0.18 | 1.94 | 0.04 |
| 4.21 | 0.36 | 0.20 | 1.80 | 0.10 |
| 4.44 | 0.42 | 0.24 | 1.75 | 0.15 |
| 4.67 | 0.51 | 0.28 | 1.82 | 0.14 |

TABLE VI

| Energy Supplied (J/cm$^2$) | Cyan printed density | Magenta printed density | M/C | Cross-Talk (Cyan) |
|---|---|---|---|---|
| 0.00 | 0.08 | 0.11 | 1.38 | |
| 0.31 | 0.08 | 0.11 | 1.38 | |
| 0.63 | 0.08 | 0.11 | 1.38 | |
| 0.94 | 0.08 | 0.11 | 1.38 | |
| 1.25 | 0.08 | 0.11 | 1.38 | |
| 1.57 | 0.08 | 0.11 | 1.38 | |
| 1.88 | 0.08 | 0.11 | 1.38 | |
| 2.20 | 0.08 | 0.11 | 1.38 | |
| 2.51 | 0.08 | 0.11 | 1.38 | |
| 2.82 | 0.08 | 0.11 | 1.38 | |
| 3.14 | 0.08 | 0.11 | 1.38 | |
| 3.45 | 0.08 | 0.11 | 1.38 | |
| 3.76 | 0.08 | 0.11 | 1.38 | |
| 4.08 | 0.08 | 0.12 | 1.50 | |
| 4.39 | 0.09 | 0.12 | 1.33 | |
| 4.70 | 0.09 | 0.13 | 1.44 | |
| 5.02 | 0.10 | 0.18 | 1.80 | 0.27 |
| 5.33 | 0.12 | 0.25 | 2.08 | 0.27 |
| 5.65 | 0.13 | 0.36 | 2.77 | 0.18 |
| 5.96 | 0.16 | 0.59 | 3.69 | 0.14 |
| 6.27 | 0.19 | 0.76 | 4.00 | 0.14 |

Example IV

A three-color imaging member such as is illustrated in FIG. 9 and further including an overcoat layer deposited on the cyan color-forming layer was prepared as follows:

A yellow image-forming layer was prepared as follows:

A leuco yellow dye, Leuco Dye IV, was dispersed by a method analogous to that used to provide the dispersion of Leuco Dye I in part C., below, to give a dye concentration of 20.0%.

Acid Developer IV (10 g) was dispersed in an aqueous mixture comprising Tamol 731 (7.08 g of a 7.06% aqueous solution) and deionized water, 32.92 grams, in a 4 ounce glass jar containing 10 grams Mullite beads, stirred for 16 hours at room temperature. The developer concentration was 20.0%.

The above dispersions were used to make the yellow coating fluid in proportions stated below. The coating composition thus prepared was coated onto Melinex 534, and dried. The intended coating coverage was 2.0 g/m$^2$.

| Ingredient | % solids in dried film |
|---|---|
| Leuco Dye IV | 41.44% |
| Acid Developer IV | 41.44% |
| Joncryl 138 | 16.57% |
| Zonyl FSN | 0.55% |

A thermally insulating interlayer was deposited onto the yellow imaging layer as follows:

A coating fluid for the interlayer was prepared in proportions stated in Table II. The image interlayer coating composition thus prepared was coated on the yellow imaging layer for an intended coverage of 9.0 g/m$^2$.

| Ingredient | % solids in dried film |
|---|---|
| Glascol C44 | 99.50% |
| Zonyl FSA | 0.50% |

The magenta image-forming layer was prepared as follows:

Leuco Dye I (15.0 g) was dispersed in an aqueous mixture comprising Airvol 205 (3.38 g of a 20% aqueous solution), Triton X-100 (0.6 g of a 5% aqueous solution), and Aerosol-OT (15.01 g of a 19% aqueous solution) in deionized water (31.07 g), in a 4 ounce glass jar containing Mullite beads, stirred for 16 hours at room temperature. The total dye content was 20.00%.

Acid developer I (10 g) was dispersed in an aqueous mixture comprising Tamol 731 (7.08 g of a 7.06% aqueous solution) and deionized water, 32.92 grams, in a 4 ounce glass jar containing 10 grams Mullite beads, stirred for 16 hours at room temperature. The developer concentration was 20.0%.

Acid developer II was dispersed as described above in Example II, part A.

The above dispersions were used to make the magenta coating fluid in proportions stated below. The coating composition thus prepared was coated onto the thermally-insulating interlayer, and dried. The intended coating coverage was 1.67 g/m$^2$.

| Ingredient | % solids in dried film |
| --- | --- |
| Leuco Dye I | 24.18% |
| Acid Developer I | 47.50% |
| Joncryl 138 | 16.16% |
| Acid Developer II | 11.63% |
| Zonyl FSN | 0.54% |

A thermally insulating interlayer was deposited onto the magenta imaging layer as follows:

A coating fluid for the interlayer was prepared in proportions stated below. The image interlayer coating composition thus prepared was coated on the magenta imaging layer in three passes, for an intended coverage of 13.4 g/m².

| Ingredient | % solids in dried film |
| --- | --- |
| Glascol C44 | 99.50% |
| Zonyl FSA | 0.50% |

Cyan image-forming layers E1-E3 were deposited on the thermally-insulating layer as follows:

E1 Cyan Developer Layer.

Acid developer III (10 g) was dispersed in an aqueous mixture comprising Tamol 731 (7.08 g of a 7.060 aqueous solution) and deionized water, 32.92 grams, in a 4 ounce glass jar containing 10 grams Mullite beads, stirred for 16 hours at room temperature. The developer concentration was 20.0%.

The above dispersion was used to make the cyan developer coating fluid in proportions stated below. The cyan developer coating composition thus prepared was coated on top of the thermally-insulating interlayer for an intended thickness of 1.94 g/m².

| Ingredient | % solids in dried film |
| --- | --- |
| Acid Developer III | 89.5% |
| Joncryl 138 | 9.5% |
| Zonyl FSN | 1.0% |

E2 Cyan Interlayer.

A cyan interlayer coating fluid was prepared in proportions stated below. The cyan interlayer coating composition thus prepared was coated on top of the cyan developer layer for an intended thickness of 1.0 g/m².

| Ingredient | % solids in dried film |
| --- | --- |
| Airvol 205 | 99.00% |
| Zonyl FSN | 1.00% |

E3 Cyan Dye Layer.

Leuco Dye II (15.0 g) was dispersed in an aqueous mixture comprising Airvol 350 (11.06 g of a 9.5% aqueous solution), Airvol 205 (2.25 g of a 20% aqueous solution), Aerosol-OT (2.53 g of a 19% aqueous solution) and Triton X-100 (1.49 g of a 5% aqueous solution) in deionized water (52.61 g) in a 4 ounce glass jar containing Mullite beads, stirred for 16 hours at room temperature. The dye concentration was 20.0%.

The above dispersion was used to make the cyan coating fluid in proportions stated below. The cyan coating composition thus prepared was coated on the cyan interlayer for an intended coverage of 0.65 g/m².

| Ingredient | % solids in dried film |
| --- | --- |
| Leuco Dye II | 59.30% |
| Joncryl 138 | 39.37% |
| Zonyl FSN | 1.33% |

A protective overcoat was deposited on the cyan color-forming layers as follows:

A slip overcoat was coated on the cyan dye layer. The overcoat was prepared in proportions stated below. The overcoat coating composition thus prepared was coated on the cyan dye layer for an intended coverage of 1.1 g/m².

| Ingredient | % solids in dried film |
| --- | --- |
| Hymicron ZK-349 | 31.77% |
| Klebosol 30V-25 | 23.77% |
| Airvol 540 | 31.93% |
| Glyoxal | 8.39% |
| Zonyl FSA | 0.92% |
| Zonyl FSN | 3.22% |

The resulting imaging member was printed using a laboratory test-bed printer equipped with a thermal head, model KST-87-12MPC8 (Kyocera Corporation, 6 Takedatobadonocho, Fushimi-ku, Kyoto, Japan). The following printing parameters were used:

| | |
| --- | --- |
| Printhead width: | 3.41 inch |
| Pixels per inch: | 300 |
| Resistor size: | 69.7 × 80 microns |
| Resistance: | 3536 Ohm |
| Line Speed: | 8 milliseconds per line |
| Print speed: | 0.42 inches per second |
| Pressure: | 1.5-2 lb/linear inch |
| Dot pattern: | Rectangular grid. |

The cyan layer was printed with a high power/short time condition. In order to obtain gradations of color, the pulse width was increased from zero to a maximum of 1.31 milliseconds (about 16.4% of the total line time) in ten equal steps, while the voltage supplied to the print head was maintained at 29.0V.

A lower power/longer time condition was used to print the magenta layer. The pulse width was increased from zero to the 99.5% of the 8 millisecond line time in ten equal steps, while the voltage supplied to the print head was maintained at 15V.

A very low power/very long time was used to print the yellow layer. Some of the printing conditions were changed, as follows:

| | |
| --- | --- |
| Line Speed: | 15.23 milliseconds per line |
| Pulse width: | 15.23 milliseconds |
| Print speed: | 0.0011 inches per second |
| Lines printed: | 1600, one step of maximum density. |

Following printing, the reflection density in each of the printed areas was measured using a Gretag Macbeth spectrophotometer. The results are shown in Tables VII, VIII and IX. Table VII shows the printing of the cyan layer as a function of energy supplied by the thermal head. The magenta and yellow densities and cross-talk obtained are shown as well. Similarly, Table VIII shows the printing of the magenta layer as a function of the energy supplied by the thermal head. Table IX shows the density obtained when printing the yellow layer as a function of applied voltage and energy.

TABLE VII

| Cyan printed density | Magenta printed density | Yellow printed density | Cross-Talk (Magenta) | Cross-Talk (Yellow) |
|---|---|---|---|---|
| 0.00 | 0.06 | 0.07 | 0.17 | |
| 0.41 | 0.06 | 0.07 | 0.17 | |
| 0.83 | 0.06 | 0.07 | 0.17 | |
| 1.24 | 0.05 | 0.07 | 0.16 | |
| 1.65 | 0.06 | 0.07 | 0.16 | |
| 2.07 | 0.06 | 0.07 | 0.18 | |
| 2.48 | 0.07 | 0.08 | 0.19 | |
| 2.89 | 0.12 | 0.09 | 0.19 | −0.03 | 0.15 |
| 3.30 | 0.19 | 0.12 | 0.21 | 0.03 | 0.12 |
| 3.72 | 0.19 | 0.14 | 0.22 | 0.18 | 0.17 |
| 4.13 | 0.33 | 0.17 | 0.24 | 0.02 | 0.07 |

TABLE VIII

| Energy Supplied (J/cm$^2$) | Cyan printed density | Magenta printed density | Yellow printed density | Cross-Talk (Cyan) | Cross-Talk (Yellow) |
|---|---|---|---|---|---|
| 0.00 | 0.05 | 0.07 | 0.16 | | |
| 0.67 | 0.05 | 0.07 | 0.16 | | |
| 1.34 | 0.05 | 0.07 | 0.17 | | |
| 2.01 | 0.05 | 0.07 | 0.18 | | |
| 2.68 | 0.06 | 0.07 | 0.18 | | |
| 3.36 | 0.06 | 0.08 | 0.18 | | |
| 4.03 | 0.08 | 0.12 | 0.19 | | |
| 4.70 | 0.08 | 0.24 | 0.22 | 0.16 | 0.17 |
| 5.37 | 0.10 | 0.38 | 0.25 | 0.14 | 0.11 |
| 6.04 | 0.16 | 0.63 | 0.33 | 0.18 | 0.12 |
| 6.71 | 0.20 | 0.91 | 0.42 | 0.16 | 0.13 |

TABLE IX

| Voltage applied (V) | Energy Supplied (J/cm$^2$) | Cyan printed density | Magenta printed density | Yellow printed density |
|---|---|---|---|---|
| 7.5 | 639 | 0.06 | 0.26 | 0.73 |
| 7 | 557 | 0.06 | 0.23 | 0.70 |

This example shows that all three colors may be printed independently using a thermal head addressing the same side of an imaging member constructed as shown in FIG. 9.

Example V

This example illustrates a three color imaging member such as illustrated in FIG. 10. The top image-forming layer produces a yellow color, using a unimolecular thermal reaction mechanism as described in U.S. Pat. No. 5,350,870. The middle image-forming layer produces a magenta color, using an acid developer, an acid co-developer, and a magenta leuco dye. The bottom image-forming layer produces a cyan color, using an acid developer, and a cyan leuco dye. In between the magenta and cyan layer, a thick clear poly(ethylene terephthalate) film base of approximately 102 micron thickness (Cronar 412) was used. Below the bottom cyan image-forming layer, a thick, opaque, white layer was used as a masking layer. The imaging member was addressed from the top (yellow and magenta) and the bottom (cyan). Because of the presence of the opaque layer, however, all three colors were visible only from the top. In this manner, a full-color image could be obtained.

The magenta image-forming layer was prepared as follows:

Dispersions of Leuco Dye I and Acid Developer I were prepared as described in Example I, part A. above.

A dispersion of Acid Developer III was prepared as described in Example II, part A. above.

The above dispersions were used to make the magenta coating fluid in proportions stated below. The coating composition thus prepared was coated on a clear poly(ethylene terephthalate) film base of approximately 102 microns' thickness (Cronar 412) onto the gelatine-subcoated side, using a Meyer rod, and dried. The intended coating thickness was 3 microns.

| Ingredient | % solids in dried film |
|---|---|
| Leuco Dye I | 24.18% |
| Acid Developer I | 47.49% |
| Acid Developer III | 11.63% |
| Jonyl 138 | 16.16% |
| Zonyl FSN | 0.54% |

A thermally insulating interlayer was deposited onto the magenta imaging layer as described in Example II, part B. above.

A yellow image-forming layer was deposited on the thermally insulating layer as follows:

A dispersion of Leuco Dye III was prepared as described in Example II, part C. above. This dispersion was used to make the yellow coating fluid in proportions stated below. The yellow coating composition thus prepared was coated on the thermally insulating interlayer using a Meyer rod for an intended thickness of 3 microns, and was dried in air.

| Ingredient | % solids in dried film |
|---|---|
| Leuco Dye III | 70% |
| Genflo 3056 | 22.95% |
| Airvol 205 | 7% |
| Zonyl FSN | 0.05% |

A protective overcoat was deposited on the yellow image-forming layers as follows:

A slip overcoat was coated on the yellow dye layer. The overcoat was prepared in proportions stated below. The overcoat coating composition thus prepared was coated on the yellow dye layer using a Meyer rod for an intended thickness of 1.0 microns, and was dried in air.

| Ingredient | % solids in dried film |
|---|---|
| Glyoxal | 8.39% |
| Hymicron ZK-349 | 31.77% |
| Klebosol 30V-25 | 23.77% |
| Zonyl FSA | 0.92% |
| Zonyl FSN | 3.22% |
| Airvol 540 | 31.93% |

The cyan image-forming layer was prepared as follows:

Leuco Dye II was dispersed in an aqueous mixture comprising Airvol 205 (2.7% of total solids), Airvol 350 (6.3% of total solids), Triton X-100 (0.18% of total solids) and Aerosol-OT (0.9% of total solids) in deionized water, using an attriter equipped with glass beads and stirred for 18 hours at room temperature. The total solid content of the dispersion was 20%.

A dispersion of Acid Developer I was prepared as described in Example I, part A. above.

The above dispersions were used to make the cyan coating fluid in proportions stated below. The coating composition thus prepared was coated onto the opposite side of the clear poly(ethylene terephthalate) film base as coatings A-D, using a Meyer rod, and dried in air. The intended coating thickness was 2 microns.

| Ingredient | % solids in dried film |
| --- | --- |
| Leuco Dye II | 28.38% |
| Acid Developer I | 41.62% |
| GenFlo 3056 | 22.90% |
| Airvol 205 | 7% |
| Zonyl FSN | 0.1% |

The masking, opaque layer.

Titanium dioxide was dispersed in an aqueous mixture comprising Tamol 731 (3.86% of total solids), Ludox HS40 (3.85% of total solids) and a trace amount (750 ppm) of Nipa Proxel in deionized water, using an attriter equipped with glass beads and stirred for 18 hours at room temperature. The total solid content of the dispersion was 50.2%.

The above dispersion was used to make a coating fluid in proportions stated below. The coating composition thus prepared was coated on the cyan image-forming layer using a Meyer rod for an intended thickness of 15 micron, and was dried in air.

| Ingredient | % solids in dried film |
| --- | --- |
| Titanium dioxide | 81.37% |
| Joncryl 138 | 18.08% |
| Zonyl FSN | 0.54% |

A protective overcoat was deposited on the opaque layer as described in part D. above.

The resulting imaging member was printed using a laboratory test-bed printer equipped with a thermal head, model KST-87-12MPC8 (Kyocera Corporation, 6 Takedatobadono-cho, Fushimi-ku, Kyoto, Japan). The following printing parameters were used:

| | |
| --- | --- |
| Printhead width: | 3.41 inch |
| Pixels per inch: | 300 |
| Resistor size: | 69.7 × 80 microns |
| Resistance: | 3536 Ohm |
| Line Speed: | 8 milliseconds per line |
| Print speed: | 0.42 inches per second |
| Pressure: | 1.5-2 lb/linear inch |
| Dot pattern: | Rectangular grid. |

The yellow layer was printed from the front side with a high power/short time condition. In order to obtain gradations of color, the pulse width was increased from zero to a maximum of 1.65 milliseconds (about 20.6% of the total line time) in twenty-one equal steps, while the voltage supplied to the print head was maintained at 29.0V.

A lower power/longer time condition was used to print the magenta layer, which was also addressed from the front side. The pulse width was increased from zero to the 99.5% of 8 millisecond line time in twenty-one equal steps, while the voltage supplied to the print head was maintained at 16V.

The cyan layer was printed with a high power/short time condition from the backside (the side of the film base bearing the opaque layer). In order to obtain gradations of color, the pulse width was increased from zero to a maximum of 1.65 milliseconds (about 20.6% of the total line time) in twenty-one equal steps, while the voltage supplied to the print head was maintained at 29.0V.

Following printing, the reflection density in each of the printed areas was measured using a Gretag Macbeth spectrophotometer. The results are shown in Tables X, XI and XII. Table X shows the printing of the yellow layer as a function of energy supplied by the thermal head. The magenta and cyan densities obtained are shown as well. Also included in Table X are the ratio between the yellow and the magenta density (Y/M) and the cross-talk. Similarly, Table XI shows the printing of the magenta layer as a function of the energy supplied by the thermal head. The ratio between the magenta and the yellow densities is shown (M/Y) as well as the cross-talk. In Table XII, printing of cyan layer as a function of the energy supplied by the thermal head is also listed. The ratio between the cyan and magenta densities is shown (C/M).

TABLE X

| Energy Supplied (J/cm$^2$) | Yellow printed density | Magenta printed density | Cyan printed density | Y/M | Cross-Talk (Magenta) |
| --- | --- | --- | --- | --- | --- |
| 0.00 | 0.11 | 0.11 | 0.08 | 1.00 | |
| 0.26 | 0.11 | 0.11 | 0.08 | 1.00 | |
| 0.52 | 0.11 | 0.11 | 0.08 | 1.00 | |
| 0.78 | 0.12 | 0.11 | 0.08 | 1.09 | |
| 1.04 | 0.11 | 0.11 | 0.08 | 1.00 | |
| 1.30 | 0.11 | 0.11 | 0.08 | 1.00 | |
| 1.56 | 0.12 | 0.11 | 0.08 | 1.09 | |
| 1.82 | 0.12 | 0.11 | 0.08 | 1.09 | |
| 2.08 | 0.13 | 0.11 | 0.08 | 1.18 | |
| 2.34 | 0.15 | 0.11 | 0.08 | 1.36 | |
| 2.60 | 0.21 | 0.12 | 0.08 | 1.75 | −0.01 |
| 2.86 | 0.28 | 0.12 | 0.08 | 2.33 | −0.05 |
| 3.12 | 0.36 | 0.13 | 0.08 | 2.77 | −0.03 |
| 3.38 | 0.46 | 0.15 | 0.08 | 3.07 | 0.01 |
| 3.64 | 0.63 | 0.17 | 0.08 | 3.71 | 0.01 |
| 3.90 | 0.79 | 0.20 | 0.08 | 3.95 | 0.03 |
| 4.16 | 0.98 | 0.24 | 0.08 | 4.08 | 0.05 |
| 4.41 | 1.12 | 0.27 | 0.08 | 4.15 | 0.06 |
| 4.67 | 1.24 | 0.30 | 0.09 | 4.13 | 0.06 |
| 4.93 | 1.36 | 0.33 | 0.09 | 4.12 | 0.07 |
| 5.19 | 1.44 | 0.36 | 0.09 | 4.00 | 0.08 |

TABLE XI

| Energy Supplied (J/cm$^2$) | Magenta printed density | Yellow printed density | Cyan printed density | M/Y | Cross-Talk (Yellow) |
| --- | --- | --- | --- | --- | --- |
| 0.00 | 0.11 | 0.11 | 0.07 | 1.00 | |
| 0.38 | 0.11 | 0.11 | 0.08 | 1.00 | |
| 0.76 | 0.11 | 0.11 | 0.07 | 1.00 | |
| 1.15 | 0.11 | 0.11 | 0.08 | 1.00 | |
| 1.53 | 0.11 | 0.11 | 0.08 | 1.00 | |
| 1.91 | 0.11 | 0.11 | 0.08 | 1.00 | |
| 2.29 | 0.11 | 0.11 | 0.08 | 1.00 | |
| 2.67 | 0.11 | 0.11 | 0.07 | 1.00 | |
| 3.05 | 0.11 | 0.11 | 0.07 | 1.00 | |
| 3.44 | 0.11 | 0.12 | 0.07 | 0.92 | |
| 3.82 | 0.11 | 0.12 | 0.07 | 0.92 | |
| 4.20 | 0.12 | 0.13 | 0.07 | 0.92 | |

TABLE XI-continued

| Energy Supplied (J/cm$^2$) | Magenta printed density | Yellow printed density | Cyan printed density | M/Y | Cross-Talk (Yellow) |
|---|---|---|---|---|---|
| 4.58 | 0.13 | 0.14 | 0.07 | 0.93 | |
| 4.96 | 0.17 | 0.16 | 0.07 | 1.06 | |
| 5.35 | 0.24 | 0.19 | 0.08 | 1.26 | 0.47 |
| 5.73 | 0.39 | 0.25 | 0.09 | 1.56 | 0.34 |
| 6.11 | 0.60 | 0.34 | 0.10 | 1.76 | 0.31 |
| 6.49 | 0.86 | 0.44 | 0.12 | 1.95 | 0.28 |
| 6.87 | 1.16 | 0.55 | 0.13 | 2.11 | 0.25 |
| 7.26 | 1.50 | 0.71 | 0.15 | 2.11 | 0.27 |
| 7.64 | 1.54 | 0.81 | 0.16 | 1.90 | 0.33 |

TABLE XII

| Energy Supplied (J/cm$^2$) | Cyan printed density | Magenta printed density | Yellow printed density | C/M |
|---|---|---|---|---|
| 0.00 | 0.07 | 0.11 | 0.11 | 0.64 |
| 0.26 | 0.07 | 0.11 | 0.11 | 0.64 |
| 0.52 | 0.07 | 0.11 | 0.11 | 0.64 |
| 0.78 | 0.07 | 0.11 | 0.11 | 0.64 |
| 1.04 | 0.07 | 0.11 | 0.11 | 0.64 |
| 1.30 | 0.07 | 0.11 | 0.11 | 0.64 |
| 1.56 | 0.07 | 0.11 | 0.11 | 0.64 |
| 1.82 | 0.07 | 0.11 | 0.11 | 0.64 |
| 2.08 | 0.07 | 0.11 | 0.11 | 0.64 |
| 2.34 | 0.07 | 0.11 | 0.11 | 0.64 |
| 2.60 | 0.08 | 0.11 | 0.11 | 0.73 |
| 2.86 | 0.10 | 0.11 | 0.11 | 0.91 |
| 3.12 | 0.16 | 0.13 | 0.12 | 1.23 |
| 3.38 | 0.24 | 0.15 | 0.13 | 1.60 |
| 3.64 | 0.33 | 0.17 | 0.14 | 1.94 |
| 3.90 | 0.43 | 0.21 | 0.15 | 2.05 |
| 4.16 | 0.57 | 0.26 | 0.18 | 2.19 |
| 4.41 | 0.90 | 0.42 | 0.27 | 2.14 |
| 4.67 | 1.09 | 0.53 | 0.33 | 2.06 |
| 4.93 | 1.06 | 0.52 | 0.33 | 2.04 |
| 5.19 | 1.03 | 0.51 | 0.32 | 2.02 |

Example VI

This example illustrates a three color imaging such as illustrated in FIG. 10. The top image-forming layer produces a cyan color, the middle image-forming layer produces a magenta color, and the bottom image-forming layer produces a yellow color. All three layers use an acid developer or developers, and a leuco dye. In between the magenta and yellow layers, a thick clear poly(ethylene terephthalate) film base of approximately 102 micron thickness (Cronar 412) was used. Below the bottom yellow image-forming layer, a thick, opaque, white layer was used as a masking layer. The imaging member was addressed from the top (cyan and magenta) and the bottom (yellow). Because of the presence of the opaque layer, however, all three colors were visible only from the top. In this manner, a full-color image could be obtained.

The magenta color-forming layer was prepared as follows:

Dispersions of Leuco Dye I and Acid Developer I were prepared as described in Example IV, part C above. A dispersion of Acid Developer II was prepared as described in Example II, part A above.

The above dispersions were used to make the magenta coating fluid in proportions stated below. The coating composition thus prepared was coated onto Cronar 412, and dried. The intended coating coverage was 2.0 g/m$^2$.

| Ingredient | % solids in dried film |
|---|---|
| Leuco Dye I | 24.18% |
| Acid Developer I | 47.50% |
| Joncryl 138 | 16.16% |
| Acid Developer II | 11.63% |
| Zonyl FSN | 0.54% |

A thermally insulating interlayer was deposited onto the magenta imaging layer as follows:

A coating fluid for the interlayer was prepared in proportions stated below. The image interlayer coating composition thus prepared was coated on the magenta imaging layer in three passes, for an intended coverage of 13.4 g/m$^2$.

| Ingredient | % solids in dried film |
|---|---|
| Glascol C44 | 99.50% |
| Zonyl FSA | 0.50% |

Cyan image-forming layers C1-C3 were deposited on the thermally insulating layer as follows:

C1 Cyan Developer Layer.

A dispersion of Acid Developer III was prepared as described in Example IV, part E1 above.

The above dispersion was used to make the cyan developer coating fluid in proportions stated below. The cyan developer coating composition thus prepared was coated on top of the thermally-insulating interlayer for an intended thickness of 2.1 g/m$^2$, and was dried.

| Ingredient | % solids in dried film |
|---|---|
| Joncryl 138 | 10.0% |
| Acid Developer III | 89.5% |
| Zonyl FSN | 0.50% |

C2 Cyan Interlayer.

A cyan interlayer coating fluid was prepared in proportions stated below. The cyan interlayer coating composition thus prepared was coated on top of the cyan developer layer for an intended thickness of 1.0 g/m$^2$.

| Ingredient | % solids in dried film |
|---|---|
| Airvol 205 | 99.00% |
| Zonyl FSN | 1.00% |

C3 Cyan Dye Layer.

Leuco dye II was dispersed as described in Example IV, part E3 above.

The above dispersion was used to make the cyan coating fluid in proportions stated below. The cyan coating composition thus prepared was coated on the cyan interlayer for an intended coverage of 0.65 g/m$^2$.

| Ingredient | % solids in dried film |
| --- | --- |
| Leuco Dye II | 59.30% |
| Joncryl 138 | 39.37% |
| Zonyl FSN | 1.33% |

A protective overcoat was deposited on the cyan image-forming layers as follows:

A slip overcoat was coated on the cyan dye layer. The overcoat was prepared in proportions stated below. The overcoat coating composition thus prepared was coated on the cyan dye layer for an intended coverage of 1.1 $g/m^2$.

| Ingredient | % solids in dried film |
| --- | --- |
| Hymicron ZK-349 | 31.77% |
| Klebosol 30V-25 | 23.77% |
| Airvol 540 | 31.93% |
| Glyoxal | 8.39% |
| Zonyl FSA | 0.92% |
| Zonyl FSN | 3.22% |

A yellow image-forming layer was deposited onto the reverse of the clear substrate using the procedure described in Example IV, part A above, except that the dried coverage was 1.94 $g/m^2$.

A white, opaque layer was deposited onto the yellow color-forming layer as follows:

A dispersion of titanium dioxide was prepared as described in Example V, part F. above.

A coating fluid was prepared from the dispersion so formed in proportions stated below. The coating composition thus prepared was coated on top of the yellow color-forming layer for an intended coverage of 10.76 $g/m^2$.

| Ingredient | % solids in dried film |
| --- | --- |
| Titanium dioxide | 89.70% |
| Joncryl 138 | 9.97% |
| Zonyl FSN | 0.33% |

A protective overcoat was deposited on the opaque layer as described in part D. above.

The resulting imaging member was printed using a laboratory test-bed printer equipped with a thermal head, model KST-87-12MPC8 (Kyocera Corporation, 6 Takedatobadonocho, Fushimi-ku, Kyoto, Japan). The following printing parameters were used:

| | |
| --- | --- |
| Printhead width: | 3.41 inch |
| Pixels per inch: | 300 |
| Resistor size: | 69.7 × 80 microns |
| Resistance: | 3536 Ohm |
| Line Speed: | 8 milliseconds per line |
| Print speed: | 0.42 inches per second |
| Pressure: | 1.5-2 lb/linear inch |
| Dot pattern: | Rectangular grid. |

The cyan layer was printed from the front side with a high power/short time condition. In order to obtain gradations of color, the pulse width was increased from zero to a maximum of 1.25 milliseconds (about 16.4% of the total line time) in twenty-one equal steps, while the voltage supplied to the print head was maintained at 29.0V.

A lower power/longer time condition was used to print the magenta layer, which was also addressed from the front side. The pulse width was increased from zero to the 99.5% of 8 millisecond line time in twenty-one equal steps, while the voltage supplied to the print head was maintained at 14.5V.

The yellow layer was printed with a lower power/longer time condition from the backside (the side of the film base bearing the opaque layer). The pulse width was increased from zero to the 99.5% of 8 millisecond line time in twenty-one equal steps, while the voltage supplied to the print head was maintained at 14.5V.

Following printing, the reflection density in each of the printed areas was measured using a Gretag Macbeth spectrophotometer. The results are shown in Tables XIII, XIV and XV. Table XIII shows the printing of the cyan layer as a function of energy supplied by the thermal head. The magenta and yellow densities obtained are shown as well. Also included in Table XIII are the ratio between the cyan and the magenta density (C/M) and the cross-talk. Similarly, Table XIV shows the printing of the magenta layer as a function of the energy supplied by the thermal head. The ratio between the magenta and the cyan densities is shown (M/C) as well as the cross-talk. In Table XV, printing of yellow layer as a function of the energy supplied by the thermal head is also listed. The ratio between the yellow and magenta densities is shown (Y/M).

TABLE XIII

| Energy Supplied ($J/cm^2$) | Cyan printed density | Magenta printed density | Yellow printed density | C/M | Cross-Talk (Magenta) |
| --- | --- | --- | --- | --- | --- |
| 1.57 | 0.07 | 0.10 | 0.23 | 0.70 | |
| 1.83 | 0.08 | 0.10 | 0.23 | 0.80 | |
| 2.09 | 0.08 | 0.11 | 0.25 | 0.73 | |
| 2.34 | 0.08 | 0.10 | 0.23 | 0.80 | |
| 2.60 | 0.11 | 0.11 | 0.23 | 1.00 | |
| 2.85 | 0.12 | 0.12 | 0.23 | 1.00 | |
| 3.11 | 0.16 | 0.13 | 0.24 | 1.23 | −0.01 |
| 3.36 | 0.20 | 0.14 | 0.25 | 1.43 | −0.04 |
| 3.62 | 0.26 | 0.16 | 0.26 | 1.63 | −0.03 |
| 3.87 | 0.28 | 0.17 | 0.27 | 1.65 | −0.01 |
| 4.13 | 0.36 | 0.20 | 0.28 | 1.80 | 0.00 |

TABLE XIV

| Energy Supplied ($J/cm^2$) | Magenta printed density | Cyan printed density | Yellow printed density | M/C | Cross-Talk (Cyan) |
| --- | --- | --- | --- | --- | --- |
| 3.14 | 0.10 | 0.07 | 0.20 | 1.43 | |
| 3.45 | 0.11 | 0.09 | 0.22 | 1.22 | |
| 3.76 | 0.11 | 0.09 | 0.22 | 1.22 | |
| 4.08 | 0.12 | 0.10 | 0.22 | 1.20 | |
| 4.39 | 0.13 | 0.10 | 0.21 | 1.30 | |
| 4.70 | 0.16 | 0.11 | 0.23 | 1.45 | |
| 5.02 | 0.21 | 0.11 | 0.24 | 1.91 | 0.39 |
| 5.33 | 0.30 | 0.14 | 0.24 | 2.14 | 0.36 |
| 5.65 | 0.43 | 0.16 | 0.26 | 2.69 | 0.27 |
| 5.96 | 0.57 | 0.17 | 0.29 | 3.35 | 0.20 |
| 6.27 | 0.60 | 0.18 | 0.29 | 3.33 | 0.20 |

TABLE XV

| Energy Supplied (J/cm²) | Yellow printed density | Magenta printed density | Cyan printed density | Y/M |
|---|---|---|---|---|
| 0.00 | 0.23 | 0.10 | 0.07 | 2.30 |
| 0.63 | 0.23 | 0.10 | 0.07 | 2.30 |
| 1.25 | 0.24 | 0.10 | 0.08 | 2.40 |
| 1.88 | 0.22 | 0.10 | 0.08 | 2.20 |
| 2.51 | 0.22 | 0.10 | 0.07 | 2.20 |
| 3.14 | 0.23 | 0.10 | 0.08 | 2.30 |
| 3.76 | 0.32 | 0.10 | 0.07 | 3.20 |
| 4.39 | 0.57 | 0.12 | 0.07 | 4.75 |
| 5.02 | 0.85 | 0.18 | 0.07 | 4.72 |
| 5.65 | 0.95 | 0.25 | 0.07 | 3.80 |
| 6.27 | 0.98 | 0.33 | 0.08 | 2.97 |

Example VII

This example illustrates the preparation of the zinc salt of 3-methyl-5-n-octylsalicylic acid.

Preparation of methyl 3-methyl-5-n-octanoyl salicylate

Aluminum chloride (98 g) was suspended in methylene chloride (150 mL) in a 1 L flask and the mixture was cooled to 5° C. in an ice bath. To the stirred mixture was added methyl 3-methylsalicylate (50 g) and octanoyl chloride (98 g) in 150 mL of methylene chloride over a 1 hr period. The reaction was stirred for an additional. 30 min. at 5° C. and then at 3 hrs at room temperature. The reaction was poured into 500 g of ice containing 50 mL of concentrated hydrochloric acid. The organic layer was separated and the aqueous layer extracted twice with 50 mL of methylene chloride. The methylene chloride was washed with a saturated aqueous solution of sodium bicarbonate, dried with magnesium sulfate, filtered, and evaporated to an oil which solidified to 90 g of tan crystals. $^1$H and $^{13}$C NMR spectra were consistent with expected product.

Preparation of 3-methyl-5-n-octanoyl salicylic acid

Methyl 3-methyl-5-n-octanoyl salicylate (prepared as described above, 90 g) was dissolved in 200 mL of ethanol and 350 mL of water. To this solution was added 100 g of a 50% aqueous solution of sodium hydroxide and the solution was than stirred at 85° C. for 6 hrs. The reaction was cooled in an ice bath and a 50% aqueous solution of hydrochloric acid was slowly added until a pH of 1 was attained. The precipitate was filtered, washed with water (5×50 mL) and dried under reduced pressure at 45° C. for 6 hrs. to give 80 g of pale tan product. $^1$H and $^{13}$C NMR spectra were consistent with expected product.

Preparation of 3-methyl-5-n-octyl salicylic acid 16 g of mercury(II) chloride was dissolved in 8 mL of concentrated hydrochloric acid and 200 mL of water in a 1 L flask. 165 g Mossy zinc was shaken with this solution. The water was decanted off and to the zinc was added 240 mL of concentrated hydrochloric acid, 100 mL of water and 3-methyl-5-n-octanoyl salicylic acid (prepared as described above, 80 g). The mixture was refluxed with stirring for 24 hrs. with an additional 50 mL of concentrated hydrochloric acid being added every 6 hrs (3 times). The reaction was decanted hot from the zinc and cooled to solidify the product. The product was collected by filtration, washed with (2×100 mL water) and dissolved in 300 mL hot ethanol. 50 mL of water was added and the solution was refrigerated to give white crystals. The solid was filtered, washed (3×100 mL water) and dried under reduced pressure at 45° C. for 8 hrs to give 65 g of product. $^1$H and $^{13}$C NMR spectra were consistent with expected product.

Preparation of 3-methyl-5-n-octyl salicylic acid zinc salt

3-Methyl-5-n-octyl salicylic acid (prepared as described above, 48 g) was added with stirring to a solution of 14.5 g of a 50% aqueous solution of sodium hydroxide and 200 mL water in a 4 L beaker. To this was added 1 L of water and the solution was heated to 65° C. To the hot solution was then added with stirring 24.5 g of zinc chloride in 40 ml of water. A gummy solid precipitated. The solution decanted and the remaining solid was dissolved in 300 mL hot 95% ethanol. The hot solution was diluted with 500 ml of water and refrigerated. The product was filtered and washed (3×500 mL water) to give 53 g of off-white solid.

Example VIII

This example illustrates a three color imaging member with an overcoat layer deposited on each side, and a method for writing multiple colors on this member in a single pass using two thermal print heads. The top color-forming layer produces a yellow color, using a unimolecular thermal reaction mechanism as described in U.S. Pat. No. 5,350,870. The middle color-forming layer produces a magenta color, using an acid developer, an acid co-developer, and a magenta leuco dye. The bottom color-forming layer produces a cyan color, using an acid developer, and a cyan leuco dye. In between the magenta and cyan layer, a thick clear poly(ethylene terephthalate) film base of approximately 102 micron thickness (Cronar 412) was used. Below the bottom cyan image-forming layer, a thick, opaque, white layer was used as a masking layer. The imaging member was addressed from the top (yellow and magenta) and the bottom (cyan). Because of the presence of the opaque layer, however, all three colors were visible only from the top. In this manner, a full-color image could be obtained.

The magenta image-forming layer was prepared as follows:

Dispersions of Leuco Dye I and Acid Developer I were prepared as described in Example I, part A. above.

A dispersion of Acid Developer III was prepared as described in Example II, part A. above.

The above dispersions were used to make the magenta coating fluid in proportions stated below. The coating composition thus prepared was coated on a clear poly(ethylene terephthalate) film base of approximately 102 microns' thickness (Cronar 412) onto the gelatin-subcoated side, using a Meyer rod, and dried. The intended coating thickness was 3.06 microns.

| Ingredient | % solids in dried film |
|---|---|
| Leuco Dye I | 12.08% |
| Acid Developer I | 28.70% |
| Acid Developer II | 15.14% |
| Genflo 3056 | 37.38% |
| Airvol 205 | 6.38% |
| Zonyl FSN | 0.32% |

A thermally insulating interlayer was deposited onto the magenta imaging layer as follows:

B1. A coating fluid for the interlayer was prepared in the proportions stated below. The image interlayer coating composition thus prepared was coated on the imaging layer using a Meyer rod for an intended thickness of 6.85 microns, and was dried in air.

| Ingredient | % solids in dried film |
|---|---|
| Glascol C44 | 99.78% |
| Zonyl FSN | 0.22% |

B2. A second insulating interlayer of the same description was then coated on the first interlayer and dried.

B3. Finally, a third insulating interlayer of the same description was coated on the second interlayer and dried. The combination of the three insulating interlayers comprised an insulating layer with an intended total thickness of 20.55 microns.

A yellow image-forming layer was deposited on the third thermally insulating layer as follows:

A dispersion of Leuco Dye III was prepared as described in Example II, part C. above. This dispersion was used to make the yellow coating fluid in proportions stated below. The yellow coating composition thus prepared was coated on the thermally insulating interlayer using a Meyer rod for an intended thickness of 3.21 microns, and was dried in air.

| Ingredient | % solids in dried film |
|---|---|
| Leuco Dye III | 49.42% |
| Airvol 205 | 11.68% |
| Genflo 3056 | 38.00% |
| Zonyl FSN | 0.90% |

A protective overcoat was deposited on the yellow image-forming layers as follows:

A slip overcoat was coated on the yellow dye layer. The overcoat was prepared in proportions stated below. The overcoat coating composition thus prepared was coated on the yellow dye layer using a Meyer rod for an intended thickness of 1.46 microns, and was dried in air.

| Ingredient | % solids in dried film |
|---|---|
| Glyoxal | 8.54% |
| Hymicron ZK-349 | 31.95% |
| Klebosol 30V-25 | 23.89% |
| Zonyl FSA | 0.98% |
| Zonyl FSN | 2.44% |
| Airvol 540 | 32.20% |

The cyan image-forming layer was prepared as follows:

Leuco Dye II was dispersed in an aqueous mixture comprising Airvol 205 (2.7% of total solids), Airvol 350 (6.3% of total solids), Triton X-100 (0.18% of total solids) and Aerosol-OT (0.9% of total solids) in deionized water, using an attriter equipped with glass beads and stirred for 18 hours at room temperature. The total solid content of the dispersion was 20%.

A dispersion of Acid Developer I was prepared as described in Example I, part A. above.

The above dispersions were used to make the cyan coating fluid in proportions stated below. The coating composition thus prepared was coated onto the opposite side of the clear poly(ethylene terephthalate) film base as coatings A-D, using a Meyer rod, and dried in air. The intended coating thickness was 3.01 microns.

| Ingredient | % solids in dried film |
|---|---|
| Leuco Dye II | 18.94% |
| Acid Developer I | 51.08% |
| GenFlo 3056 | 22.86% |
| Airvol 205 | 7.01% |
| Zonyl FSN | 0.10% |

The masking, opaque layer.

Titanium dioxide was dispersed in an aqueous mixture comprising Tamol 731 (3.86% of total solids), Ludox HS40 (3.85% of total solids) and a trace amount (750 ppm) of Nipa Proxel in deionized water, using an attriter equipped with glass beads and stirred for 18 hours at room temperature. The total solid content of the dispersion was 50.2%.

The above dispersion was used to make a coating fluid in proportions stated below. The coating composition thus prepared was coated on the cyan image-forming layer using a Meyer rod for an intended thickness of 15 micron, and was dried in air.

| Ingredient | % solids in dried film |
|---|---|
| Titanium dioxide | 88.61% |
| Airvol 205 | 11.08% |
| Zonyl FSN | 0.32% |

A protective overcoat was deposited on the opaque layer as described in part D. above.

The resulting imaging member was printed using a laboratory test-bed printer equipped with two thermal heads, model KYT-106-12PAN13 (Kyocera Corporation, 6 Takeda-tobadono-cho, Fushimi-ku, Kyoto, Japan). The following printing parameters were used:

| | |
|---|---|
| Printhead width: | 4.16 inch |
| Pixels per inch: | 300 |
| Resistor size: | 70 × 80 microns |
| Resistance: | 3900 Ohm |
| Line Speed: | 10.7 milliseconds per line |
| Print speed: | 0.31 inches per second |
| Pressure: | 1.5-2 lb/linear inch |
| Dot pattern: | Rectangular grid. |

The yellow layer was printed from the front side with a high power/short time condition. In order to obtain gradations of color, the pulse width was increased from zero to a maximum of 1.99 milliseconds (about 18.2% of the total line time) in ten equal steps, while the voltage supplied to the print head was maintained at 26.5V. Within this pulse width there were 120 subintervals, and each had a duty cycle of 95%.

A lower power/longer time condition was used to print the magenta layer, which was also addressed from the front side. The pulse width was increased from zero to a maximum of 8.5 milliseconds (about 79% of the total line time) in 10 equal steps, while the voltage supplied to the print head was maintained at 26.5V. Within this pulse width, there were 525 subintervals, and each had a duty cycle of 30%.

Unlike previous examples, the yellow pulses and magenta pulses were interleaved, and were supplied by a single print head in a single pass, so that a single printhead was printing two colors synchronously. The selection of high power or low power was made by alternating between the 95% duty cycle used for printing yellow and the 30% duty cycle used for printing magenta. The print head voltage was constant at 26.5V.

The cyan layer was printed with a low-power, long-time condition from the backside (the side of the film base bearing the opaque $TiO_2$ layer). In order to obtain gradations of color, the pulse width was increased from zero to a maximum of 10.5 milliseconds (about 98% of the total line time) in 10 equal steps, while the voltage supplied to the print head was maintained at 21.0V.

In addition to printing gradations of color for each of the three dye layers, gradations of combined pairs of the colors, and of the combination of all three colors, were printed.

Following printing, the reflection density in each of the printed areas was measured using a Gretag Macbeth spectrophotometer. Results for writing on the yellow, magenta and cyan layers are shown in Tables XVI, XVII and XVIII.

Table XVI shows the printing of the cyan layer as a function of energy supplied by the thermal head. The magenta and yellow densities obtained are shown as well. Similarly, Table XVII shows the printing of the magenta layer as a function of the energy supplied by the thermal head. The ratio between the magenta and the yellow densities is also shown (M/Y) as well as the cross-talk. In Table XVIII, printing of yellow layer as a function of the energy supplied by the thermal head is also listed. The ratio between the yellow and magenta densities is shown (Y/M) as well as the cross-talk.

TABLE XVI

| Energy Supplied (J/cm$^2$) | Cyan printed density | Magenta printed density | Yellow printed density |
| --- | --- | --- | --- |
| 1.79 | 0.10 | 0.12 | 0.20 |
| 2.07 | 0.11 | 0.12 | 0.20 |
| 2.35 | 0.11 | 0.12 | 0.19 |
| 2.63 | 0.12 | 0.13 | 0.19 |
| 2.92 | 0.17 | 0.13 | 0.20 |
| 3.20 | 0.25 | 0.15 | 0.20 |
| 3.48 | 0.34 | 0.18 | 0.22 |
| 3.76 | 0.56 | 0.25 | 0.25 |
| 4.05 | 0.82 | 0.35 | 0.29 |
| 4.33 | 1.07 | 0.43 | 0.33 |
| 4.61 | 1.17 | 0.45 | 0.34 |

TABLE XVII

| Energy Supplied (J/cm$^2$) | Cyan printed density | Magenta printed density | Yellow printed density | M/Y | Cross-Talk Yellow |
| --- | --- | --- | --- | --- | --- |
| 3.07 | 0.11 | 0.13 | 0.20 | 0.65 | |
| 3.40 | 0.10 | 0.13 | 0.20 | 0.65 | |
| 3.74 | 0.10 | 0.13 | 0.20 | 0.65 | |
| 4.08 | 0.10 | 0.14 | 0.22 | 0.64 | |
| 4.42 | 0.10 | 0.16 | 0.22 | 0.73 | |
| 4.75 | 0.10 | 0.21 | 0.24 | 0.88 | |
| 5.09 | 0.11 | 0.33 | 0.27 | 1.22 | 0.18 |
| 5.43 | 0.11 | 0.53 | 0.31 | 1.71 | 0.11 |
| 5.77 | 0.13 | 0.80 | 0.38 | 2.10 | 0.10 |
| 6.10 | 0.14 | 0.97 | 0.43 | 2.25 | 0.10 |
| 6.45 | 0.14 | 1.02 | 0.45 | 2.27 | 0.11 |

TABLE XVIII

| Energy Supplied (J/cm$^2$) | Cyan printed density | Magenta printed density | Yellow printed density | Y/M | Cross-Talk Magenta |
| --- | --- | --- | --- | --- | --- |
| 1.82 | 0.11 | 0.13 | 0.20 | 1.53 | |
| 2.07 | 0.11 | 0.13 | 0.22 | 1.69 | |
| 2.33 | 0.11 | 0.13 | 0.27 | 2.08 | |
| 2.58 | 0.10 | 0.13 | 0.31 | 2.38 | |
| 2.84 | 0.11 | 0.14 | 0.36 | 2.57 | |
| 3.09 | 0.10 | 0.15 | 0.48 | 3.20 | |
| 3.35 | 0.11 | 0.17 | 0.59 | 3.47 | 0.00 |
| 3.60 | 0.11 | 0.19 | 0.71 | 3.74 | 0.01 |
| 3.86 | 0.11 | 0.20 | 0.76 | 3.80 | 0.02 |
| 4.11 | 0.11 | 0.21 | 0.88 | 4.19 | 0.01 |
| 4.37 | 0.11 | 0.21 | 0.84 | 4.00 | 0.02 |

The results obtained by writing on combinations of two color layers are shown in Tables XIX, XX and XXI. Table XIX illustrates the result of printing simultaneously on the yellow and magenta layers with a single thermal print head. The resulting print is red in color. Table XX shows the result of printing simultaneously on the cyan and yellow layers, giving a green print, and Table XXI shows the result of printing on the cyan and magenta layers to give a blue print.

TABLE XIX

| Energy Supplied (J/cm$^2$) | Cyan printed density | Magenta printed density | Yellow printed density |
| --- | --- | --- | --- |
| 4.89 | 0.10 | 0.12 | 0.20 |
| 5.47 | 0.11 | 0.14 | 0.23 |
| 6.08 | 0.11 | 0.17 | 0.28 |
| 6.66 | 0.11 | 0.27 | 0.38 |
| 7.26 | 0.12 | 0.40 | 0.50 |
| 7.84 | 0.13 | 0.80 | 0.65 |
| 8.45 | 0.15 | 1.20 | 0.84 |
| 9.03 | 0.18 | 1.60 | 1.11 |
| 9.63 | 0.19 | 1.71 | 1.26 |
| 10.21 | 0.19 | 1.69 | 1.39 |
| 10.82 | 0.20 | 1.62 | 1.42 |

TABLE XX

| Energy Supplied (J/cm$^2$) | Cyan printed density | Magenta printed density | Yellow printed density |
| --- | --- | --- | --- |
| 3.61 | 0.11 | 0.13 | 0.20 |
| 4.14 | 0.11 | 0.13 | 0.20 |
| 4.69 | 0.12 | 0.13 | 0.22 |
| 5.21 | 0.13 | 0.14 | 0.27 |
| 5.76 | 0.17 | 0.15 | 0.32 |
| 6.29 | 0.31 | 0.19 | 0.43 |
| 6.84 | 0.46 | 0.26 | 0.55 |
| 7.36 | 0.67 | 0.33 | 0.57 |
| 7.91 | 0.92 | 0.43 | 0.67 |
| 8.44 | 1.23 | 0.54 | 0.84 |
| 8.99 | 1.36 | 0.58 | 0.93 |

TABLE XXI

| Energy Supplied (J/cm$^2$) | Cyan printed density | Magenta printed density | Yellow printed density |
| --- | --- | --- | --- |
| 4.86 | 0.11 | 0.12 | 0.19 |
| 5.47 | 0.11 | 0.13 | 0.24 |
| 6.10 | 0.12 | 0.13 | 0.20 |
| 6.71 | 0.13 | 0.15 | 0.21 |

TABLE XXI-continued

| Energy Supplied (J/cm²) | Cyan printed density | Magenta printed density | Yellow printed density |
|---|---|---|---|
| 7.34 | 0.15 | 0.17 | 0.22 |
| 7.95 | 0.32 | 0.26 | 0.25 |
| 8.58 | 0.51 | 0.42 | 0.31 |
| 9.19 | 0.69 | 0.76 | 0.39 |
| 9.82 | 0.88 | 1.01 | 0.47 |
| 10.43 | 1.40 | 1.27 | 0.59 |
| 11.06 | 1.49 | 1.31 | 0.61 |

Table XXII presents the color densities resulting from printing on all three color layers in a single pass. The resulting print is black.

TABLE XXII

| Energy Supplied (J/cm²) | Cyan printed density | Magenta printed density | Yellow printed density |
|---|---|---|---|
| 6.68 | 0.11 | 0.13 | 0.20 |
| 7.54 | 0.11 | 0.14 | 0.24 |
| 8.43 | 0.11 | 0.17 | 0.29 |
| 9.29 | 0.11 | 0.23 | 0.37 |
| 10.18 | 0.18 | 0.43 | 0.43 |
| 11.04 | 0.29 | 0.81 | 0.71 |
| 11.93 | 0.41 | 1.21 | 0.94 |
| 12.79 | 0.64 | 1.59 | 1.12 |
| 13.68 | 0.89 | 1.81 | 1.38 |
| 14.54 | 1.17 | 1.79 | 1.46 |
| 15.43 | 1.29 | 1.71 | 1.55 |

A preferred embodiment of a method similar to that illustrated in FIG. 14, but adapted for addressing three different color-forming layers of an imaging member similar to that illustrated in FIG. 9, will now be described in more detail.

Figure 19:
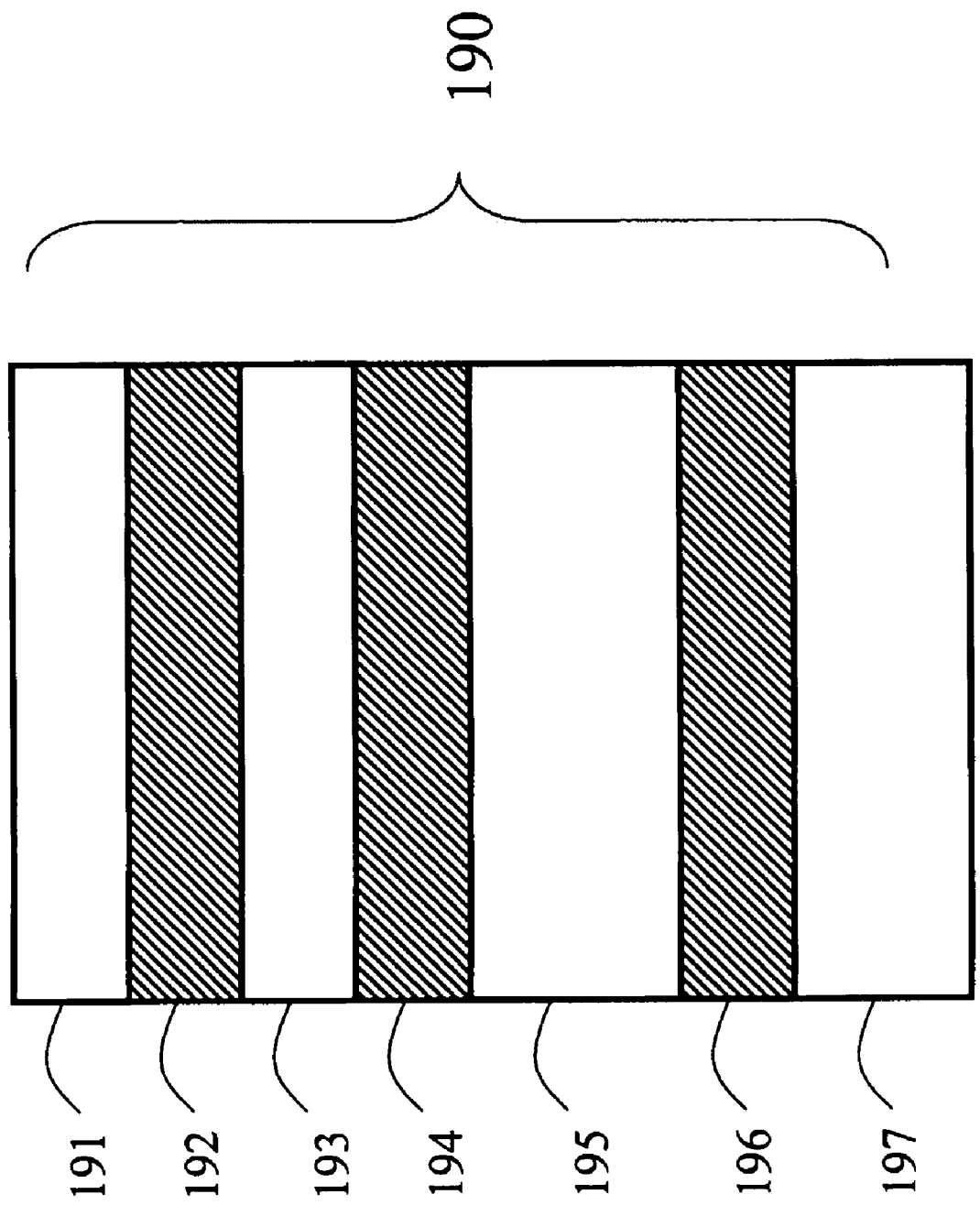
FIG. 19 is a partially schematic, side sectional view of a three-color thermal imaging member according to the invention.

Referring now to FIG. 19, there is seen a thermal imaging member 190 that includes a substrate 197, that can be transparent, absorptive, or reflective; three color-forming layers 196, 194, and 192, that may be cyan, magenta and yellow, respectively; spacer layers 195 and 193; and an overcoat layer 191.

Each color-forming layer changes color, e.g., from initially colorless to colored, when heated to a particular temperature referred to herein as its activating temperature.

Any color order of the color-forming layers can be chosen. One preferred color order is as described above. Another preferred color order is one in which the three color-forming layers 196, 194, and 192 are yellow, magenta and cyan, respectively.

The function of the spacer layers is control of thermal diffusion within the imaging member 190. Spacer layer 193 is preferably thinner than spacer layer 195, provided that the materials comprising both layers have substantially the same thermal diffusivity. Preferably, spacer layer 195 is at least four times thicker than spacer layer 193.

Although six layers are shown disposed on the substrate in FIG. 19, additional barrier layers may be incorporated into the thermal imaging member 190, for example to protect the image from atmospheric oxygen, ultraviolet radiation, etc. The presence or absence of such layers does not affect the methods or devices of the present invention. An example of a preferred thermal imaging member of the present invention is described in U.S. patent application Ser. No. 11/400,735.

All the layers disposed on the substrate 197 are substantially transparent before color formation. When the substrate 197 is reflective (e.g., white), the colored image formed on imaging member 190 is viewed through the overcoat 191 against the reflecting background provided by the substrate 197. The transparency of the layers disposed on the substrate ensures that the colors printed in each of the color-forming layers may be viewed in combination.

Figure 20:
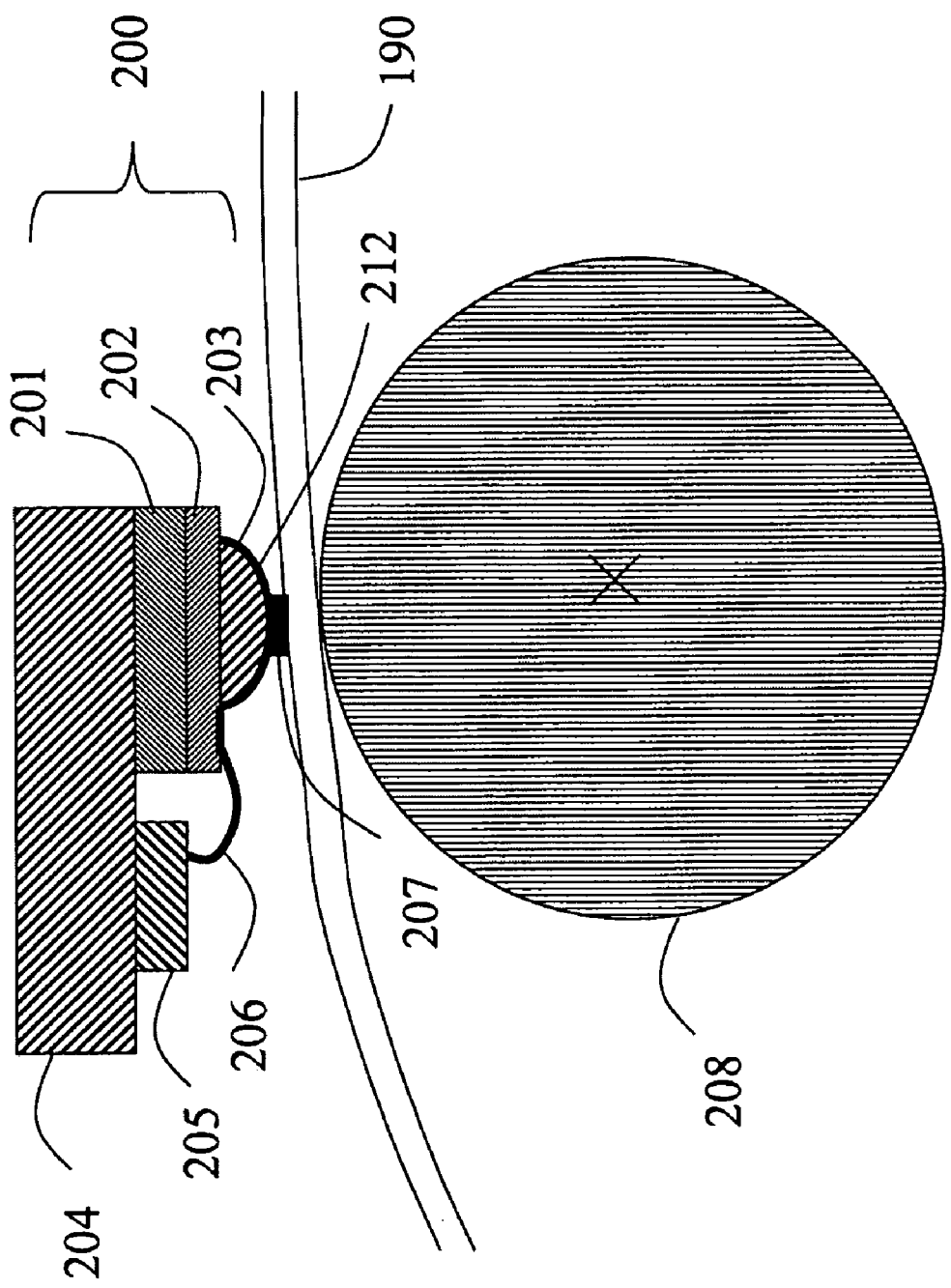
FIG. 20 is a partially schematic, side sectional view of a thermal printing head addressing a thermal imaging member according to the invention.

Referring now to FIG. 20, there is seen a schematic, cross-sectional view of a typical thermal printing arrangement in which a thermal printing head 200 and thermal imaging member 190 of the present invention are held in intimate contact by a platen 208 (that may be a roller (as shown) or a nonrotating element) that biases the thermal imaging member 190 against thermal printing head 200. As shown in FIG. 20, a typical thermal printing head comprises a support 204 that carries both the driving circuitry 205 and the assembly comprising the heating elements. The heating elements 207 are carried by a glaze layer 202 in contact with a ceramic substrate 201, and covered by a thin, thermally-conductive overcoat (not shown). Ceramic substrate 201 is in contact with support 204. Shown in the figure is an optional raised "glaze bump" 203 on which the heating elements 207 are located. The heating elements may be carried by the surface of glaze layer 202 when glaze bump 203 is absent. Wires 206 provide electrical contact between the heating elements 207 and the driving circuitry 20S through patterned conductive connections 212. Heating elements 207 are in contact with the overcoat layer 191 of imaging member 190 through the thin, thermally-conductive overcoat layer. In the arrangement of FIG. 20, therefore, control of the amplitude and duration of the electrical power supplied to the heating elements 207 controls the temperature evolution of the surface of imaging member 190 that carries the overcoat 191.

In a preferred embodiment of the present invention, thermal printing head 200 is held fixed relative to the chassis of the printer while imaging member 190 is transported past the heating elements 207. The transport of the thermal imaging member may be by means of drive rollers (not shown), by driven rotation of the platen 208, or by other transport means that are known in the art. During a single pass of the imaging member 190 past the heating elements, precise control of the amplitude and duration of the power supplied to the heating elements allows any combination of colors to be formed in the three color-forming layers 192, 194 and 196. In other words, a full-color image may be printed in a single pass of imaging member 190 beneath thermal printing head 200.

Figure 21:
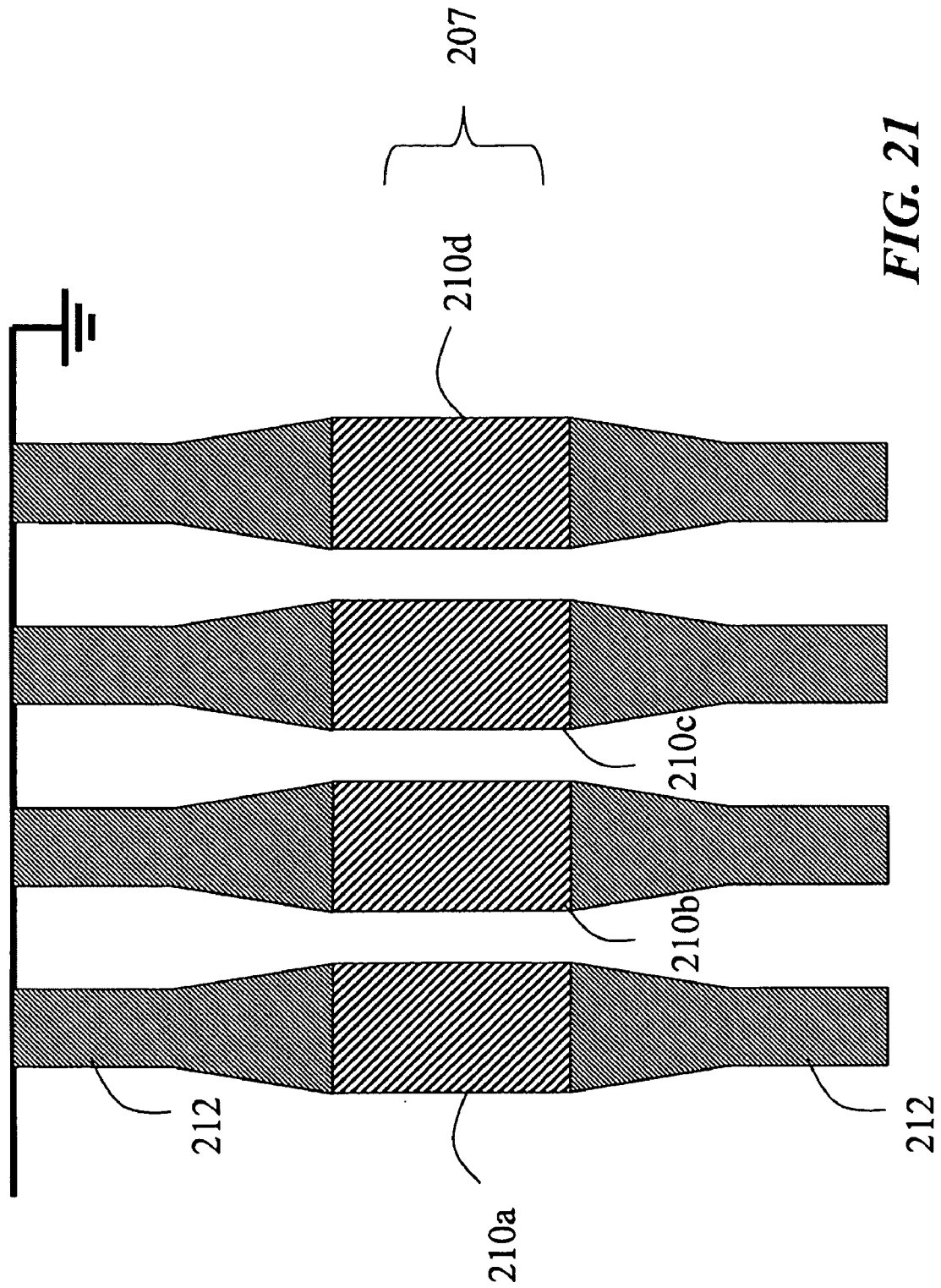
FIG. 21 is a partially schematic, plan view of some thermal heating elements of a thermal printing head according to the invention.

FIG. 21 shows schematically the line of heating elements 207 of the thermal printing head 200 in plan view. Four individual heating elements 210a-210d are shown, each of which is a resistor that is connected to a power supply and to a ground by connections 212. As discussed above, in a typical thermal printing head there may be 150-600 such heating elements per inch. In some embodiments, a single heating element corresponds to a single pixel of an image; in other embodiments pairs or other combinations of heating elements may correspond to a single pixel. In the discussion that follows it is assumed that a single heating element corresponds to a single pixel in one row of pixels of an image, and that columns of pixels are rendered by translation of the imaging member past the row of heating elements.

As discussed above with reference to FIG. 14, and discussed in detail in copending U.S. patent application Ser. No. 11/159,880, electronic pulsing techniques have been designed that allow control of the temperature of the surface of imaging member 190 without requiring modulation of the voltage of the electrical power supplied to the heating elements. This is achieved by providing many short pulses, at a constant voltage, with a frequency high enough that, given the time constant of the thermal printing head, the pulses are not individually resolved as printed dots in the thermal imaging member 190. Changing the duty cycle of these pulses changes the average power supplied to the heating element and thereby controls the temperature achieved at the top surface of the imaging member.

FIG. 14 illustrates the case of printing in a single pass using two different average power levels to address two different color-forming layers in a thermal imaging member. As used herein, the phrase "address a color-forming layer" means "heat a color-forming layer to a temperature above the activating temperature for that layer". When addressing three different color-forming layers, such as are provided in imaging member 190, three different average power levels must be supplied.

Figure 22:
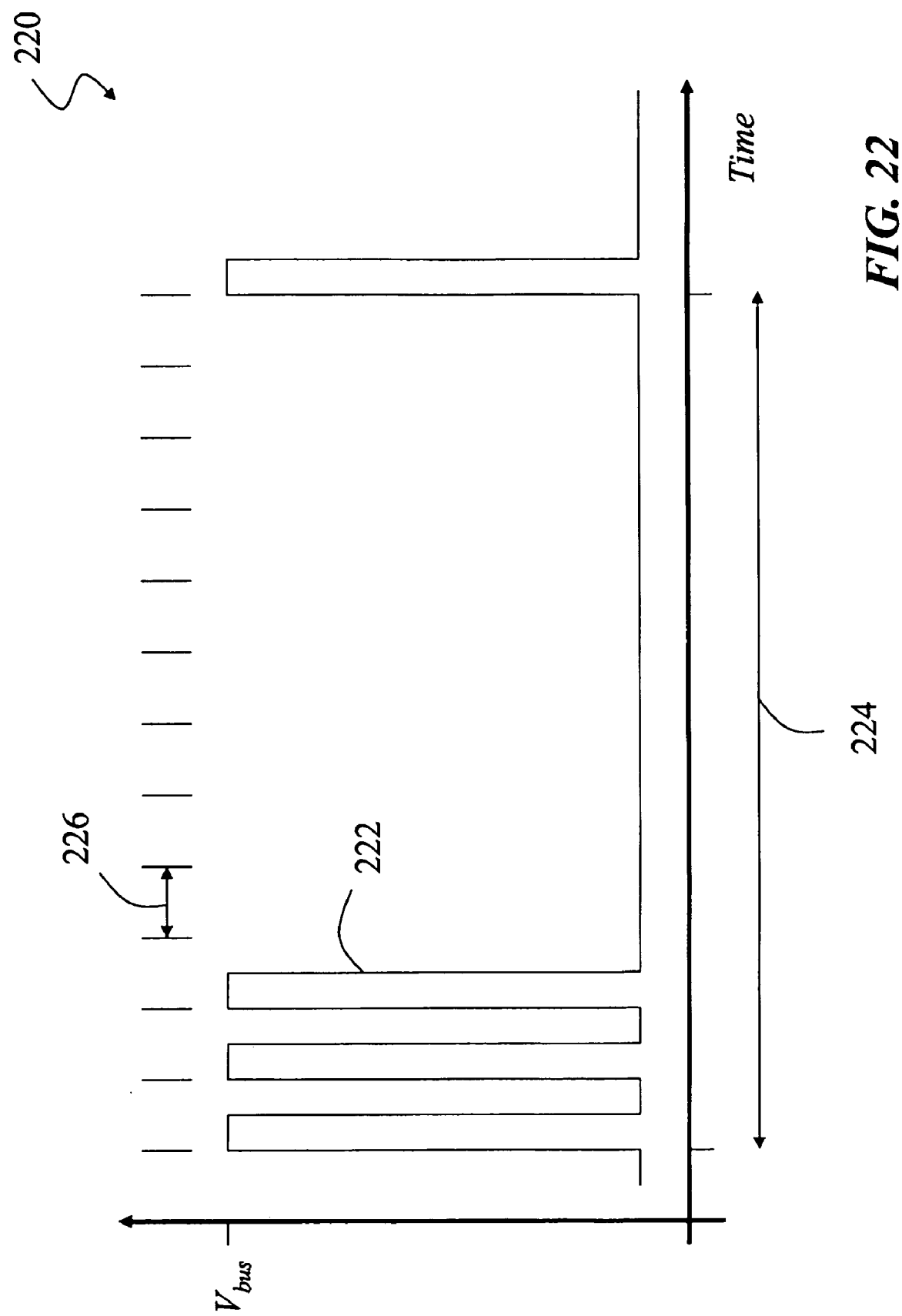
FIG. 22 is a graph that shows the voltage across a print head element over time in a printer in which the line time is divided into a plurality of subintervals.

In a preferred printing method of the present invention, the time for printing each line (i.e., row) of an image is divided into many subintervals. For example, referring to FIG. 22, a graph 220 is shown that plots the voltage across a single print head element (such as any one of print head elements 210*a-d*) over time. Line interval 224 is subdivided into a plurality of subintervals 226. In each of the subintervals, each print head heating element (also referred to herein simply as a "print head element") potentially receives an electrical pulse. In the particular example illustrated in FIG. 22, pulses 222 are provided in the first three of subintervals 226.

Figure 23:
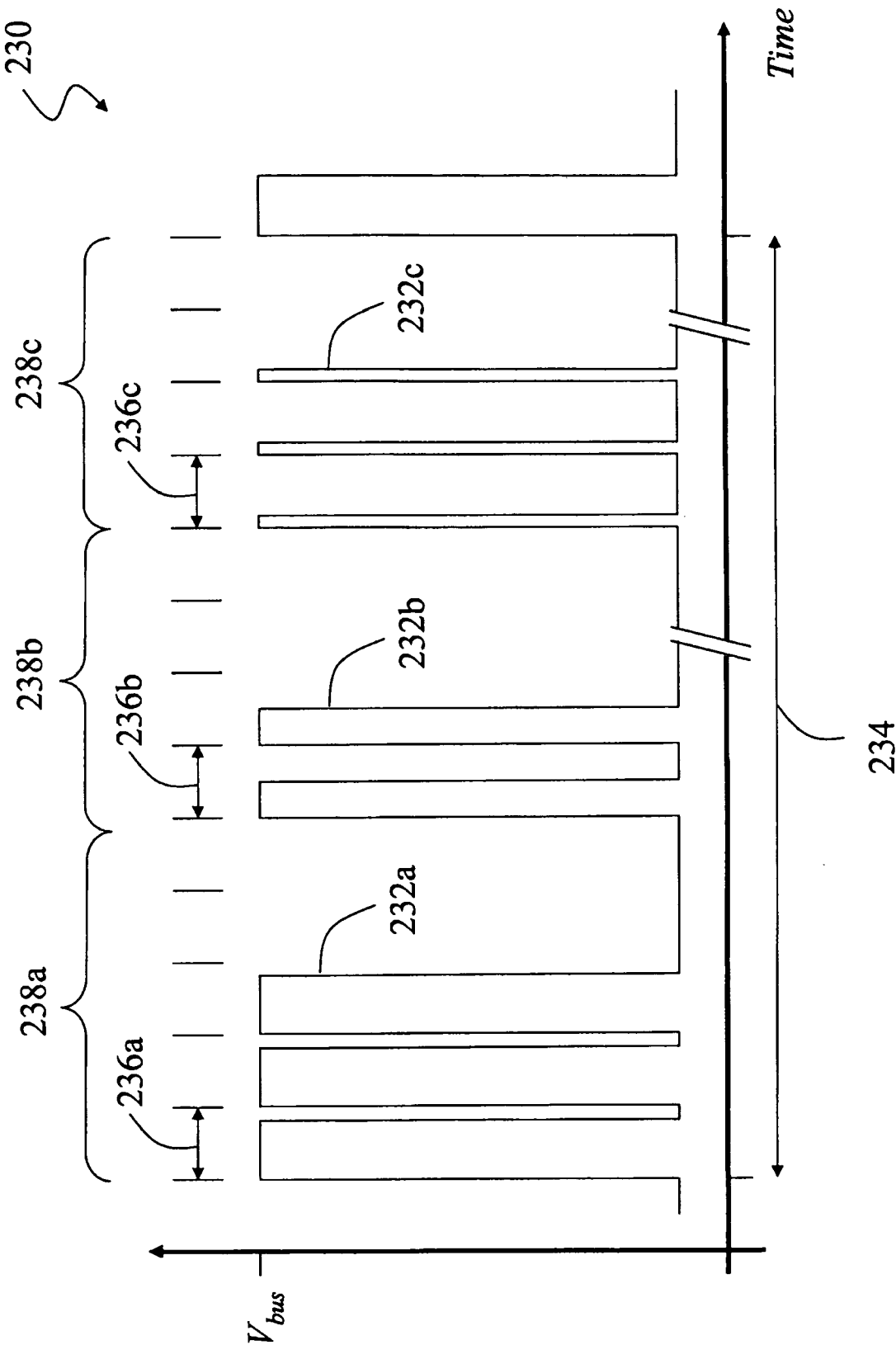
FIG. 23 is a graph that shows the voltage across a print head element over time in a printer in which the line time is divided into three segments, each of which is divided into a plurality of subintervals.

Furthermore, the line printing time can be divided into three segments, each containing a portion of the subintervals, as shown by the graph 230 in FIG. 23. Line interval 234 is divided into three segments 238*a*, 238*b* and 238*c*. The first segment 238*a* includes subintervals 236*a*; the second segment includes subintervals 236*b*; and the third segment includes subintervals 236*c*. The pulses 232*a* in the first segment 238*a* are given a larger pulse duty cycle (the pulse duty cycle being the fraction of a subinterval during which power is applied) than the pulses 232*b* in the second segment 238*b*, which in turn are given a larger pulse duty cycle than the pulses 232*c* in the third segment 238*c*. The pulse duty cycle determines the average power being applied to the print head element during the segment and is used to select a particular one of the color-forming layers in the thermal imaging member 190, and therefore to select a particular color to print.

In the example illustrated in FIG. 23, the average power supplied in segment 238*a* is higher than that in segment 238*b*, which in turn is higher than that in segment 238*c*. Conversely, the duration of segment 238*a* is shorter than the duration of segment 238*b*, which is shorter than the duration of segment 238*c*. The pulses supplied in segment 238*a* are therefore used to form color in the color-forming layer requiring the highest activating temperature and the shortest heating time (i.e., color-forming layer 192 in FIG. 19); the pulses supplied in segment 238*b* are used to form color in the color-forming layer requiring the intermediate activating temperature and the intermediate heating time (i.e., color-forming layer 194 in FIG. 19) and the pulses supplied in segment 238*c* are used to form color in the color-forming layer requiring the lowest activating temperature and the longest heating time (i.e., color-forming layer 196 in FIG. 19). The colors requiring high, intermediate, and low activating temperatures are hereinafter referred to as colors A, B and C, respectively.

When printing a continuous series of lines in an image, there are two possible permutations of the temporal color order: ABCABCABC . . . etc., and cyclic permutations thereof, and ACBACBACB . . . etc., and cyclic permutations thereof, when the same color order is used for every line in the image. Either permutation may be used in the practice of the present invention, but the permutation ABCABCABC . . . etc., and cyclic permutations thereof, is particularly preferred. It is not, however, necessary for the practice of the present invention that the same color order be used for every line of the image, or for every pixel in a given line of the image.

In some instances the method described above for controlling the print head may not be completely satisfactory. For example, a conventional thermal print head typically has one or a small number of "strobe" signal(s) that service(s) all print head elements in the print head. The strobe signal determines the pulse duty cycle, and as a consequence all or a significant fraction of the print head elements 210*a-d* in print head 200 have the same pulse duty cycle in each subinterval. The pulse duty cycle, in turn, determines the color-forming layer being printed, as described above, and therefore it follows that during each subinterval all or a significant fraction of heating elements 210*a-d* are printing on the same color-forming layer of the thermal imaging member 190. Therefore, at any moment in time all or a significant fraction of the heating elements 210*a-d* are printing the same color. This condition precludes the use of screening patterns that call for some of the heating elements 210*a-d* to be addressing one color-forming layer (and therefore printing one color) while other ones of the heating elements 210*a-d* are addressing another color-forming layer (and therefore printing another color).

Note further that power is typically provided simultaneously to multiple print head elements in a print head. Ordinarily, the printer power supply is chosen to satisfy the "worst case" demand represented by the supply of power to all of the print head elements simultaneously. This typically results in the choice of a larger and more expensive power supply than would be required to fulfill the "average" power demand. Power supplies may be chosen to satisfy this peak power requirement even when the average power provided to the print head elements is low, as is the case, for example, when there are repeated segments with low duty-cycle printing. What is further needed, therefore, are improved techniques for performing screening in a printer to reduce the peak power requirements.

In one aspect of the invention there is disclosed a multicolor thermal imaging system wherein different heating elements on a thermal print head can address different color-forming layers of a multicolor thermal imaging member simultaneously. The line-printing time is divided into segments, each of which is divided into a plurality of subintervals. All of the pulses within the segments have the same energy. In one embodiment, every pulse has the same amplitude and duration. Different colors are selected for printing during the different segments by varying the fraction of subintervals that contain pulses. This technique allows multiple colors to be printed using the same strobe pulses. Pulsing patterns may be chosen to reduce the coincidence of pulses provided to multiple print head elements, thereby reducing the peak power requirements of the print head.

In a typical embodiment of the present invention, the thermal imaging member is translated at a speed of 0.1 inch/second relative to the thermal printing head, and the image resolution in the transport direction is 600 dots per inch (dpi). The time taken to print one line is therefore about 16.7 milliseconds (msec). The rate at which pulses are provided to a single heating element by the controlling circuitry of the thermal printing head (shown as 205 in FIG. 20) is about 1 pulse per 10 microseconds (μsec). Therefore, about 1670 pulses can be provided during the time taken to print a single line of the image. Rather than adjust the duty cycle at the level of the individual pulses, it is possible to adjust the average power provided in three segments of the time taken to print a line by a choice of spacing between the pulses in each segment, each pulse having the same duty cycle.

Figure 24:
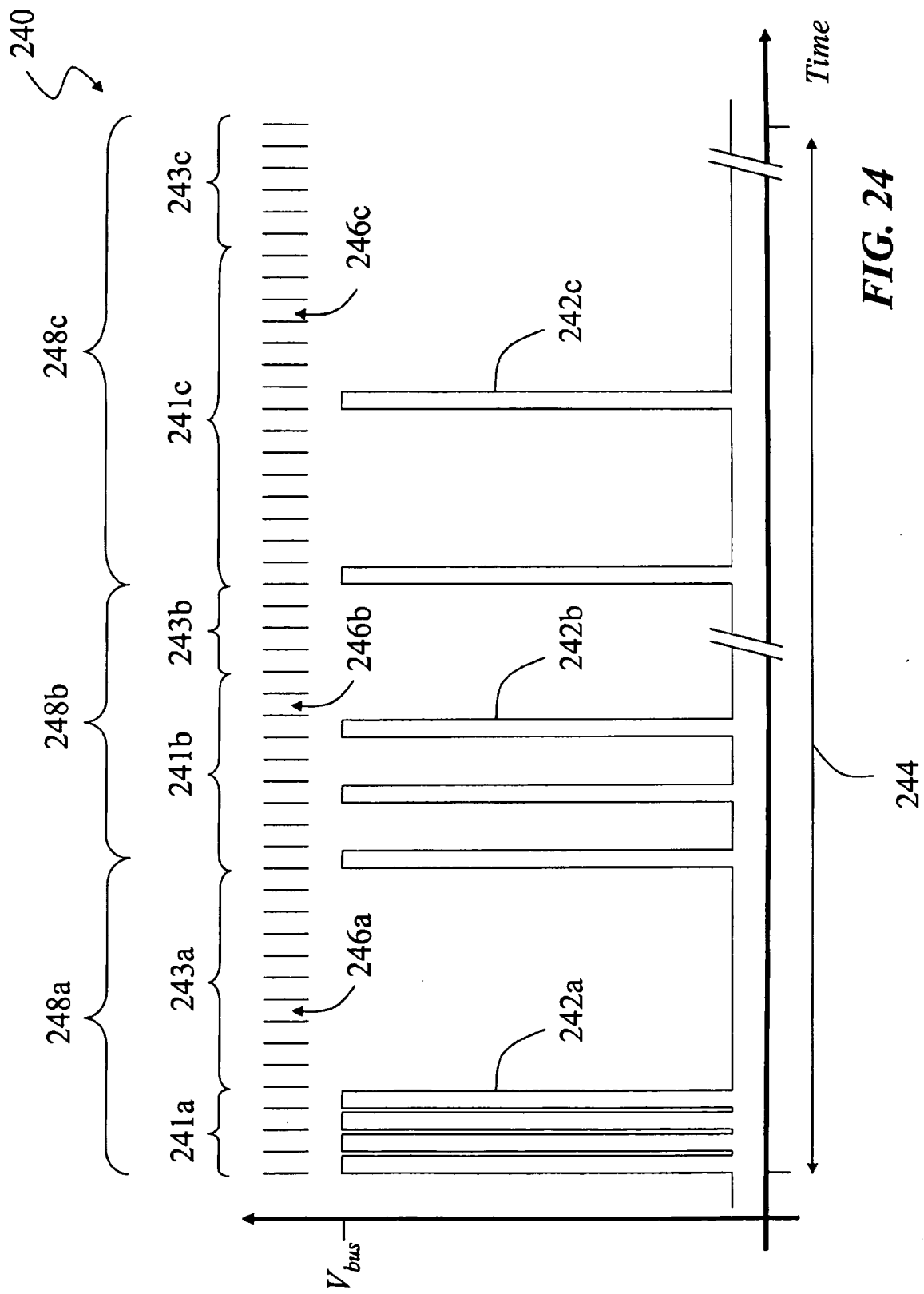
FIG. 24 is a graph that shows the voltage across a print head element over time in a printer in which the line time is divided into three segments, and in which pulses of the same length are provided in each segment according to one embodiment of the present invention.

For example, referring to FIG. 24, a graph 240 is shown that plots the voltage across a single print head element over time according to one embodiment of the present invention. Line interval 244 is divided into three segments 248a, 248b and 248c, that are used to print colors A, B and C, respectively. Each of the segments 248a-c is further subdivided into an on-time and an off-time. More specifically, segment 248a is divided into on-time 241a and off-time 243a, segment 248b is divided into on-time 241b and off-time 243b, and segment 248c is divided into on-time 241c and off-time 243c. No pulses are provided in the off-time of a segment. Pulses may be provided during the on-time of a segment. Although in the example illustrated in FIG. 24, each of the segments 248a-c contains a single on-time followed by a single off-time, this is not a requirement of the present invention. Segments may include other numbers of on-times and off-times arranged in orders other than that shown in FIG. 24.

Each of the on-times 241a-c is an example of a "portion" of the line interval 244, as that term is used herein. Note that a segment need not include an off-time. In other words, the on-time of a segment may be the entire segment, in which case the term "portion" also refers to the entire segment. Likewise, a given segment need not include an on-time. The relative sizes of on-time and off-time portions within a segment are determined by the density of the color that is intended to be printed. A segment may include multiple portions, alternating between on-time and off-time portions.

Line interval 244 includes pulses 242, all of which have the same energy. In the particular example illustrated in FIG. 24, all of the pulses 242 have the same amplitude and duration, although this is not required. Note further that the amplitude of all of the pulses 242 is the maximum (100%) voltage $V_{bus}$. Note, however, that this is not a requirement of the present invention.

Segment 248a is divided into subintervals 246a. Pulses 242a having the same energy are provided in on-time portion 241a of the first segment 248a. Although in the particular example illustrated in FIG. 24, pulses are provided in all of the subintervals 246a in the on-time portion 241a of segment 248a, this is not required. Rather, pulses may be provided in fewer than all of the subintervals 246a in the on-time portion 241a, and in any pattern. In one particular pattern, pulses may be provided in one out of every $N_A$ subintervals 246a of portion 241a of segment 248a. In general, the pulsing pattern, the voltage $V_{bus}$, and the duration of the pulses 242a may be chosen so that the average power in the first on-time portion 241a selects a first one of the color-forming layers in the thermal imaging member 190 for printing (resulting in formation of color A).

Segment 248b is divided into subintervals 246b. In one preferred arrangement, subintervals 246b are the same length as subintervals 246a, and pulses may be provided in one out of every $N_B$ subintervals 246b of portion 241b of segment 248b. In the particular example illustrated in FIG. 24, pulses 242b having the same energy are provided periodically in only one out of every three of the subintervals 246b in portion 241b. In the remaining subintervals in portion 241b no pulses are provided. In general, the pulsing pattern, the voltage $V_{bus}$, and the duration of the pulses 242b may be chosen so that the average power in the on-time portion 241b selects a second one of the color-forming layers in the thermal imaging member 190 for printing (resulting in formation of color B). Note that although pulses are shown in FIG. 24 as provided periodically in portion 241b, this is not required. Rather, pulses may be provided in any suitable pattern in portion 241b, as described in more detail in U.S. patent application Ser. No. 11/159,880.

Finally, segment 248c is divided into subintervals 246c. In one particular pattern, subintervals 246c are the same length as subintervals 246a and 246b, and pulses may be provided in one out of every $N_C$ subintervals 246c of portion 241c of segment 248c. In the particular example illustrated in FIG. 24, pulses 242c having the same energy are provided periodically in only one out of every eight of the subintervals 246c in portion 241c. In the remaining subintervals in portion 241c no pulses are provided. In general, the pulsing pattern, the voltage $V_{bus}$, and the duration of the pulses 242c may be chosen so that the average power in the on-time portion 241c selects a third one of the color-forming layers in the thermal imaging member 190 for printing (resulting in formation of color C). As was the case for portion 241b, described above, although pulses are shown in FIG. 24 as provided periodically in portion 241c, this is not required.

Although in the example illustrated in FIG. 24 the on-time portions 241a, 241b and 241.c occupy the leading subintervals 246a, 246b and 246c of the segments 248a, 248b and 248c, respectively, this is not required as described in more detail below.

Since the thermal time constant of the print head is typically much longer than the length of one of the subintervals 246a-c, the average power in portion 241b of the second segment 248b is approximately $N_A/N_B$ times the average power in portion 241a of the first segment 248a, and the average power in portion 241c of the third segment 248c is approximately $N_A/N_C$ times the average power in portion 241a of the first segment 248a. In other words, the average power in the portions 241b and 241c is reduced not by varying the duration of individual pulses but by selecting the fraction of subintervals in which the print head element is pulsed.

Note that the scheme described above with respect to FIG. 24 still uses "duty cycle" as the means of modulating the power provided to the print head. The scheme illustrated by FIG. 24, however, modulates duty cycle at a coarser level than techniques that modulate duty cycle at the level of individual pulses. More specifically, the scheme illustrated in FIG. 24 modulates duty cycle by adjusting the fraction of pulses that are provided during a segment portion, rather than by adjusting the pulse duty cycle of individual pulses. This difference allows the same pulse duration to be used in all of the segments 248a-c, and therefore enables the same strobe pulse to be used in all of the segments 248a-c (and therefore to be used to print multiple colors).

Figure 25:
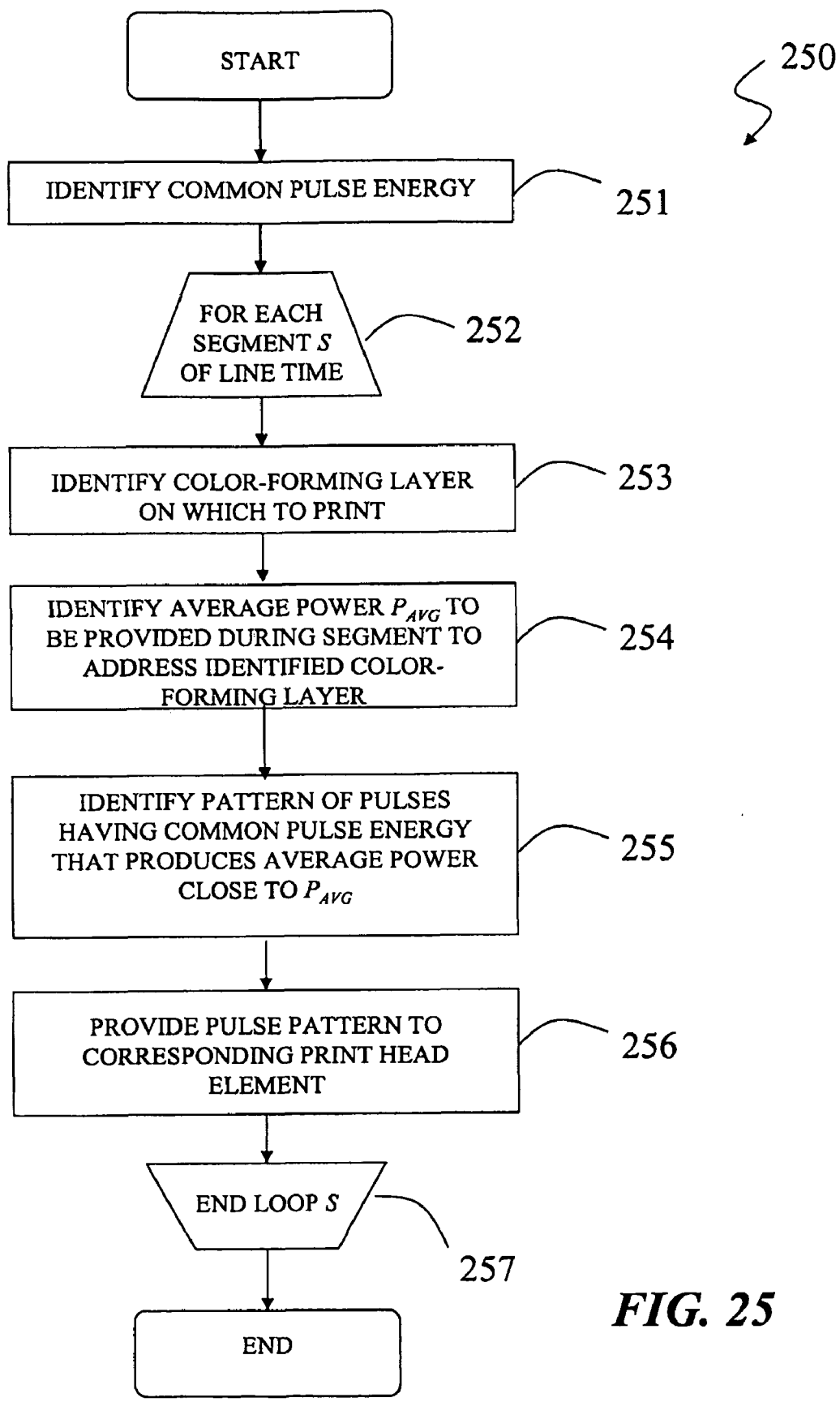
FIG. 25 is a flowchart of a method that is performed by a printer to select a pattern of pulses to provide to a print head element to select a particular color to print according to one embodiment of the present invention.

Referring to FIG. 25, a flowchart is shown of a method 250 that is performed by the printer in one embodiment of the present invention to apply the techniques described above with reference to FIG. 24 when producing output on the thermal imaging member 190. Those having ordinary skill in the art will appreciate how to implement the method 250 as part of a method for printing a digital image on the thermal imaging member 190.

The method 250 identifies a common energy for all pulses (step 251). Recall, for example, that the pulses 242a-c in FIG. 24 all have the same energy.

The method 250 enters a loop over each segment S in a line interval (step 252). For example, referring again to FIG. 24, the first segment may be segment 248a, the second segment may be segment 248b, and the third segment may be 248c. The method 250 identifies the color-forming layer of the thermal imaging member 190, corresponding to the segment S, which is to be addressed (step 253).

The method 250 identifies an average power $P_{AVG}$ to be provided to a corresponding print head element during segment S to address the color-forming layer identified in step 253 (step 254). Identification of an average power may be achieved by a lookup of values obtained by previous experiments. Such experiments may be carried out, for example, by providing a representative thermal imaging member 190 and testing the output obtained by printing at various different average power levels.

The method 250 identifies a pattern of pulses that produces (approximately) the average power $P_{AVG}$, subject to the constraint that each of the pulses has the common energy identified in step 251 (step 255). Note that any pattern satisfying the specified constraints may be selected in step 255. The pulse pattern may be a pattern that only occupies subintervals in a designated "on-time" portion of a segment, such as on-time portions 241a-c in FIG. 24. The pulse pattern identified in step 255 may occupy all of the subintervals in the corresponding segment portion (as in the case of the pulses 242a in segment portion 241a) or fewer than all of the subintervals in the corresponding segment portion (as in the case of the pulses 242b-c in segment portions 241b-c). Those having ordinary skill in the art will appreciate that other kinds of patterns may also satisfy the specified constraints.

Since the required average power $P_{AVG}$ varies from color-forming layer to color-forming layer, the pulse pattern selected in step 255 for a first color-forming layer will differ from the pulse pattern selected in step 255 for a second or a third color-forming layer, as a result of the constraint that pulses in the patterns have the same energy. In particular, such pulse patterns will differ in the fraction of subintervals that contain pulses, as illustrated by the example in FIG. 24.

The method 250 provides the identified pulse pattern to the corresponding print head element to select the color-forming layer identified in step 253 and therefore to print the appropriate color (step 256). The method 250 repeats steps 251-256 for the remaining segment(s) in the line interval (step 257).

Note that the pulsing pattern for each segment may either remain constant or change from line time to line time, and/or from print head element to print head element, within a single line time.

It should be appreciated, in accordance with the teachings above, that each of the segments 248a-c may correspond to a different color to be printed. In a preferred example, the pulses 242a provided in the first segment 248a may be used to address a yellow color-forming layer of the thermal imaging member 190; the pulses 242b provided in the second segment 248b may be used to address a magenta color-forming layer of the same thermal imaging member 190; and the pulses 242c provided in the third segment 248c may be used to address a cyan color-forming layer of the same thermal imaging member 190.

In the example illustrated in FIG. 24, pulses 242b and 242c are issued regularly in one out of every $N_B$ and one out of every $N_C$ of the subintervals 246b-c, respectively. These are special cases of what is referred to herein as "1-out-of-N" pulsing, in which $N=N_B$ or $N_C$. In the case of N=1, pulses are provided in every subinterval and the maximum average power $P_{MAX}$ is obtained.

It may appear to be a limitation of the techniques disclosed above that 1-out-of-N pulsing does not allow the selection of an arbitrary value for the average power. That is to say, 1-out-of-2 pulsing reduces the average power by 2 (i.e., to $P_{MAX}/2$), 1-out-of-3 pulsing reduces the average power by 3 (i.e., $P_{MAX}/3$), and in general 1-out-of-N pulsing reduces power by N (i.e., to $P_{MAX}/N$). Solely using 1-out-of-N pulsing, therefore, does not allow for reduction of average power to values other than $P_{MAX}/N$ for single integral values of N. If finer adjustment is desired, it may be obtained using any of a variety of techniques involving the issuance of more irregular pulse streams, which are described in detail in U.S. patent application Ser. No. 11/159,880.

For typical applications, pulsing in every subinterval in first segment portion 241a of FIG. 24 will produce satisfactory results when forming an image in color-forming layer 192 of thermal imaging member 190; pulsing one out of every $N_B$ subintervals in the second segment portion 241b will produce satisfactory results when forming an image in color-forming layer 194 of thermal imaging member 190, where $N_B$ ranges from 2 to 10, and pulsing one out of every $N_C$ subintervals in the third segment portion 248c will produce satisfactory results when forming an image in color-forming layer 196 of thermal imaging member 190, where $N_C$ ranges from 5 to 40. Especially preferred values of $N_A$, $N_B$ and $N_C$ are 1, 6-12, and 15-25, respectively.

The amounts of energy $E_A$, $E_B$ and $E_C$ that must be supplied to print equal densities of colors A, B and C using the method of the present invention are not equal, such that $E_A<E_B<E_C$. Therefore, the number of pulses that must potentially be supplied in segment 248a is less than the number that must be potentially supplied in segment 248b, which is turn is less than the number that must potentially be supplied in segment 248c. For example, although this is not intended to limit the invention in any way, the ratio of energies required to reach equal densities in colors A, B, and C may be about 1:1.6:2.2.

A typical allocation of subintervals to segments 248a-c when the ratio of energies is as described above is: 35 subintervals in segment 248a with $N_A=1$; 432 subintervals in segment 248b with $N_B=8$; and 1200 subintervals in segment 248c with $N_C=16$. The maximum number of pulses 242a is 35; the maximum number of pulses 242b is 54 (=432/8), and maximum number of pulses 242c is 75 (=1200/16), in this example. The proportion of the line time 244 taken up by segment 248a is 2.1% ($=N_A*E_A/(N_A*E_A+N_B*E_B+N_C*E_C)$); the proportion of the line time 244 taken up by segment 248b is 26% ($=N_B*E_B/(N_A*E_A+N_B*E_B+N_C*E_C)$); and the proportion of the line time 244 taken up by segment 248c is 72% ($=N_C*E_C/(N_A*E_A+N_B*E_B+N_C*E_C)$). The total number of subintervals used per line interval in this example is 1667 (=35+54*8+75*16). Note that this example is given for illustrative purposes only and is not intended to limit the invention in any way. The exact allocation of subintervals to each printing segment will vary according to the thermal printing head and thermal imaging member used, and will also depend upon other variables including the baseline temperature, as described in U.S. patent application Ser. No. 11/400,735.

Several refinements may be applied to the basic method outlined in FIGS. 24 and 25. The time required to print one line (row) of an image is the same for every heating element of the thermal printing head (e.g., elements 210a-d in the line of heating elements 207). Therefore, referring to FIG. 24, line interval 244 is the same for every heating element in the printing head. It is not necessary, however, that the proportion of line interval 244 that is taken up by each of segments 248a, 248b and 248c be the same for every heating element. Rather than allocating a fixed proportion of line interval 244 to the three segments corresponding to the printing of the three primary colors, segment allocation can be made dependent on the image content that is intended to be printed.

This may be illustrated for the case where segment 248a corresponds to the printing of yellow, 248b to the printing of magenta, and 248c to the printing of cyan. In certain regions of the image a low density of magenta may be combined with a high density of cyan. More time can be made available for the printing of cyan if, rather than allocating a portion 243b of segment 248b to "off-time" magenta, it is made available for the printing of cyan instead.

It is possible to provide dynamic segment allocation to the printing of all three colors by eliminating the "off-time" portions 243a-c in each of segments 248a-c. There are reasons, however, to provide a fixed allocation of subintervals to segment 248a (i.e., the segment that corresponds to the printing of color A). As noted above, every subinterval in segment 248a is available for pulsing. The proportion of the line interval that is allocated to segment 248a is therefore small; in practice, about 5% or less. Thus there is little advantage to be gained by using the "off-time" portion of segment 248a for the printing of another color. As described in more detail below, however, there may be disadvantages to reallocating the "off-time" portion of segment 248a when varying temporal offsets are applied to the overall line intervals 244 of individual pixels in a given line of an image in order to minimize the peak power drawn by the thermal printing head (i.e., when load leveling is attempted).

In the examples described above, the average power provided to a print head element is varied by varying the pattern of fixed-duration pulses provided to a particular print head element. As will now be described in more detail, in one embodiment of the present invention pulse patterns are provided to a plurality of print head elements in a manner which reduces the peak power requirements of the print head.

As background, consider, for example, the case in which the pulsing techniques described above with reference to FIG. 24 are applied to all of the heating elements of the thermal printing head simultaneously. When pulses are applied in portion 241a of segment 248a to each heating element, as would be the case when printing a high density of color A, the total power supplied to the printing head is $L*P_{MAX}$, where L is the number of pixels in a line and $P_{MAX}$ is, as defined above, the maximum power supplied to the thermal printing head when printing a single pixel. The average power supplied to a particular heating element while printing a single line is, however, much less than $P_{MAX}$. By offsetting the timing of portions 241a of segments 248a for individual heating elements with respect to one another it is possible to reduce the peak power that must be supplied to the thermal printing head.

In one embodiment of the present invention, therefore, the required size of the power supply is reduced by distributing power more evenly over the line-printing interval to decrease peak power consumption. The power may be distributed more evenly over the line-printing interval by varying the pulse sequences that are applied to the print head elements so as to reduce the sum of the pulse signals applied to the print head elements at any point in time.

In one embodiment of the present invention, the pulse sequences are varied using time offsets, but without otherwise varying the pulse patterns. Various methods for achieving this are described in detail in U.S. patent application Ser. No. 11/159,880. One preferred method of the present invention, referred to hereinafter as the "pixel column offset" method, is shown in FIG. 26.

Figure 26:
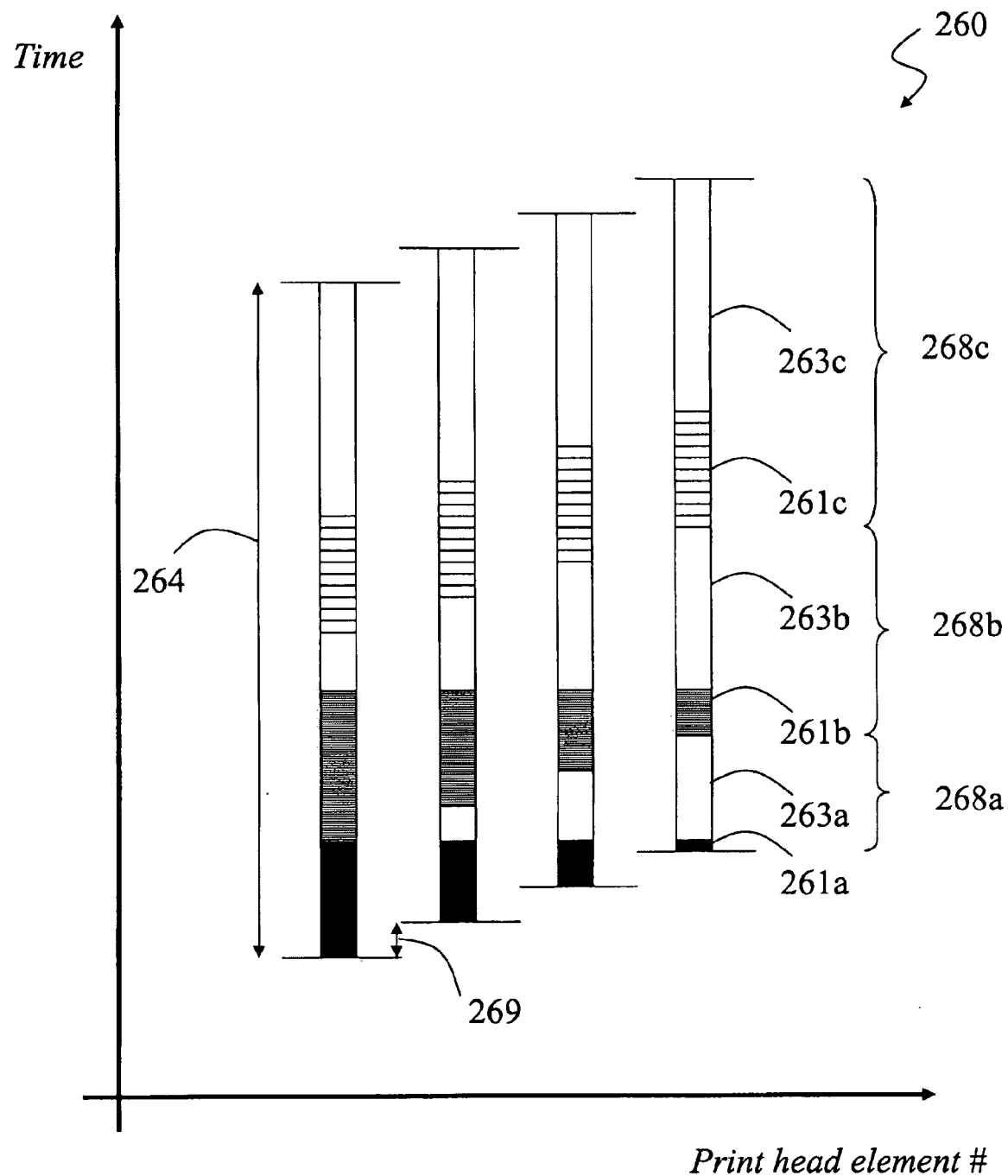
FIG. 26 is a graph that shows the temporal allocation of three segments of a line printing time for four successive print head elements according to an embodiment of the present invention.

Referring now to FIG. 26, there is seen a diagram 260 that shows the temporal duration and offsets of segments 268a-c (corresponding to segments 248a-c in FIG. 24 and used for addressing colors A, B and C, respectively) for four successive print head elements of the thermal printing head while printing pixels in the same line (row) of an image. Each print head element addresses a pixel in a line (row) of an image over a line printing interval of constant duration 264, but the line printing intervals of successive pixels are displaced by a time offset 269. Since successive pixels printed by a given heating element comprise a column of pixels in the image, time offset 269 leads to a spatial offset of a whole column of printed pixels.

Also shown in FIG. 26 are on-time portions 261a-c and off-time portions 263a-c of segments 268a-c. The image being printed has constant density in color C, but a left-to-right gradient in density from high to low in colors A and B.

Load leveling is achieved by choosing time offset 269 to be the duration T of line printing interval 264 divided by L, the number of pixels in a line (row) of the image. In practice, the time offset must be an integral number of subintervals, so in one embodiment of the present invention the offset for the nth heating element in a line is chosen to be a number, Z, of subintervals where Z is the nearest integral value of $(n*T)/(T_S*L)$, where $T_S$ is the duration of one subinterval. By following this procedure, each line will contain pixels that are approximately evenly spaced in delay from 0 to T, and the instantaneous power will be an average of power drawn at evenly spaced moments in the line time. The instantaneous power will therefore be close to the average power and the power will be level over the line time. A minor artifact of the procedure is that a printed line that is intended to be perpendicular to the direction of transport of the thermal imaging member 190 will actually be inclined very slightly to the perpendicular (by the length of one pixel across the width of the image). In practice, this distortion is too small to be readily noticed.

Using the pixel column offset method, the potential locations of pulses in a given line interval are offset between neighboring pixels in the same way, independent of image content, provided that the same pattern of locations of potential pulses is maintained for every print head element. Unfortunately, when dynamic segment allocation is applied to the printing of all three colors by eliminating the "off-time" portions 243a-c in each of segments 248a-c in FIG. 24, the same pattern of locations of potential pulses is not necessarily maintained for every print head element.

Figure 27:
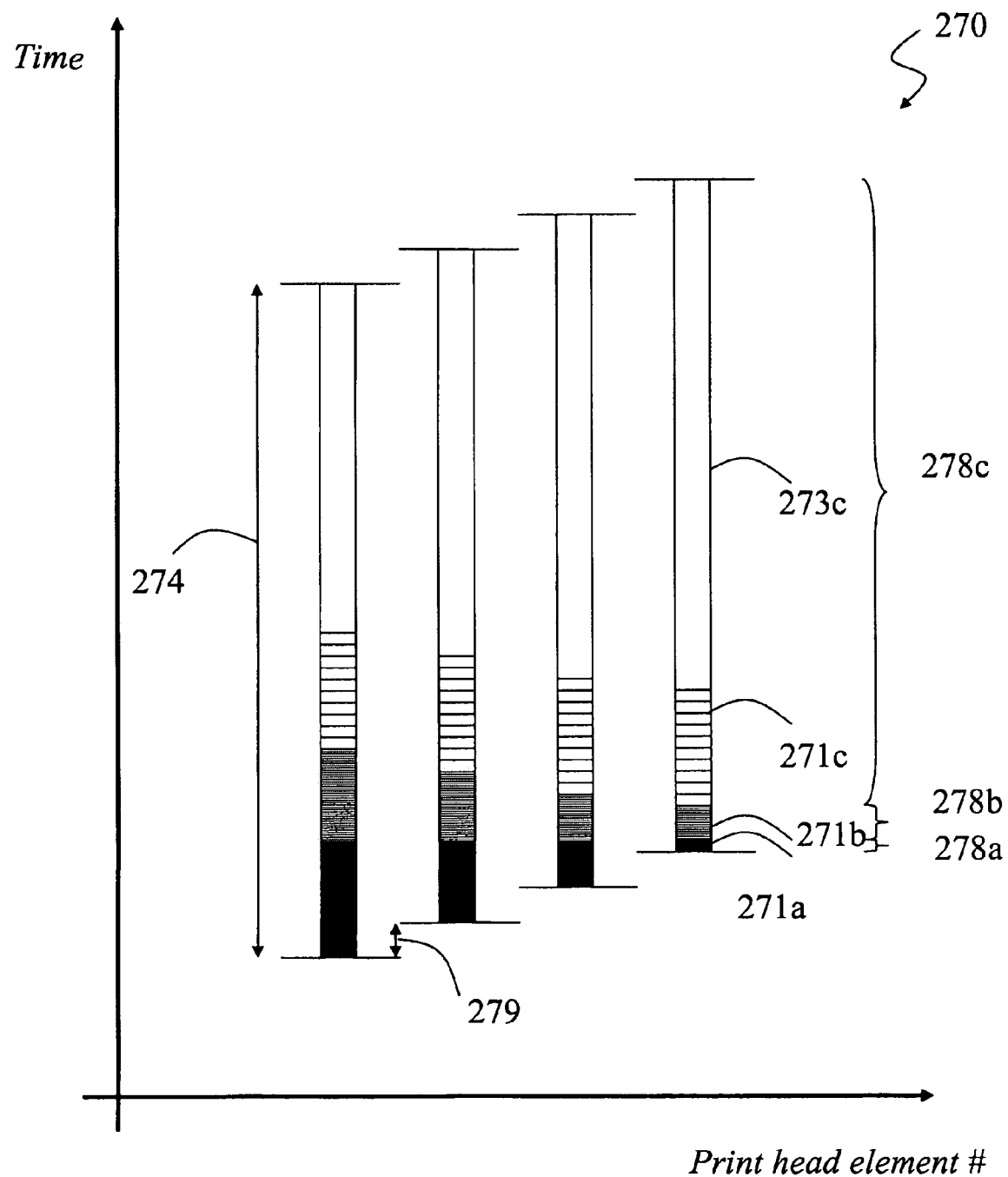
FIG. 27 is a graph that shows the temporal allocation of three segments of a line printing time for four successive print head elements in a case of compromised load leveling.

FIG. 27 shows an illustration of the difficulties that may be encountered when combining dynamic segment allocation with pixel column offset. In FIG. 27 there is seen a diagram 270 that shows the temporal duration and offsets of segments 278a-c (corresponding to segments 248a-c in FIG. 24 and used for addressing colors A, B and C, respectively) for four successive print head elements while printing pixels in the same line (row) of an image. As in FIG. 26, each print head element addresses a pixel in a line (row) of an image over a line interval of constant duration 274, and successive line intervals are displaced by a time offset 279. In the chart shown in FIG. 27 the number of subintervals allotted to segments 278a and 278b is shown as having been adjusted by removing the "off-time" portions corresponding to portions 243a and 243b in FIG. 24 when printing a left-to-right density gradient across a line (row) from high to low in colors A and B. The unfortunate result of this off-time reallocation is that the evenly spaced offsets 279 in the pixel column offset method become uneven and the pixel columns are no longer reliably offset in a manner favorable to load leveling.

This problem can be partially alleviated if the number of subintervals allotted to segment 278a is kept constant. Even when a fixed allocation of subintervals is provided for segments 278a, however, problems may arise with non-deterministic offsets of pulses in segment 278c when "off-time" portions of segment 278b are eliminated. One method of the present invention by which this situation may be remedied is to provide a variable offset preceding or following segment 278a, this offset being the remainder when the number of "off-time" subintervals in segment 278b, Y say, is divided by $N_C$ (i.e., Y (mod $N_C$)).

Another possible procedure of the present invention is to advance the pulses of segment 278c into the unused portion of segment 278b in steps of size $N_C$. This ensures that all pulses of segment 278c maintain their load-leveling alignment with respect to neighboring pixels.

Figure 28:
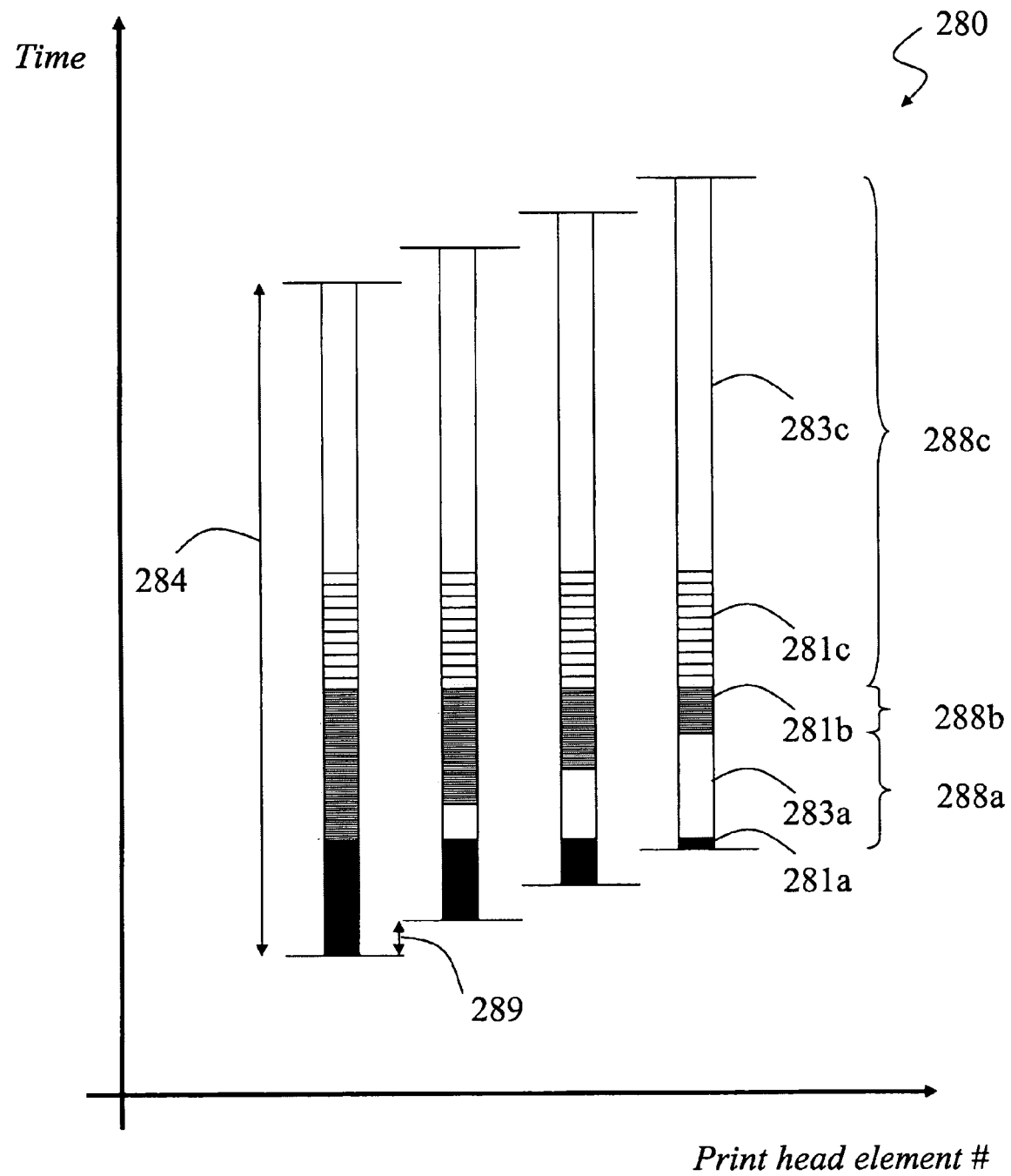
FIG. 28 is a graph that shows the temporal allocation of three segments of a line printing time for four successive print head elements according to an embodiment of the present invention.

This is illustrated in FIG. 28, which shows a fixed allocation of subintervals for segment 288a, and dynamic reallocation of "off-time" portions of segment 288b. For example, when segments 288a, 288b, and 288c correspond to the printing of yellow, magenta, and cyan, respectively, and 1-out-of-$N_C$ pulsing is used for the printing of cyan, the cyan printing segment 288c can be advanced into the unused magenta-printing segment 288b in steps that are sized as a multiple of $N_C$ subintervals. For each step of $N_C$ subintervals, one additional pulse becomes available for printing of cyan. In this way the density of cyan that may be rendered can be improved in regions of low magenta density.

In the preferred embodiment of the present invention illustrated in FIG. 28, the line interval 284 for printing a particular pixel is divided into t subintervals (not shown, numbered $S_1$ to $S_t$) of equal duration. These subintervals are grouped into three segments, 288a-c, for addressing colors A, B and C, respectively. The number of subintervals allocated to segments 288a-c are A, B and C, respectively, where A<B<C and A+B+C=t. Subintervals $S_1$ to $S_A$ are allocated to segment 288a; subintervals $S_{A+1}$ to $S_{A+B}$ are allocated to segment 288b; and subintervals $S_{A+B+1}$ to $S_t$ are allocated to segment 288c. In segment 288a, one out of every $N_A$ subintervals may contain a pulse; in segment 288b, one out of every $N_B$ subintervals may contain a pulse; and in segment 288c, one out of every $N_C$ subintervals may contain a pulse, where $N_A<N_B<N_C$. The number of subintervals assigned to segment 288a is constant, irrespective of image content. The number of subintervals assigned to segment 288b is either B or the number of subintervals needed to render the required density of the color B in the pixel being printed, whichever is less. For example, if X pulses are required to render the desired density of color B, the number of subintervals allocated will be X*$N_B$ (for 1-out-of-$N_B$ pulsing), unless this number is greater than B, in which case B subintervals will be allocated and the density that is achievable will be less than or equal to the density desired). The remaining subintervals are assigned to segment 288c in blocks of length $N_C$. Since $N_C>N_B$ there is the possibility of a residual block of subintervals from segment 288b with length less than $N_C$ that is not allocated to segment 288c, and is not available for pulsing. When none of color B is called for, therefore, all the subintervals originally allocated to segment 288b become available for printing color C, except for those in any residual block of length<$N_C$, in addition to those already allocated to segment 288c.

Pulses may be allocated to segments 288a-c incrementing forward from the beginning of the segment (hereinafter referred to as "bottom-up" allocation), incrementing bidirectionally from the middle of the segment (hereinafter referred to as "center growth" allocation), or incrementing backwards from the end of the segment (hereinafter referred to as "top-down" allocation). Other manners in which pulses may be allocated will occur to one of ordinary skill in the art.

One particular difficulty that may arise using the pulsing techniques described above occurs when it is intended to print the color corresponding to the highest average power (color A) in conjunction with the color corresponding to the lowest average power (color C) without printing the color corresponding to the intermediate average power (color B). For example, when color A is yellow and color C is cyan, printing the two together should provide the color green (yellow plus cyan) uncontaminated with magenta (color B). It is possible, however, that a juxtaposition of a high-power printing segment with a low-power printing segment might produce a transitional region of intermediate power.

Referring to FIG. 24, the situation of juxtaposing high- and low-power segments occurs in the transition from one line to the next, i.e., in the transition between segment 248c in one line to segment 248a of the next. The situation can also occur in the method illustrated in FIG. 28, in the case where there is no printing of color B and segments 288a and 288c abut within a single line of the image.

Figure 29:
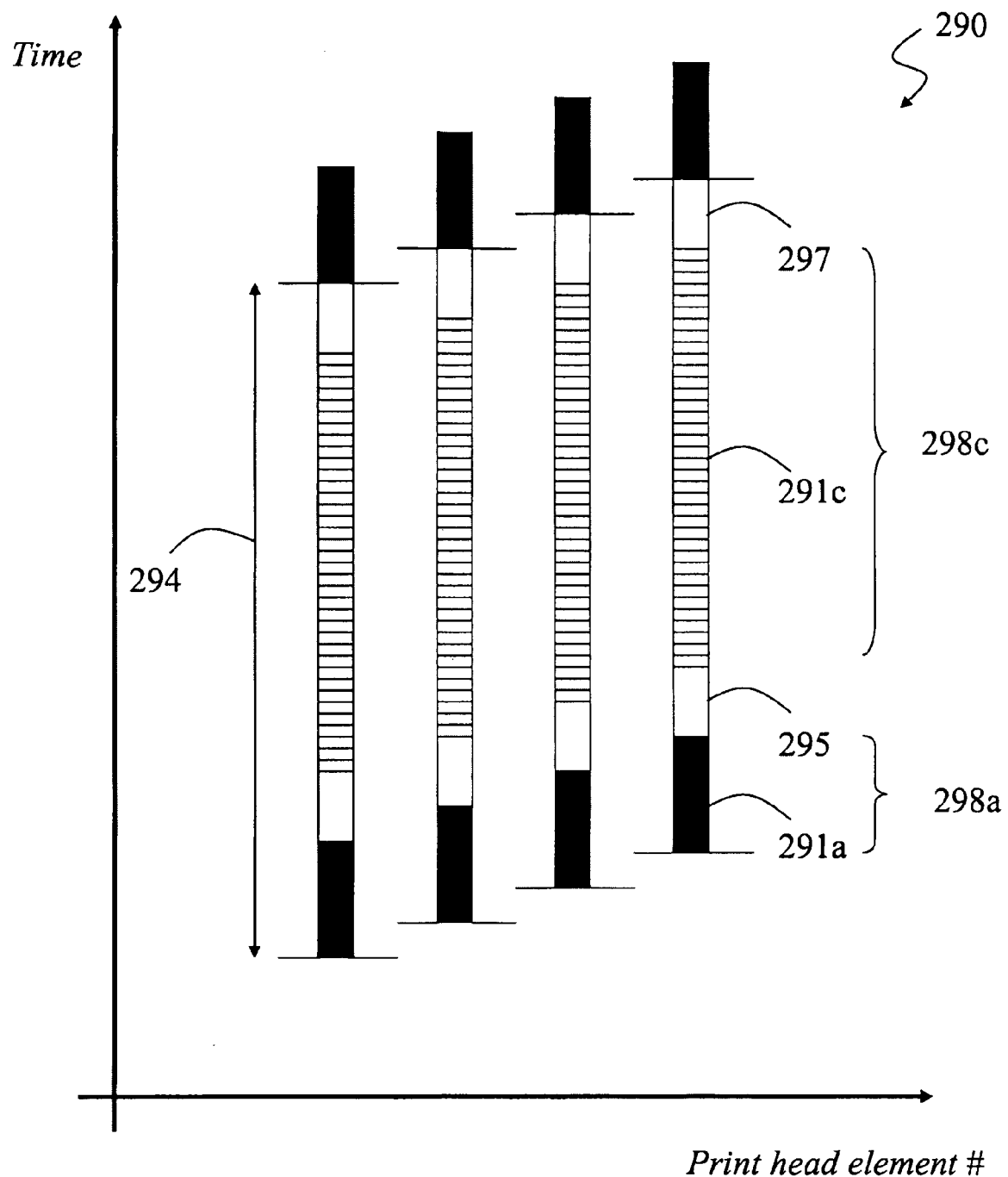
FIG. 29 is a graph that shows the temporal allocation of three segments of a line printing time for four successive print head elements for printing a combination of high- and low-power colors according to an embodiment of the present invention.

The present inventors have found that unintended thermal power averaging between the high-power and the low-power printing segments can be avoided if a gap of at least 0.5 msec and preferably at least 1 msec is provided between a highest-power printing segment and a lowest-power printing segment, as is shown in FIG. 29.

FIG. 29 is a diagram showing four neighboring print head elements using a preferred method of the present invention for printing the combination of colors A and C. Because there is none of color B required, dynamic reallocation of subintervals from segment 298b to 298c is carried out. However, a temporal gap 295 is inserted between segments 298a and 298c in order to prevent unintended thermal power averaging to the intermediate power that would lead to formation of color B. Likewise, a temporal gap 297 is inserted between the end of segment 298c and segment 298a of the following line. As mentioned above, these temporal gaps are preferred to be at least 0.5 msec in duration, and especially preferred to be at least 1 msec in duration, but this is for the case in which a conventional thermal printing head is used to address a thermal imaging member 190 of the type described herein, and the present invention is not limited to these values. As will be clear to one of ordinary skill in the art, changes in the design of thermal printing heads, or the use of other heating modalities such as lasers, etc., may result in the need for temporal gaps 295 and 297 having durations that differ from these preferred values.

It is not necessary that the temporal gaps 295 and 297 have a constant, fixed duration. In one preferred embodiment, the duration of temporal gap 295 is made dependent upon the number of pulses applied in segment 298a (i.e., to print color A) in such a way that the duration of temporal gap 295 is made longer when the number of pulses applied in segment 298a is greater.

A complementary problem applies when it is intended to print the color corresponding to the highest average power (color A) in conjunction with the color corresponding to the intermediate average power (color B) without printing the color corresponding to the lowest average power (color C). For example, when color A is yellow and color B is magenta, printing the two together should provide the color red (yellow plus magenta) uncontaminated with cyan (color C). It is possible, however, that in a temporal gap between a high-power printing segment and an intermediate-power printing segment a transitional region might average, thermally, to a low power sufficient to activate unwanted color C.

Referring now to FIG. 24, it is seen that there exists a gap, the "off-time" portion 243a of segment 248a, between the high-power pulses in portion 241a of segment 248a and the intermediate-power pulsing in portion 241b of segment 248b. Further, as discussed above, elimination of "off-time" portion 243a and consequent shortening of segment 248a may lead to problems in load leveling when using the preferred pixel column offset method.

The solution to the difficulty is to rearrange portions 241a and 243a within segment 248a so that "off-time" portion 243a precedes "on-time" portion 241a (i.e., to use "top-down" pulse allocation). In this way, there exists no gap between portion 241a of segment 248a and portion 241b of segment 248b. This preferred pulse sequence of the present invention is illustrated in FIG. 30.

Figure 30:
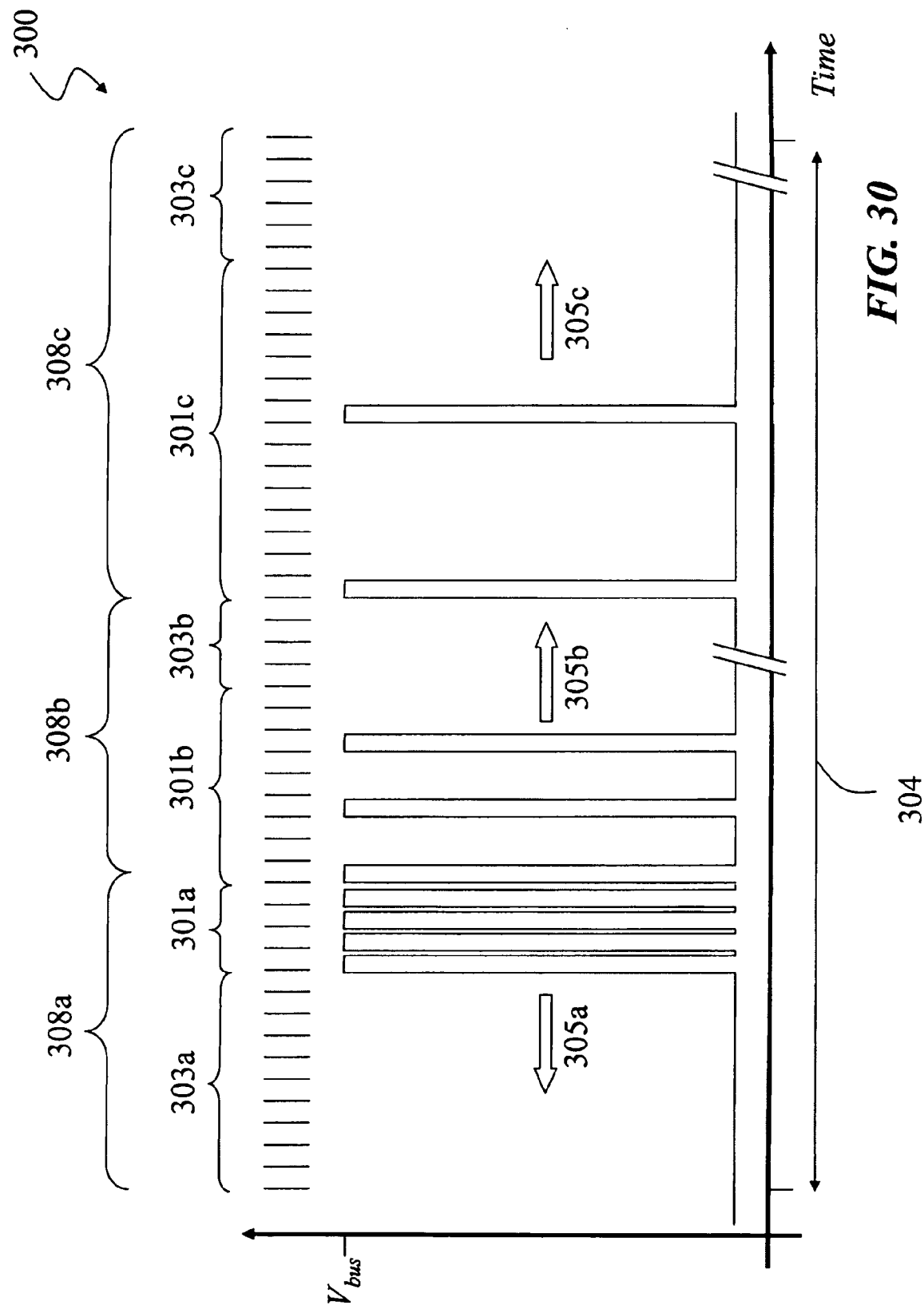
FIG. 30 is a graph that shows the voltage across a print head element over time in a printer in which the line time is divided into three segments, and in which pulses of the same length are provided in each segment according to a preferred embodiment of the present invention.

Referring to FIG. 30, a graph 300 is shown that plots the voltage across a single print head element over time according to a preferred embodiment of the present invention. Line interval 304 is divided into three segments 308a, 308b and 308c, that are used to print colors A, B and C, respectively. Each of the segments 308a-c is further subdivided into an on-time and an off-time. Segment 308a is divided into on-time 301a and off-time 303a, segment 308b is divided into on-time 301b and off-time 303b, and segment 308c is divided into on-time 301c and off-time 303c. When more pulses are demanded in segment 308a, portion 301a expands and off-time portion 303a contracts by the same number of subintervals, in the direction shown by block arrow 305a. Similarly, block arrows 305b and 305c show how portions 301b and 301c expand at the expense of portions 303b and 303c when more pulsing is called for. As described above, in the embodiment of the present invention illustrated in FIG. 30, segment 308a has "top-down" pulse loading, whereas segments 308b and 308c have "bottom-up" pulse loading.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Note that although in the examples described above, all of the individual pulse duty cycles are set to a single value which may be up to 100%, the common duty cycle may be lower if required by the print head specification, or if desired for some other reason.

Note that although a particular printer having a single print head and a particular number of print head elements 207 is shown in FIG. 20, this is merely an example and does not constitute a limitation of the present invention. Rather, embodiments of the present invention may be used in conjunction with various kinds of printers having various numbers of print heads, print head elements, and other characteristics.

U.S. Pat. No. 6,661,443 to Bybell and Thornton describes a method for providing the same amount of energy to each active element in a thermal print head during each subinterval used to print an image irrespective of the number of print head elements that are active during each subinterval. The desired amount of energy may be provided to a plurality of print head elements that are active during a print head cycle by delivering power to the plurality of print head elements for a period of time whose duration is based in part on the number of active print head elements. The period of time may be a portion of the print head cycle. According to one embodiment of the present invention, the pulse duty cycle is changed from subinterval to subinterval, implementing a so-called "common mode voltage correction" by varying the pulse duration in response to the change in voltage caused by the change in the number of active print head elements, thereby maintaining a constant energy for all pulses.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Figure 31:
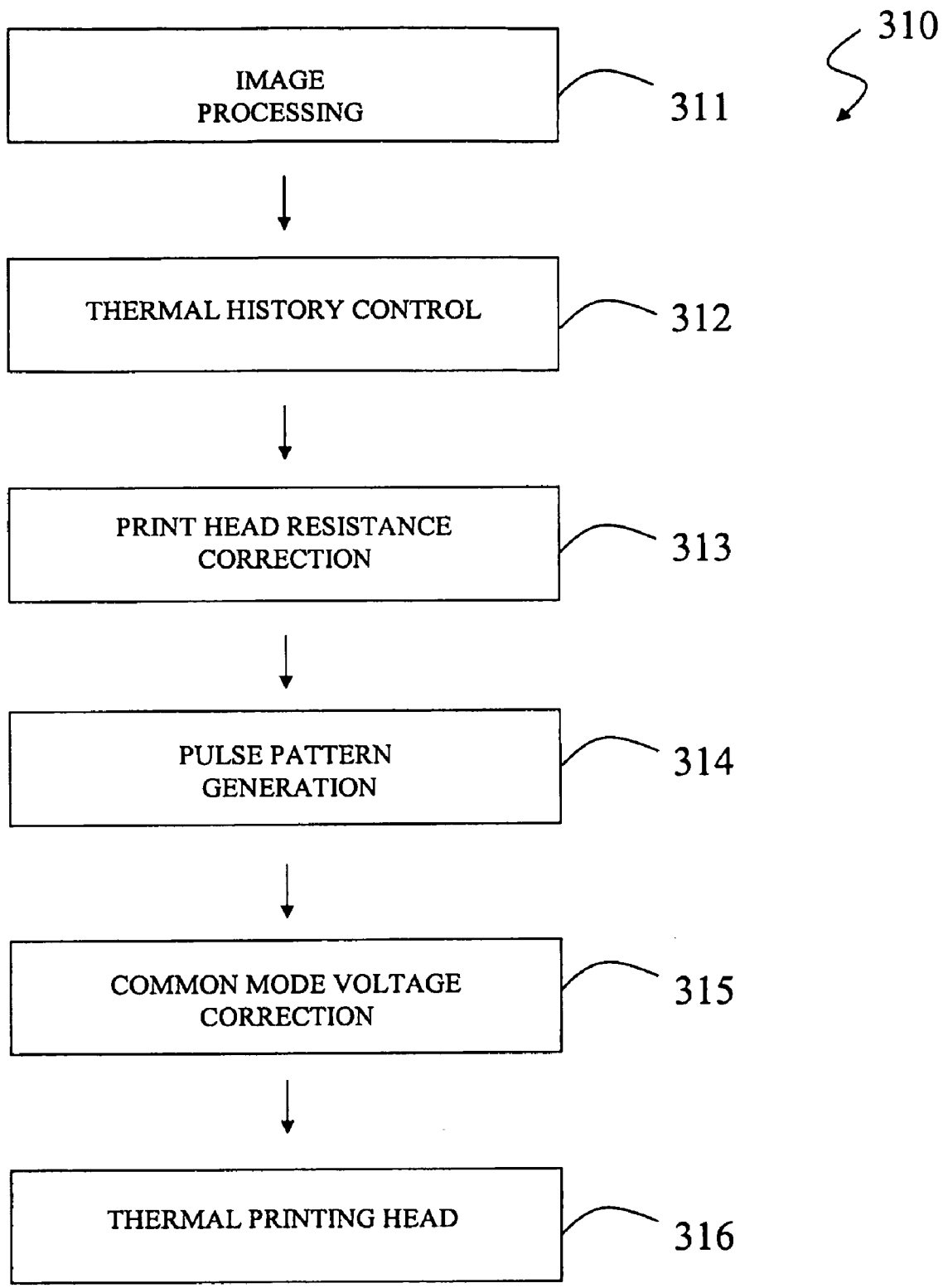
FIG. 31 is a block diagram of an image processing and pulse generation portion of a printing system of the present invention.

For example, the techniques disclosed herein may be implemented in a printer or other device having components for performing the functions illustrated by the system 310 in FIG. 31. An image processing unit 311 receives raw print data and performs initial image processing, such as decompression. The process print data are provided to a thermal history control engine 312, which performs thermal history control on the print data as described, for example, in U.S. patent application Ser. No. 10/910,880.

The output of the thermal history control engine 312 is provided to a print head resistance correction engine 313, which performs corrections on the print data as described, for example, in U.S. patent application Ser. No. 10/990,672, filed Jan. 10, 2005.

The output of the print head resistance correction engine 313 is provided to a pulse pattern generator 314, which generates pulses in accordance with the techniques disclosed herein. The pulses generated by the pulse pattern generator 314 are provided to a common mode voltage correction engine 315, which performs common mode voltage correction on the pulses as described, for example, in U.S. Pat. No. 6,661,443.

The output of the common mode voltage correction engine 315 is provided the thermal print head 316 to pulse the print head 316 accordingly.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein.

Although the invention has been described in detail with respect to various preferred embodiments, it is not intended to be limited thereto, but rather those skilled in the art will recognize that variations and modifications are possible, which are within the spirit of the invention and the scope of the appended claims.

What is claimed is:

1. A device comprising:
    first identification means for identifying a first plurality of pulses to be provided to a thermal print head in a first segment of a first line time, the first plurality of pulses having a first average power, wherein each of the first plurality of pulses has a common predetermined energy; and second identification means for identifying a second plurality of pulses to be provided to the thermal print head in a second segment of the first line time, the second plurality of pulses having a second average power that is lower than the first average power, wherein each of the second plurality of pulses has the common predetermined energy; and third identification means for identifying a third plurality of pulses to be provided to the thermal print head in a third segment of the first line time, the third plurality of pulses having a third average power that is lower than the first average power, wherein each of the third plurality of pulses has the common predetermined energy.

2. The device of claim 1, wherein the first and second segments comprise a first portion and a second portion, the second portion including no pulses.

3. The device of claim 1, wherein each of the first, second and third plurality of pulses has a common predetermined amplitude and a common predetermined duration.

4. The device of claim 3, wherein the first line time comprises a plurality of subintervals, each of which is at least as long as the common predetermined pulse duration, and wherein the first identification means comprises:

means for identifying the number of pulses, $P_A$, in the first plurality of pulses to be provided within the first segment of the first line time;

means for selecting a period $N_A$;

means for selecting a number A of consecutive subintervals to be allocated to the first segment of the first line time; and means for allocating each of the first plurality of pulses to a single subinterval in the first segment of the first line time such that there are ($N_A-1$) subintervals without pulses separating each subinterval that contains a pulse.

5. The device of claim 4, wherein the second identification means comprises:

means for identifying the number of pulses, $P_B$, in the second plurality of pulses to be provided within the second segment of the first line time;

means for selecting a period $N_B$, where $N_B > N_A$;

means for selecting a number B of consecutive subintervals to be allocated to the second segment of the first line time; and means for allocating each of the second plurality of pulses to a single subinterval in the second segment of the first line time such that there are ($N_B-1$) subintervals without pulses separating each subinterval that contains a pulse.

6. The device of claim 5, wherein the third identification means comprises steps of:

means for identifying the number of pulses, $P_C$, in the third plurality of pulses to be provided within the third segment of the first line time;

means for selecting a period $N_C$, where $N_C > N_B$;

means for selecting a number C of consecutive subintervals to be allocated to the third segment of the first line time; and means for allocating each of the third plurality of pulses to a single subinterval in the third segment of the first line time such that there are ($N_C-1$) subintervals without pulses separating each subinterval that contains a pulse.

7. The device of claim 6, wherein the subintervals are of equal length.

8. The device of claim 7, wherein $N_A=1$, $N_B$ is an integer in the range 6-12, and $N_C$ is an integer in the range 15-25.

9. The device of claim 7, wherein the values of A, B and C depend upon $P_A$, $P_B$, and $P_C$, respectively.

10. The device of claim 7, wherein the value of A is a preset default A', and wherein the values of B and C depend upon $P_B$ and $P_C$, respectively.

11. The device of claim 10, wherein the value of B is $N_B*P_B$ or a default value B', whichever is less.

12. The device of claim 11, wherein the number of subintervals in the first line time is t, and the value of C is $N_C$ times the value of INT((t−A−B)/$N_C$), where the function INT( ) means "round down to the nearest integer".

13. The device of claim 12, wherein, for every line, out of a total of t subintervals in a line time, sequentially designated $S_1$ to $S_t$, there is a particular subinterval $S_A$, common to all heating elements, that can potentially be allocated a pulse by the means for allocating each of the first plurality of pulses; a particular subinterval $S_B$, common to all heating elements, that can potentially be allocated a pulse by the means for allocating each of the second plurality of pulses; and a particular subinterval $S_C$, common to all heating elements, that can potentially be allocated a pulse by the means for allocating each of the third plurality of pulses.

14. The device of claim 7, wherein the smallest temporal separation between the start of any pulse in the first segment of the first line time and the start of any pulse in the second segment of the first line time is not greater than the duration of $N_B$ subintervals.

15. The device of claim 7, wherein the smallest temporal separation between the start of any pulse in the first segment of the first line time and the start of any pulse in the third segment of the first line time varies between a maximum value of at least 0.5 milliseconds and zero in proportion to $P_A$.

16. The device of claim 4, wherein $N_A=1$.

17. The device of claim 1, further comprising:

first pulse provision means for providing the first plurality of pulses to the thermal print head in the first segment of the first line time;

second pulse provision means for providing the second plurality of pulses to the thermal print head in the second segment of the first line time; and third pulse provision means for providing the third plurality of pulses to the thermal print head in the third segment of the first line time.

18. The device of claim 17, wherein the first, second and third pulse provision means comprise a single strobe signal for producing the first plurality of pulses, the second plurality of pulses, and the third plurality of pulses.

19. The device of claim 17, wherein the first pulse provision means comprises means for providing the first average power to the thermal print head in the first segment of the first line time to produce output having a first color on a thermal imaging member, and wherein the second pulse provision means comprises means for providing the second average power to the thermal print head in the second segment of the first line time to produce output having a second color that differs from the first color on the thermal imaging member, and wherein the third pulse provision means comprises means for providing the third average power to the thermal print head in the third segment of the first line time to produce output having a third color that differs from either the first color or the second color on the thermal imaging member.

* * * * *